United States Patent [19]
Umesaki et al.

[11] Patent Number: 6,141,314
[45] Date of Patent: Oct. 31, 2000

[54] OPTICAL DISC CHANGER APPARATUS WITH METHOD OF EXCHANGING A DISC

[75] Inventors: Kiyoshi Umesaki, Neyagawa; Toru Tanaka, Kobe; Kiyonari Saruwatari, Kadoma, all of Japan

[73] Assignee: Matsushita Electric Industrial Co., Ltd., Osaka, Japan

[21] Appl. No.: 09/317,204

[22] Filed: May 24, 1999

Related U.S. Application Data

[62] Division of application No. 08/670,100, Jun. 25, 1996.

[30] Foreign Application Priority Data

| Jun. 26, 1995 | [JP] | Japan | 7-158245 |
| Jul. 31, 1995 | [JP] | Japan | 7-193962 |
| Sep. 29, 1995 | [JP] | Japan | 7-252129 |
| Nov. 10, 1995 | [JP] | Japan | 7-292391 |

[51] Int. Cl.[7] .................................................. G11B 17/04
[52] U.S. Cl. ............................................................ 369/178
[58] Field of Search ................................ 369/36, 38, 178, 369/191, 192

[56] References Cited

U.S. PATENT DOCUMENTS

| 4,845,700 | 7/1989 | Koizumi et al. | 369/75.2 |
| 5,146,446 | 9/1992 | Ota et al. | 369/77.2 |
| 5,226,032 | 7/1993 | Ikedo et al. | 369/178 |
| 5,327,412 | 7/1994 | Lee | 369/75.2 |
| 5,329,516 | 7/1994 | Hoshi et al. | 369/77.1 |
| 5,504,733 | 4/1996 | Nakamichi | 369/191 |
| 5,524,002 | 6/1996 | Morita et al. | 369/191 |
| 5,548,567 | 8/1996 | Sawai | 369/36 |
| 5,636,199 | 6/1997 | Ariyoshi et al. | 369/191 |
| 5,638,347 | 6/1997 | Baca et al. | 360/98.04 |
| 5,805,562 | 9/1998 | Hisatomi | 369/191 |

FOREIGN PATENT DOCUMENTS

| 6-14423 | 6/1984 | Japan . |
| 3-216857 | 9/1991 | Japan . |
| 5-969936 | 12/1993 | Japan . |
| 6-259865 | 9/1994 | Japan . |

Primary Examiner—Brian E. Miller
Attorney, Agent, or Firm—Wenderoth, Lind, & Ponack, L.L.P.

[57] ABSTRACT

An optical disc drive apparatus including a main tray having a stack of subtrays mounted thereon and movable between withdrawn and inserted positions. When the main tray is moved to the inserted position, the subtrays stacked thereon are held at a stand-by position and a selected one of the subtrays is ready to be drawn towards a loaded position so that an optical disc resting on the selected one of the subtrays can be clamped in position and optically read out. When an optical disc resting on one of the subtrays other than the uppermost subtray then held at the loaded position is desired to be removed or replaced, not only can such one of the subtray be returned from the loaded position to the stand-by position, the main tray is allowed to withdraw from the inserted position back to the withdrawn position carrying such one of the subtrays and the subtray or subtrays positioned immediately thereabove while leaving the subtray or the subtrays positioned above such one of the subtrays at the stand-by position, so that such one of the subtrays can readily be exposed to the outside for removal or replacement of the optical disc resting thereon.

4 Claims, 47 Drawing Sheets

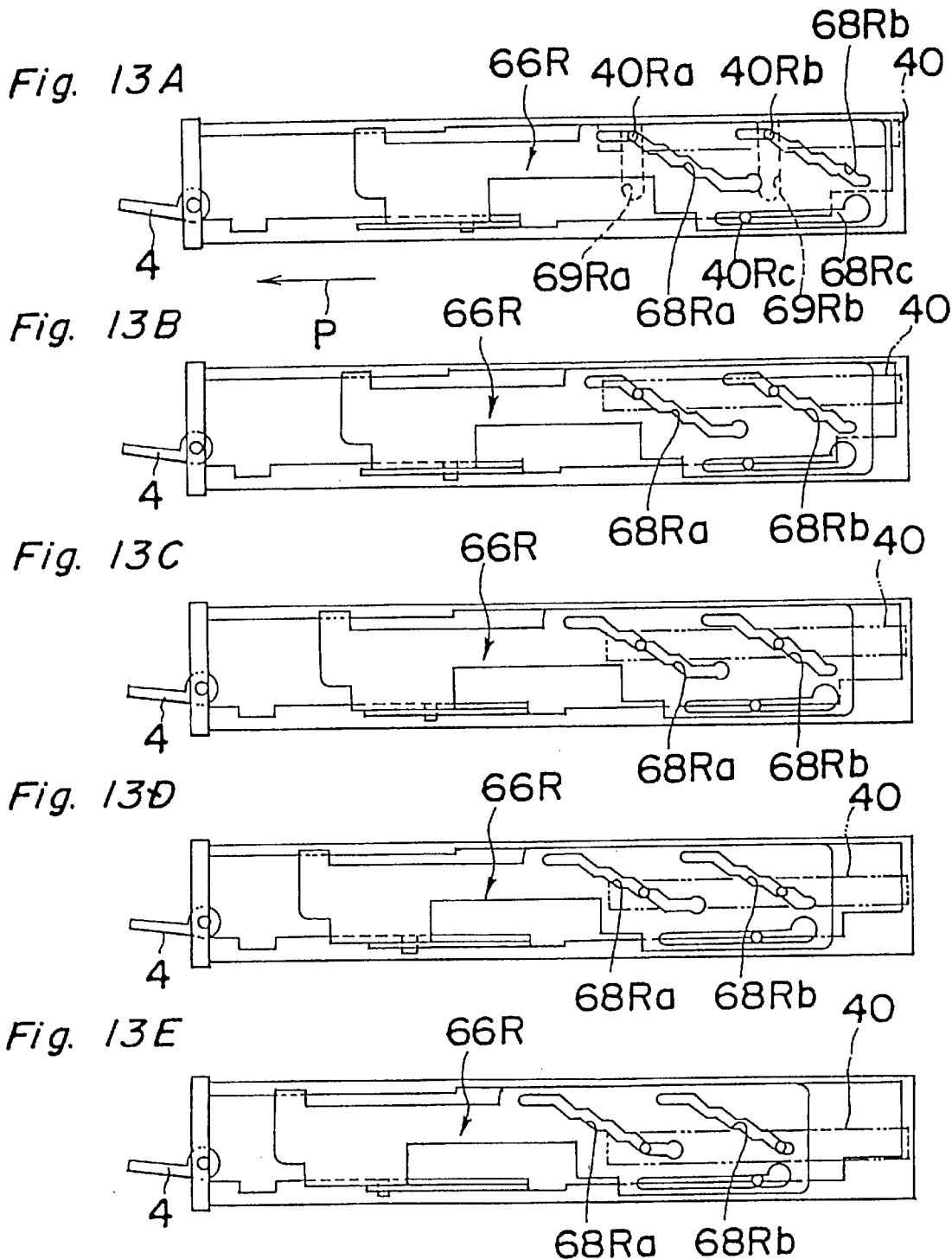

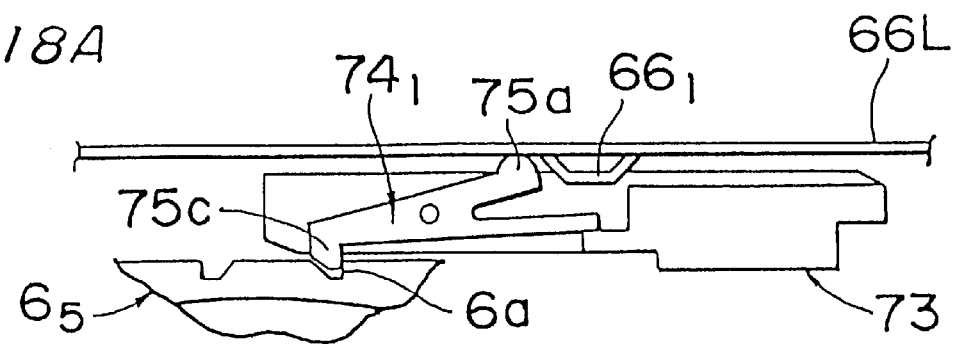
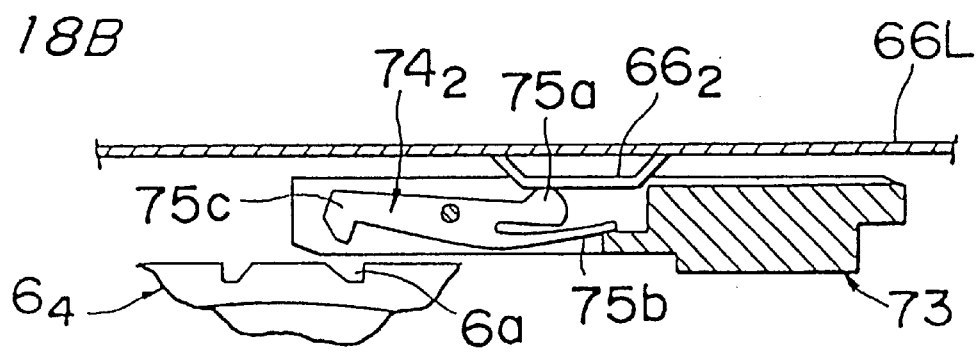
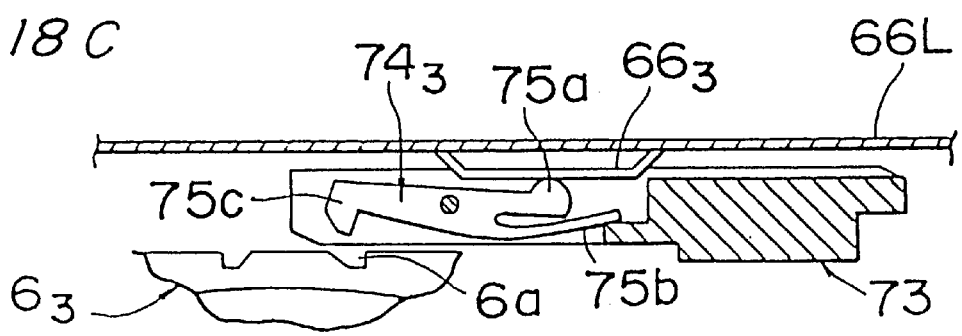
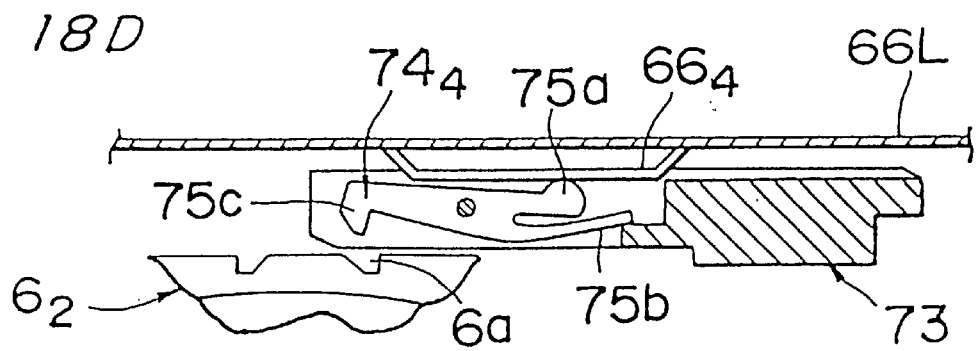

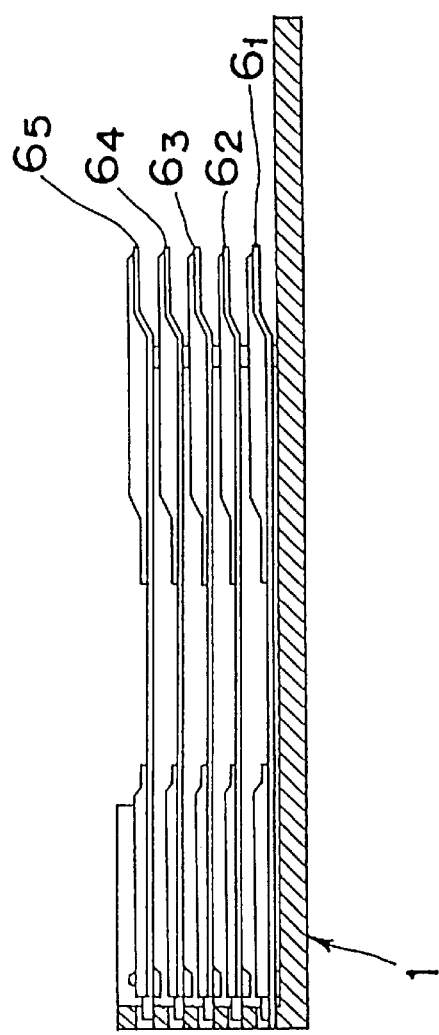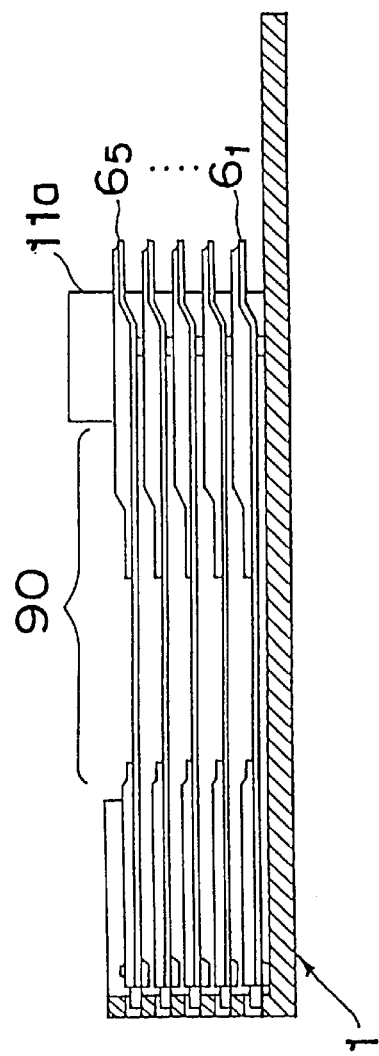
Fig. 52A
Fig. 52B

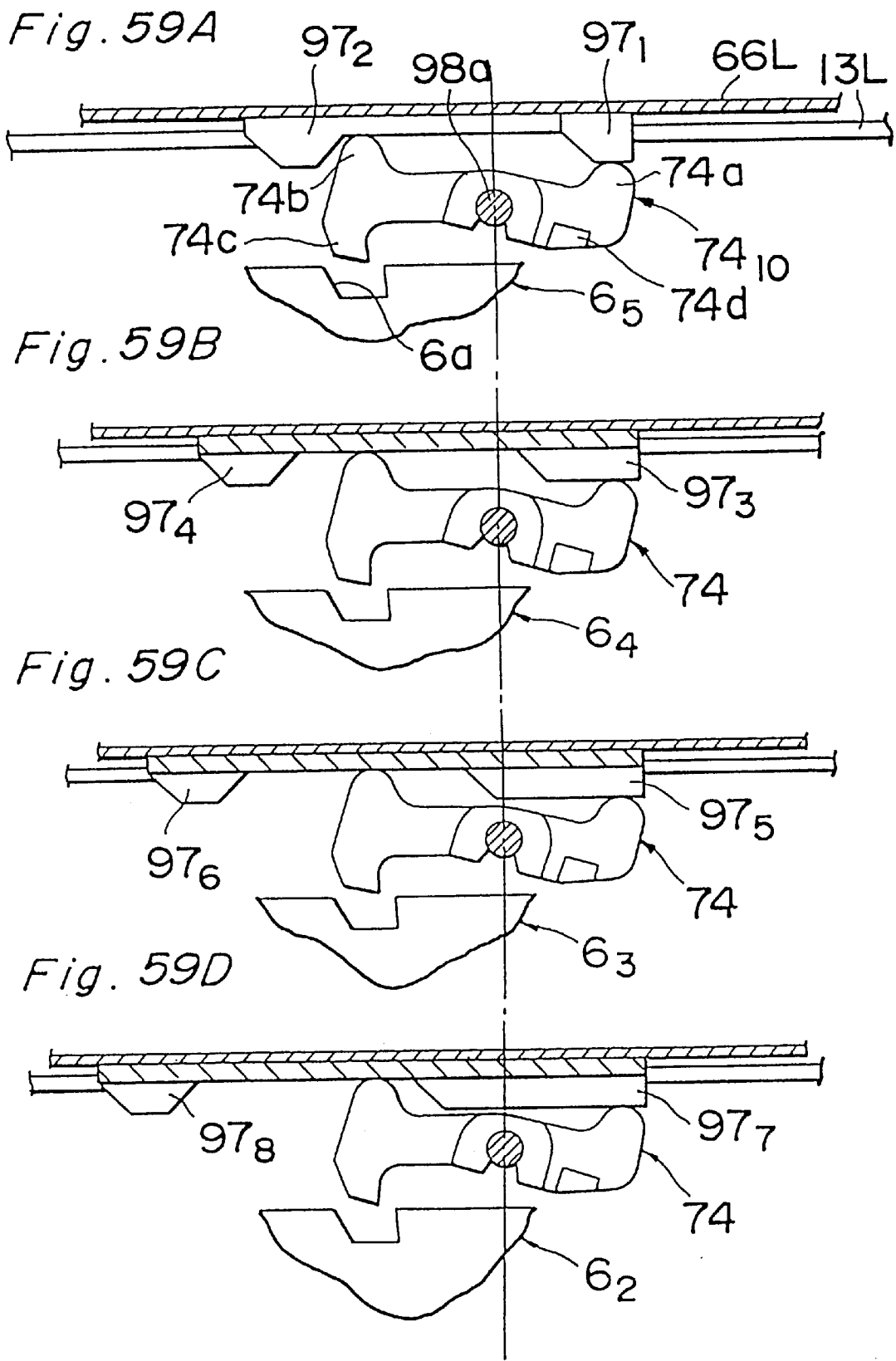

OPTICAL DISC CHANGER APPARATUS WITH METHOD OF EXCHANGING A DISC

This is a divisional application of prior U.S. patent application Ser. No. 08/670,100, filed Jun. 25, 1996.

BACKGROUND OF THE INVENTION

1. Field of the Invention

The present invention generally relates to an optical disc drive apparatus and, more particularly, an optical disc drive apparatus of a type having a disc changer capability for recording and/or reproducing information on and from a selected one of a plurality of optical discs resting on drawable subtrays stacked on a main tray.

In particular, the optical disc drive apparatus of the present invention is suited for use in a personal computer and is so sized and so configured as to permit an existing single disc drive in the personal computer to be replaced with it.

2. Description of the Prior Art

With the advent of the age of personal computers, CD-ROM drives have come into widespread use as a computer peripheral device and are now standard with a majority of the computers. In addition, it is not rare for a single computer user to have a number of optical discs in possession. In this context, user demands are now increasing for CD-ROM drives having an automatic disc changing capability by which a plurality of optical discs can be loaded automatically one at a time to a position where access is made by an optical information read-out device.

On the other hand, in most of the desk-top personal computers, a CD-ROM drive or any other disc drive is installed in a housing space generally known as a "5-inch bay". The opening leading to this housing space is of a standard size generally known as a "5-inch half-height" size, and any peripheral device that is desired to be accommodated in the 5-inch bay must have a maximum size of 146 mm in width and 41.3 mm in height. Accordingly, a CD-ROM drive having a built-in automatic disc changer must also satisfy the size requirement if it is desired to install it in the 5-inch bay. If indiscriminate design is made to allow the drive apparatus to accommodate an increased number of optical discs, the resultant drive would no longer satisfy the size requirement.

In any event, the CD-ROM drive having an automatic disc changing capability and satisfying the size requirement, i.e., capable of being installed in the 5-inch bay, is well known in the art. By way of example, Japanese Laid-open Patent Publication No. 3-216857, published Sep. 24, 1991, discloses an optical disc drive apparatus comprising a main tray supported for movement between withdrawn and inserted positions relative to the drive housing and having a plurality of subtrays stacked thereon, each for supporting thereon an optical disc. This optical disc drive apparatus is so designed that when the main tray is moved to the inserted position with the stacked subtrays held consequently at a stand-by position, a selected one of the subtrays then held at the stand-by position can be drawn towards a loaded position where the optical information read-out device accesses the optical disc resting on such selected subtray.

According to this publication, the main tray is formed with grooves for holding the subtrays in equidistantly spaced relation to each other. When the optical disc resting on an arbitrarily chosen one of the subtrays then held at the stand-by position with the main tray held at the inserted position is desired to be removed or replaced with a different optical disc, the main tray carrying the entire number of the subtrays must be withdrawn to the withdrawn position so that the optical disc on the arbitrarily chosen subtray can be removed. After this removal has been made, the main tray must again be moved to the inserted position.

A similar optical disc drive apparatus is also disclosed in Japanese Laid-open Patent Publication No. 6-259865, published Sep. 16, 1994. This known apparatus makes use of an elevating stocker positioned on one side of a disc playback position remote from the withdrawn position for the main tray and is so designed and so configured that, after a tray with a carriage or subtray thereon has been moved to the inserted position, the optical disc resting on the carriage or subtray is drawn to a playback position where it is played back. The optical disc having been played back is then transported together with the subtray towards the elevating stocker where it is accommodated. The stocker disclosed therein has a capacity to accommodate a plurality of, for example, 7, subtrays and, accordingly, by stacking the subtrays, each having an optical disc resting thereon, within the stocker, an arbitrarily chosen one of the subtrays can be drawn to the playback position that is defined intermediate between the inserted position for the tray and the stocker.

According to this second-mentioned publication, separate drive motors are required for driving the tray and for selectively lowering and lifting the stocker. In addition, the stocker is supported by a movable member and, therefore, when an impact acts on the apparatus during, for example, transport of the apparatus, not only may lifting pins be disengaged from the stocker, but also the movable member may be damaged.

Japanese Patent Publication No. 6-14423, first published Nov. 25, 1982, under Laid-open Publication No. 59-ˆ96559, discloses a magnetic disc drive apparatus including a magnetic disc drive device for transporting a disc-shaped recording medium to a loading position at which the recording medium is mounted on a rotary drive within a housing and a forced ejector with which the recording medium then held at the loading position can be manually forcibly removed.

The teachings of this publication No. 6-14423 may be employed in the optical disc drive apparatus disclosed in the previously mentioned publication No. 3-216857 so that, in the event of, for example, an electric power failure occurring when the main tray having the subtrays stacked thereon is moved at least to the inserted position, the subtrays can be manually forcibly removed out of the drive housing together with the main tray. In this resultant apparatus, it may be contemplated to manually rotate an output shaft of the drive motor used to drive an arbitrarily chosen one of the subtrays then held at the stand-by position towards the loaded position or to manually forcibly drive the output shaft of the motor used to drive the main tray between the withdrawn position and the inserted position. However, where the drive of the motor is transmitted by the use of a pinion and a worm gear meshed with such pinion, such as disclosed in the publication No. 6-14423, a relatively large manipulating force would be required, resulting in reduction of the operability.

Japanese Laid-open Utility Model Publication No. 5-96936, published Dec. 27, 1993, discloses a design in which the space between neighboring subtrays stacked on the main tray exhibited when the main tray is moved to the stand-by position is minimized to render the apparatus as a whole to have a reduced height, but in which the space between the neighboring subtrays when the subtrays positioned between those neighboring subtray has been moved to the loaded position with a part thereof situated between such neighboring subtrays, is expanded to allow the optical disc to be rotated within such space.

SUMMARY OF THE INVENTION

In view of the foregoing, the present invention is intended to provide an improved optical disc drive apparatus of a type having an automatic disc changing capability, and which can accommodate a maximized number of optical discs in a limited space without the reliability of operation thereof being sacrificed.

Another important object of the present invention is to provide an improved optical disc drive apparatus of the type referred to above, wherein the subtrays stacked on a main tray and each having an optical disc resting thereon can be automatically and selectively drawn to the loaded potion to accomplish an efficient and effective disc change.

A further object of the present invention is to provide an improved optical disc drive apparatus of the type referred to above, wherein removal or replacement of an optical disc on any one of the subtrays stacked on the main tray can efficiently be accomplished with no complicated handling procedure required.

A still further object of the present invention is to provide an improved optical disc drive apparatus of the type referred to above, which has a safety ejecting device built therein for enabling the main tray with the subtrays stacked thereon to be manually withdrawn from the inserted position in the event of, for example, an electric power failure occurring during the use thereof.

A yet further object of the present invention is to provide an improved optical disc drive apparatus of the type referred to above, wherein a single drive motor is employed to drive the main tray between the withdrawn and inserted position and to drive an elevating table to being the optical information read/write device in position to handle any one of the optical discs resting on the associated subtrays stacked on the main tray. In this respect, where the single drive motor is used, a drive transmission is generally comprised of a train of gears and, in such case, a phase displacement may occur as a result of the presence of a backlash or deformation of the gears.

Therefore, a yet further object of the present invention is to provide an improved optical disc drive apparatus of the type referred to above that is substantially free from any phase displacement even though an excessive load acts.

A yet further object of the present invention is to provide an improved optical disc drive apparatus of the type referred to above which is substantially robust against any possible impact or shock.

A yet further object of the present invention is to provide an improved optical disc drive apparatus of the type referred to above wherein means is provided to eliminate any possible lateral displacement of each of the stacked subtrays to thereby ensure a stabilized movement between the stand-by position and the loaded position.

It is a related object of the present invention to provide a method of replacing an optical disc resting on any one of the stacked subtrays with another optical disc, which method is uniquely carried out with the optical disc drive apparatus of the type referred to above.

In order to accomplish these and other objects and features of the present invention, there is provided, in accordance with one aspect of the present invention, an optical disc drive apparatus including a main tray having a stack of subtrays mounted thereon and movable between withdrawn and inserted positions, means for moving the main tray from the withdrawn position towards the inserted position, means for drawing an arbitrarily chosen one of the subtrays from a stand-by position towards a loaded position while the main tray is held at the inserted position, and a clamp device for clamping an optical disc resting on the subtray then drawn to the loaded position. Each of the subtrays has opposite side edges formed with a support step extending from a front end towards a rear end thereof. A support guide is formed on and positioned inwardly of each of opposite side walls of a chassis for engagement with the corresponding support step, such that when the main tray is withdrawn to the withdrawn position while the arbitrarily chosen subtray is held at the stand-by position, at least a portion of a front end of the arbitrarily chosen subtray overlaps at least a portion of a rear end of the subtray remaining in the main tray.

With this design, when an optical disc resting on one of the subtrays other than the uppermost subtray then held at the loaded position is desired to be removed or replaced, not only can such one of the subtray be returned smoothly from the loaded position to the stand-by position, but the main tray is allowed to withdraw from the inserted position back to the withdrawn position carrying such one of the subtrays and the subtray or subtrays positioned immediately thereabove while leaving the subtray or the subtrays positioned above such one of the subtrays at the stand-by position in a substantially horizontal posture, so that such one of the subtrays can readily be exposed to the outside for removal or replacement of the optical disc resting thereon.

According to another aspect of the present invention, there is provided a method of replacing an optical disc resting on any one of the stacked subtrays with another optical disc, which is method is uniquely carried out with the optical disc drive apparatus of the type referred to above. According to this method, at least one subtray positioned above the n-th subtray is held at the stand-by position and the main tray is subsequently withdrawn towards the withdrawn position together with the n-th subtray and at least one subtray positioned below the n-th subtray. Accordingly, the subtray immediately below the n-th subtray can readily be exposed to the outside for removal or replacement of the optical disc resting thereon.

Preferably, where one of the subtrays has been drawn to the loaded position, such subtray at the loaded position is returned to the stand-by position prior to the main tray being returned to the withdrawn position. This is particularly advantageous in that the optical disc resting on the subtray or subtrays above the subtray returned to the stand-by position prior to the main tray being returned to the withdrawn position can readily be removed or replaced.

The present invention also provides, in accordance with a further aspect thereof, an optical disc drive apparatus which comprises a main tray adapted to have a stack of subtrays mounted thereon and movable between withdrawn and inserted positions; a main tray drawing means for moving the main tray from a withdrawn position, at which the main tray is positioned outside a drive housing, and an inserted position at which the main tray is housed within the drive housing with the stack of the subtrays held at a stand-by position; a loading drive means for drawing an arbitrarily chosen one of the subtrays from the stand-by position towards a loaded position while the main tray is held at the inserted position; a clamp device for clamping an optical disc resting on the subtray then drawn to the loaded position; an elevating means for selectively lifting and lowering the loading drive means in a direction in which the subtrays are stacked on the main tray so that the arbitrarily chosen subtray may be drawn from the stand-by position towards the loaded position; a drive means comprised of a single drive motor for both of the main tray drawing means and the loading drive means; a first drive switching means for selectively transmitting an output of the drive motor to one of the main tray drawing means and the loading drive means; and a second drive switching means interposed between the drive means and the first drive switching means for transmitting the output of the drive means selectively to one of the first drive switching means and the elevating means.

The use of the first and second drive switching means is particularly advantageous in that the single drive motor can be employed for the drive means. Specifically, when the second drive switching means is set in position to cause the first drive switching means to transmit the output of the drive means to the main tray drawing means, the single drive motor is effective to move the main tray towards the inserted position, but when the second drive switching means is set in position to drive only the elevating means, the loading drive means can be lifted or lowered to a height level aligned with the optical disc resting on the selected one of the stacked subtrays on the main tray then held at the inserted position. Also, when the first drive switching means is set in position to transmit the output of the drive means to the loading drive means, the optical disc resting on the selected subtray can be drawn towards the loaded position and then to cause the optical disc to be clamped in readiness for information recording or reproduction. All of those functions involving the drive force are accomplished by the single drive motor.

According to a still further aspect of the present invention, the optical disc drive apparatus comprises a main tray adapted to have a stack of subtrays mounted thereon and movable between withdrawn and inserted positions; a main tray drawing means for moving the main tray from a withdrawn position, at which the main tray is positioned outside a drive housing, and an inserted position at which the main tray is housed within the drive housing with the stack of the subtrays held at a stand-by position; a loading drive means for drawing an arbitrarily chosen one of the subtrays from the stand-by position towards a loaded position while the main tray is held at the inserted position; a clamp device for clamping an optical disc resting on the subtray then drawn to the loaded position; a drive means comprised of a single drive motor for both of the main tray drawing means and the loading drive means; a first drive switching means for selectively transmitting an output of the drive motor to one of the main tray drawing means and the loading drive means.

In this optical disc drive apparatus, in order for the drive of the single drive motor to be transmitted to one of the main tray drawing means and the loading drive means, only the drive switching means is employed. This drive switching means is so designed as to transmit the output of the drive motor to the main tray drawing means by rotating a gear from a stand-by position towards a loaded position and to transmit the output of the drive motor to the loading drive means after the main tray has been drawn to the inserted position. The gear forming a part of the drive switching means is accessible from front of the drive housing and is manipulatable and, accordingly, where the optical disc is desired to be forcibly ejected such as occurring, for example, in the event of the electric power failure, manipulation of the gear of the drive switching means results in a reversed rotation of the loading drive means to return the optical disc and the subtray at the loaded position back to the stand-by position and further manipulation of the gear results in a reversal of the main tray drawing means to return the main tray carrying the stacked subtray from the inserted position back to the withdrawn position.

However, according to a yet further aspect of the present invention, the optical disc drive apparatus comprises a main tray adapted to have a stack of subtrays mounted thereon and movable between withdrawn and inserted positions; a main tray drawing means for moving the main tray from a withdrawn position, at which the main tray is positioned outside a drive housing, and an inserted position at which the main tray is housed within the drive housing with the stack of the subtrays held at a stand-by position; a loading drive means for drawing an arbitrarily chosen one of the subtrays from the stand-by position towards a loaded position while the main tray is held at the inserted position; a clamp device for clamping an optical disc resting on the subtray then drawn to the loaded position; an elevating means for selectively lifting and lowering the loading drive means in a direction in which the subtrays are stacked on the main tray so that the arbitrarily chosen subtray may be drawn from the stand-by position towards the loaded position; a drive means comprised of a single drive motor for both of the main tray drawing means and the loading drive means; a first drive switching means for selectively transmitting an output of the drive motor to one of the main tray drawing means and the loading drive means; a second drive switching means interposed between the drive means and the first drive switching means for transmitting the output of the drive means selectively to one of the first drive switching means and the elevating means; and a safety ejecting device permitting a gear of the first drive switching means to be manipulatable from front of the drive housing.

The first drive switching means in this optical disc drive apparatus is operable to transmit the output of the drive motor to the main tray drawing means by rotating the gear from a stand-by position towards a loaded position and to transmit the output of the drive motor to the loading drive means after the main tray has been drawn to the inserted position. Accordingly, where the optical disc is desired to be forcibly ejected such as occurring, for example, in the event of the electric power failure, manipulation of the gear of the drive switching means results in a reversed rotation of the loading drive means to return the optical disc and the subtray at the loaded position back to the stand-by position and further manipulation of the gear results in a reversal of the main tray drawing means to return the main tray carrying the stacked subtray from the inserted position back to the withdrawn position.

Preferably, regardless of whether only the drive switching means is employed or whether the first and second drive switching means is employed, the optical disc drive apparatus may be provided with a manipulatable safety ejecting lever slidable between a disengaged position, in which the safety ejecting lever is disengaged from a gear forming a part of the first drive switching means, and an ejecting position in which it is coupled with the gear.

Similarly, the optical disc drive apparatus may preferably be provided with a friction gear assembly interposed between the drive motor and the first drive switching means so that, when the main tray carrying the stacked subtrays is desired to be forcibly ejected, slip can take place in the friction gear assembly to disconnect the drive of the drive means to thereby allow the main tray to be ejected with a minimized amount of the manual force.

Furthermore, a different aspect of the present invention provides an optical disc drive apparatus which comprises a main tray adapted to have a stack of subtrays mounted thereon and movable between withdrawn and inserted positions; a main tray drawing means for moving the main tray from a withdrawn position, at which the main tray is positioned outside a drive housing, and an inserted position at which the main tray is housed within the drive housing with the stack of the subtrays held at a stand-by position; a subtray drawing means for drawing an arbitrarily chosen one of the subtrays from the stand-by position towards a loaded position while the main tray is held at the inserted position; a clamp device for clamping an optical disc resting on the subtray then drawn to the loaded position; a drive means comprised of a single drive motor for both of the main tray drawing means and the loading drive means; a drive switching means for selectively transmitting an output of the drive motor to one of the main tray drawing means and the subtray drawing drive means; and a drawing inhibiting means adapted to be driven to cause the drive switching means to halt the drive gear while the drive gear is disengaged from the drive switching means. The subtray drawing means employed therein includes a gear train for transmitting a drive from the drive switching means to the subtray drawing means, the gear train including a drive gear selectively engageable and disengageable with and from the drive switching means.

Preferably, the drive gear is formed with at least one recess and the drawing inhibiting means is provided with a pawl member engageable in the recess in the drive gear and wherein when the drawing inhibiting means is driven with the drive switching means disengaged from the drive gear the driven gear is driven to minimize a backlash in the subtray drawing means by means of engagement of the pawl in the recess in the drive gear. The recess in the drive gear preferably has an inner wall surface delimited by a first straight surface portion lying radially of the drive gear, a second straight surface portion lying radially of the drive gear, and a tapered surface portion connecting the first and second straight surface portions together, and wherein the pawl has a shape substantially complemental to that of the first straight surface portion when the drawing inhibiting means is engaged with the drive gear.

By this design, during the main tray being drawn, the drawing inhibiting means halts the drive gear to thereby lock the subtray drawing means and, therefore, no phase displacement occur in the subtray drawing means during the operation. When the subtray is returned from the loaded position back to the stand-by position at which it is stacked on the main tray together with the remaining subtrays, and even though the drive switching means is disconnected from the drive gear shortly before completion of the drive being switched, the drive switching means drives the drawing inhibiting means to cause the pawl of the drive inhibiting means to drive the tapered segment of the drive gear to thereby rotate the drive gear. Accordingly, the drive gear can be halted with the backlash in the subtray drawing means consequently minimized and the subtray can assuredly be returned to the main tray with no phase displacement occurring even when an excessive load acts.

According to a further different aspect of the present invention, the optical disc drive apparatus which comprises a main tray adapted to have a stack of subtrays mounted thereon and movable between withdrawn and inserted positions; a main tray drawing means for moving the main tray from a withdrawn position, at which the main tray is positioned outside a drive housing, and an inserted position at which the main tray is housed within the drive housing with the stack of the subtrays held at a stand-by position; a subtray drawing means for drawing an arbitrarily chosen one of the subtrays from the stand-by position towards a loaded position while the main tray is held at the inserted position; a clamp device for clamping an optical disc resting on the subtray then drawn to the loaded position; a drive means comprised of a single drive motor for both of the main tray drawing means and the loading drive means; a drive switching means formed with a plurality of engagements and operable to selectively transmit an output of the drive motor to one of the main tray drawing means and the subtray drawing means; and an auxiliary drive member sequentially engageable with the engagements in the drive switching means one at a time from outside the drive housing for driving the drive switching means.

The auxiliary drive member is utilized to forcibly eject the main tray together with the subtrays mounted thereon in the event of occurrence of, for example, the electric power failure. This auxiliary drive means is insertable into the drive housing through a front wall thereof to intermittently drive the drive switching means so that the main tray drawing means can be reversed to allow the main tray to be returned to the withdrawn position.

The optical disc drive apparatus according to a yet further different aspect of the present invention comprises a main tray adapted to have a stack of subtrays mounted thereon and movable between withdrawn and inserted positions; a main tray drawing means for moving the main tray from a withdrawn position, at which the main tray is positioned outside a drive housing, and an inserted position at which the main tray is housed within the drive housing with the stack of the subtrays held at a stand-by position; a loading drive means for drawing an arbitrarily chosen one of the subtrays from the stand-by position towards a loaded position while the main tray is held at the inserted position; a clamp device for clamping an optical disc resting on the subtray then drawn to the loaded position; an elevating table movable in a direction parallel to the direction in which the subtrays are stacked on the main tray; an elevating means for selectively lifting and lowering the elevating table to one of a plurality of stop positions aligned respectively with the stacked subtrays; and a main substrate for movably holding the elevating means and for holding the elevating table at a position corresponding to the lowermost one of the stacked subtrays on the main tray.

This optical disc drive apparatus is particularly advantageous in that, when the apparatus is to be transported, the elevating table is retained by the main substrate at a position corresponding to the lowermost one of the stacked subtrays, to thereby avoid any possible damage to a information recording and/or reproducing means.

According to one feature of the present invention, a fixed guide is provided in the drive housing for engagement with the subtrays, then held at the stand-by position, to keep them spaced apart from each other so that when the main tray is held at the withdrawn position, the respective front ends of the subtrays on the main tray are engaged with the corresponding engagements in the main tray to secure a space between the neighboring subtrays and the respective rear ends of the subtrays on the main tray rest on the neighboring subtrays through the spacer projections, and that when the main tray is held in the inserted position, the respective front ends of the subtrays on the main tray being engaged with the corresponding engagements in the main tray to secure the space between the neighboring subtrays, but the respective rear ends of the subtrays on the main tray are engaged with the fixed guide to secure a space between the neighboring subtrays. Accordingly, as compared with the case in which holding members are used and provided in the main tray to keep the respective rear portions of the stacked subtrays apart from each other, the position of any one of the subtrays $6_1$ to $6_5$ stacked on the main tray 1 relative to the loading mechanism can be accurately controlled.

Moreover, according to another feature of the present invention, a fixed guide is provided in the drive housing for engagement with the subtrays, then held at the stand-by position, to keep them spaced apart from each other. This fixed guide is provided with a guide projection engageable in a guide groove formed in the lower surface of each subtray and a control projection for avoiding any possible lateral displacement of each subtray, the control projection being formed in the fixed guide at a location above the guide projection and operable to engage with the respective subtray when the guide projection is disengaged from the guide groove as a result of the subtray having been pushed upwardly by the subtray immediately below the subtray. According to this feature, each of the subtrays has first and second projections formed on upper and lower surfaces thereof such that, when the n-th subtray counted from the lowermost subtray is to be drawn from the stand-by position towards the loaded position, the first projection on the n-th subtray is brought into abutment with the second projection on the subtray immediately above the n-th subtray to push such subtray immediately above the n-th subtray upwardly to expand a space between the n-th subtray and the subtray immediately above the n-th subtray.

According to another one of the features of the present invention, the optical disc drive apparatus comprises a main tray adapted to have a stack of subtrays mounted thereon and movable between withdrawn and inserted positions and having an engagement formed therein for engagement with a front end of each of the subtrays, each of the subtrays having a rear end formed with a spacer projection engageable with the next adjacent subtray; a main tray drawing means for moving the main tray from a withdrawn position, at which the main tray is positioned outside a drive housing, and an inserted position at which the main tray is housed within the drive housing with the stack of the subtrays held at a stand-by position; a loading drive means for drawing an arbitrarily chosen one of the subtrays from the stand-by position towards a loaded position while the main tray is held at the inserted position; a clamp device for clamping an optical disc resting on the subtray then drawn to the loaded position; an elevating means for selectively lifting and lowering the loading drive means in a direction in which the subtrays are stacked on the main tray so that the arbitrarily chosen subtray may be drawn from the stand-by position towards the loaded position; and a subtray holding means operable when the n-th subtray counted from the lowermost subtray is to be drawn from the stand-by position towards the loaded position, to hold one or some of the subtrays positioned above the n-th subtray at the stand-by position.

The provision of the subtray holding means is effective to lock the subtray or subtrays above the n-th subtray when the subtray or subtrays above the n-th subtray are to be pushed upwardly to permit the n-th subtray to be drawn towards the loaded position. Accordingly, the subtray or subtrays above the n-th subtray can be assuredly held at the stand-by position.

According to a further one of the features of the present invention, a main tray adapted to have a stack of subtrays mounted thereon and movable between withdrawn and inserted positions is formed with an engagement for engagement with a front end of each of the subtrays, each of the subtrays having a rear end formed with a spacer projection engageable with the next adjacent subtray. A fixed guide is also provided in the drive housing and has guide faces each operable to guide the respective subtray therealong during movement of the respective subtray from the stand-by position towards the loaded position, each of the guide faces having a protuberance formed at a terminating portion thereof. Each of the subtrays has a lower surface formed with a recess for accommodating therein the protuberance on each guide face. A pressing means is employed for depressing a rear end of the arbitrarily chosen subtray downwardly in contact with a rear end of the arbitrarily chosen subtray shortly before completion of loading so that the amount of movement of the clamp device for clamping the optical disc on the n-th subtray can advantageously be minimized and, also, the space between the n-th subtray and the subtray immediately above the n-th subtray can be expanded upon lowering of the n-th subtray.

When the arbitrarily chosen subtray is drawn from the stand-by position towards the loaded position accompanied by upward push of the subtray immediately above such arbitrarily chosen subtray, the subtray immediately above the arbitrarily chosen subtray is preferably pivoted about a point of engagement between the main tray and the subtray immediately above the arbitrarily chosen subtray with the rear end of the subtray immediately above the arbitrarily chosen subtray consequently shifted upwardly. This is particularly advantageous in that as compared with the case in which the subtrays as a whole are lifted upwardly, the space between the neighboring front end portions of the respective subtrays can be minimized to thereby avoid the possibility that two subtrays may be loaded simultaneously.

According to one of the features of the present invention, there is provided an optical disc drive apparatus which comprises a main tray adapted to have a stack of subtrays mounted thereon and movable between withdrawn and inserted positions and having an engagement formed therein for engagement with a front end of each of the subtrays, each of the subtrays having a rear end formed with a spacer projection engageable with the next adjacent subtray; a main tray drawing means for moving the main tray from a withdrawn position, at which the main tray is positioned outside a drive housing, and an inserted position at which the main tray is housed within the drive housing with the stack of the subtrays held at a stand-by position; a loading drive means for drawing an arbitrarily chosen one of the subtrays from the stand-by position towards a loaded position while the main tray is held at the inserted position; a clamp device for clamping an optical disc resting on the subtray then drawn to the loaded position; an elevating means for selectively lifting and lowering the loading drive means in a direction in which the subtrays are stacked on the main tray so that the arbitrarily chosen subtray may be drawn from the stand-by position towards the loaded position; a fixed guide provided in the drive housing for guiding each of the subtrays during movement of the respective subtray from the stand-by position towards the loaded position; and a pressing means engageable with a rear end of the arbitrarily chosen subtray shortly before completion of loading to depress the rear end of the arbitrarily chosen subtray downwardly. In this apparatus, each of the subtrays has a first projection defined in an upper surface thereof and a second projection and a recess both defined in a lower surface thereof, the recess being positioned at a terminating portion of a slide face and operable to receive therein the fixed guide.

Thus, when the n-th subtray counted from the lowermost subtray is to be drawn from the stand-by position towards the loaded position, and prior to a space between the n-th subtray and the subtray immediately above the n-th subtray being expanded as a result of engagement of the first projection on the n-th subtray with the second projection on the subtray immediately above the nth subtray to push such subtray immediately above the n-th subtray upwardly, the fixed guide is positioned in alignment with the recess in the n-th subtray and the rear end of the n-th subtray contacts the pressing means. This is particularly advantageous in that the a mount of lift of the subtray immediately above the n-th subtray can be minimized to permit the apparatus as a whole to be assembled compact.

BRIEF DESCRIPTION OF THE DRAWINGS

The above and other objects and features of the present invention will become clear from the following description taken in conjunction with preferred embodiments thereof with reference to the accompanying drawings, in which like parts are designated by like reference numerals, and in which:

FIGS. 13A to 13E are schematic side views of the optical disc drive apparatus, showing a right guide plate slidable along a right side wall of the drive housing to assume one of different positions corresponding respectively to the positions of the stacked subtrays on the main tray;

FIGS. 18A to 18D are views similar to FIGS. 16A to 16D, showing how the first to fourth holder levers are positioned relative to the associated subtrays when the optical disc resting on the subtray immediately below the uppermost subtray is in position to be played back;

FIGS. 52A and 52B are schematic side sectional view, showing the stacked subtrays on the main tray separated from and moving past a fixed guide block, respectively;

FIGS. 59A to 59D are views similar to FIGS. 16A to 16D, respectively, showing how first to fourth holder levers of the modified subtray holder are positioned relative to the associated subtrays when the optical disc resting on the uppermost one of the subtrays is in position to be played back;

DETAILED DESCRIPTION OF THE EMBODIMENTS

While various components of the optical disc drive apparatus according to the present invention will be described later item by item under separate headings, the principle thereof will first be described with reference to FIGS. 1 to 34.

Figure 1A:
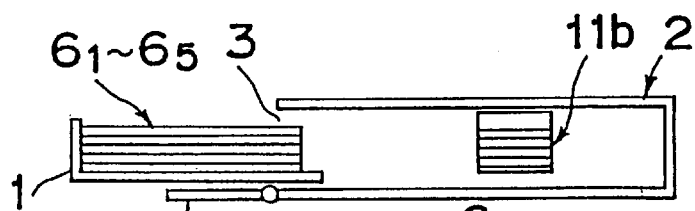
FIGS. 1A to 1D are schematic diagrams showing a sequence of how a main tray having a stack of subtrays mounted thereon is moved from a withdrawn position to an inserted position relative to a drive housing.
Figure 1B:
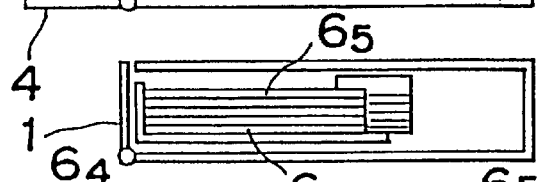
Figure 1C:
Figure 1D:
Figure 2:
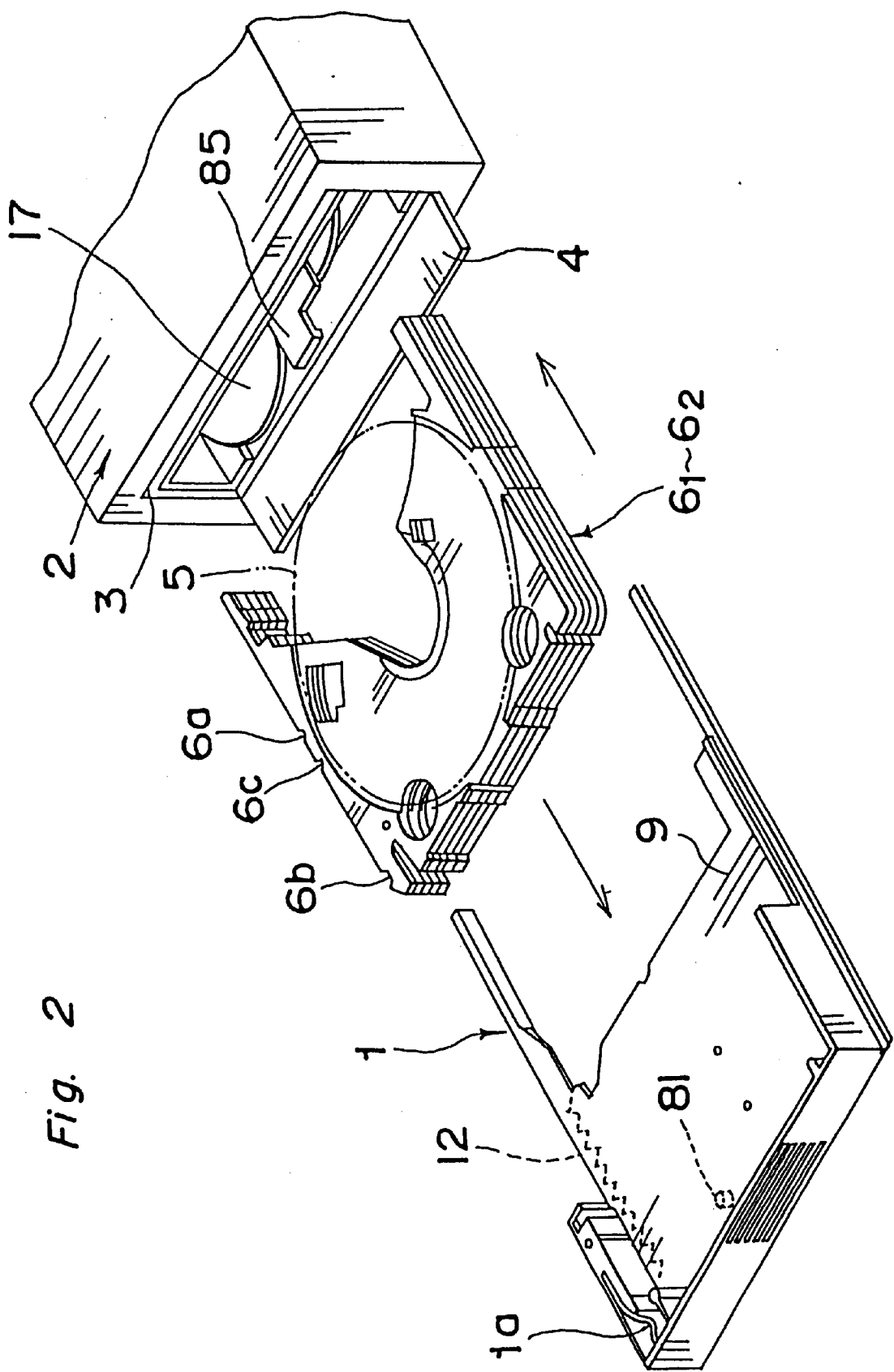
FIG. 2 is a schematic perspective view showing an optical disc drive apparatus embodying the present invention with the main tray, the stacked subtrays and a portion of the drive housing shown as separated from each other.

As best shown in FIG. 2, the optical disc drive apparatus comprises a drive housing 2 of a generally rectangular box-like configuration having a disc chamber defined therein and also having a generally rectangular front opening 3 through which the disc chamber opens to the outside of the drive housing 2. The drive housing 2 includes a complementary shaped front door 4 for selectively opening and closing the front opening 3 which is normally biased by a suitable biasing element such as, for example, a spring so as to close the front opening 3, and a main tray 1 adapted to be driven by a drive means between a withdrawn position, in which the main tray 1 is positioned outside the drive housing 2 as shown in FIG. 1A, and an inserted position in which the main tray 1 is positioned inside the drive housing 2 as shown in FIGS. 1B to 1D.

When the main tray 1 is in the withdrawn position, a plurality of, for example, five, subtrays $6_1$ to $6_5$ each carrying an information bearing optical disc 5, as best shown in FIG. 2, can be stacked on the main tray 1. When information on any one of the optical discs 5 is desired to be read out or reproduced, the stack of the subtrays $6_1$ to $6_5$ on the main tray 1 must be held at a stand-by position as shown in FIGS. 1B to 1D with the main tray 1 moved to the inserted position. The number of the subtrays that can be stacked on the main tray 1 may be of any desired value unless it exceeds the maximum available capacity of the main tray 1 which is, in the illustrated embodiment, chosen to be five for illustrative purpose, each subtray having the respective optical disc 5 placed thereon.

Where information on any one of the optical discs 5 is desired to be reproduced, this is possible only when the main tray 1 carrying the subtrays $6_1$ to $6_5$ is moved to the inserted position with the stack of the subtrays $6_1$ to $6_5$ brought to the inserted position and one of the subtrays carrying such one of the optical discs 5, for example, the subtray $6_5$, must be subsequently drawn to a loaded position as shown in FIG. 1C. When the subtray $6_5$ is so drawn to the loaded position, the optical disc 5 on such subtray $6_5$ is clamped to a disc drive unit (not shown) so that such optical disc can be driven in one direction about a spindle in any known manner.

Figure 3:
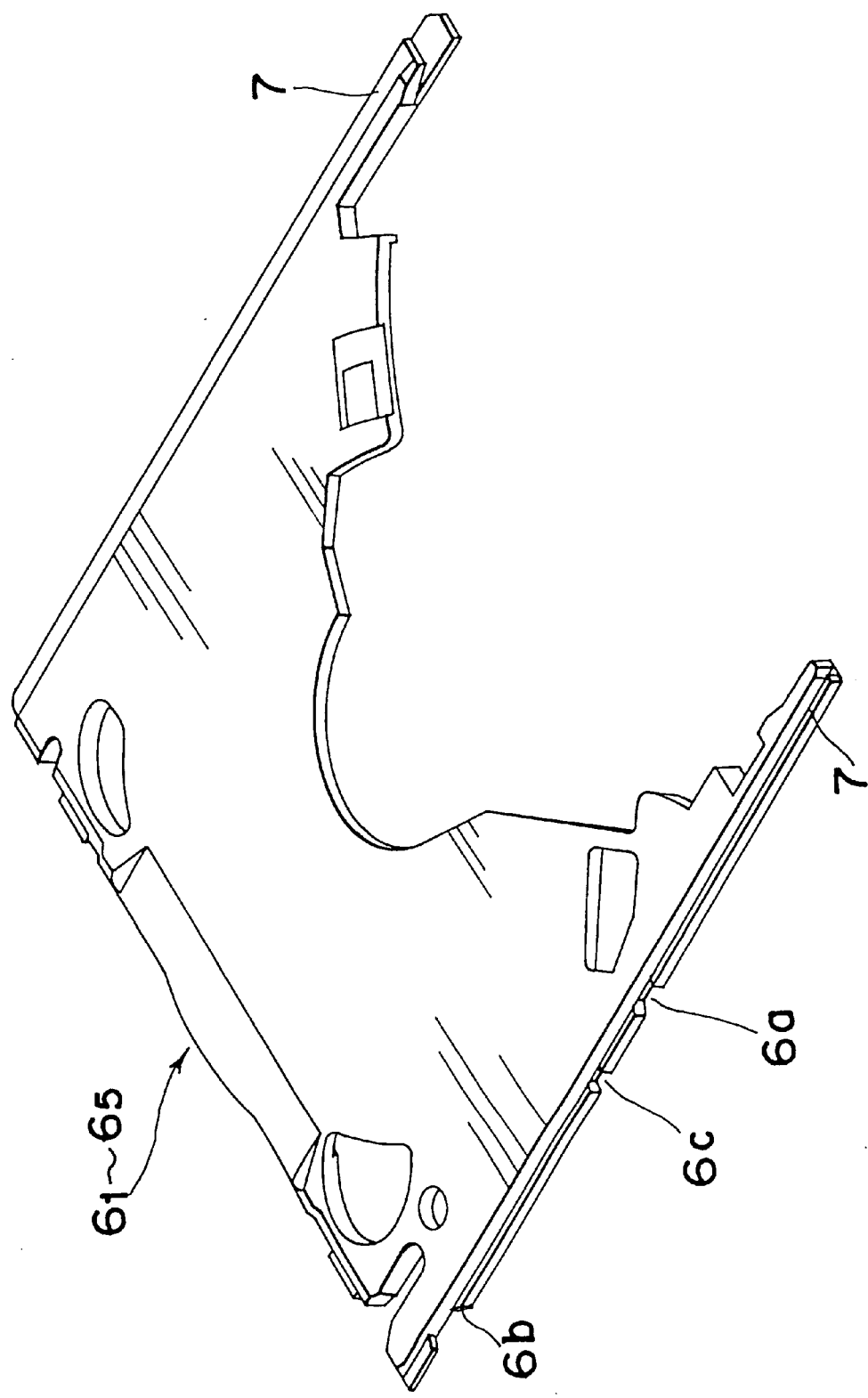
FIG. 3 is a schematic perspective view of one of the subtrays employed in the present invention, as viewed from the bottom.
Figure 19:
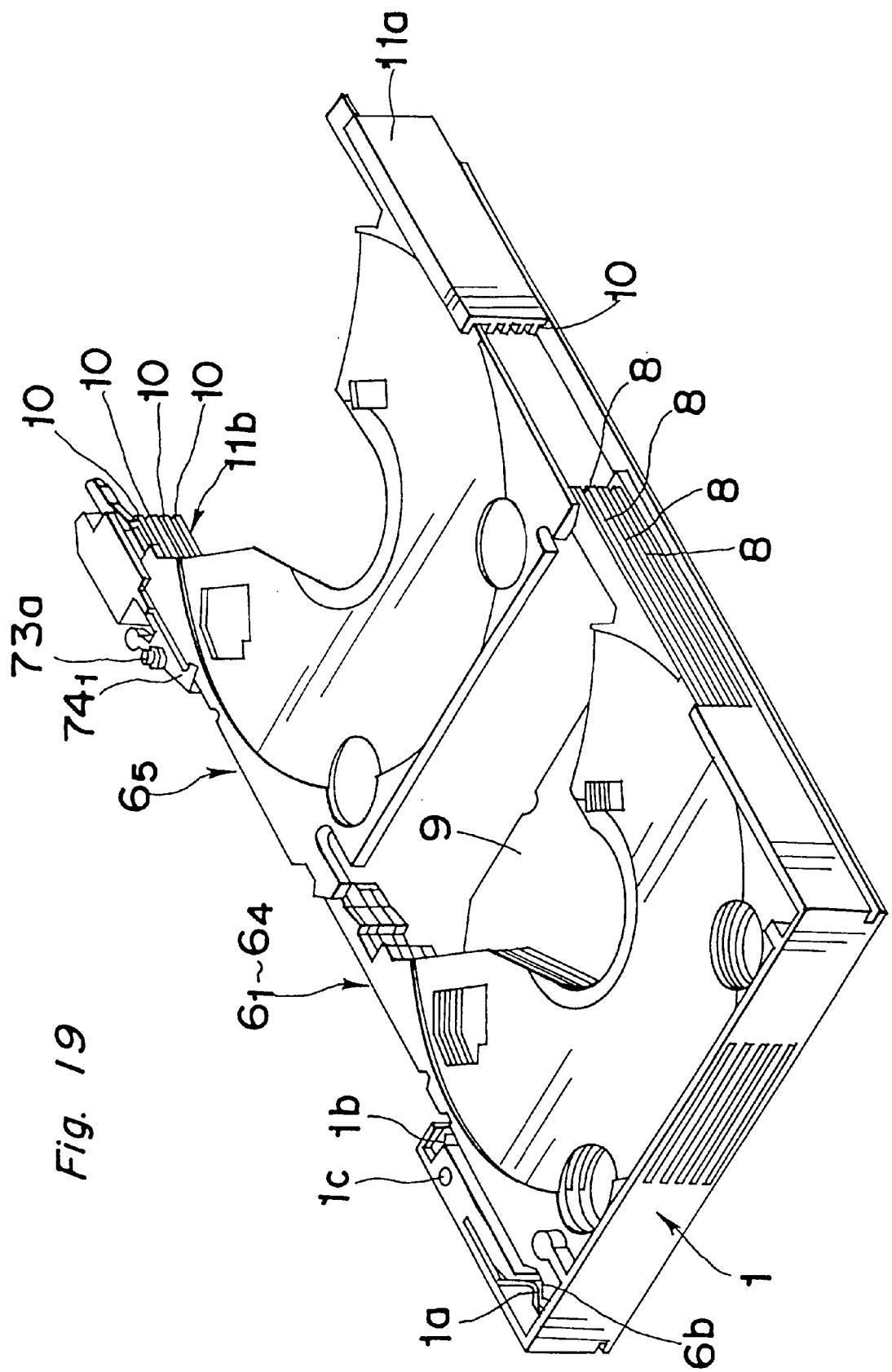
FIG. 19 is a perspective view of the main tray as withdrawn to the withdrawn position leaving only the uppermost subtray at the stand-by position inside the drive housing.
Figure 20:
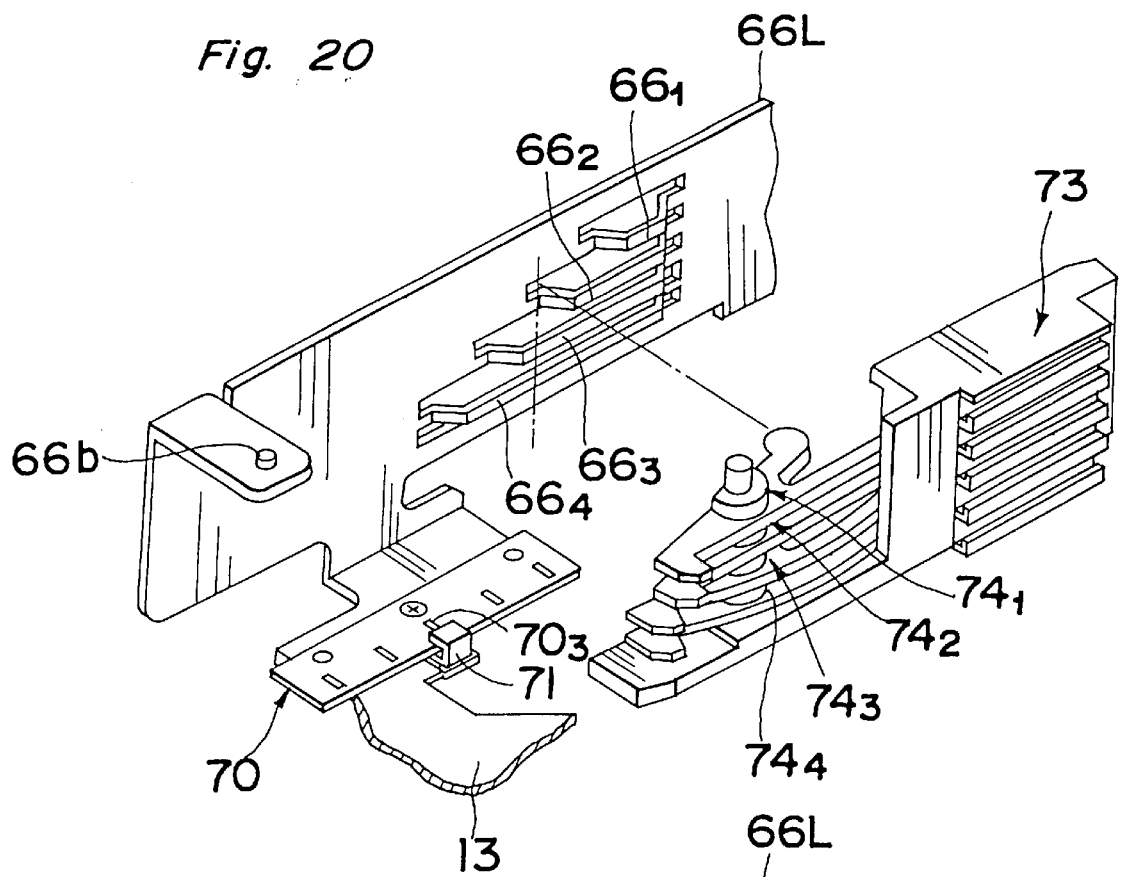
FIG. 20 is an exploded view of the subtray holder held at a position ready to permit the third subtray to be drawn towards the loaded position.
Figure 23:
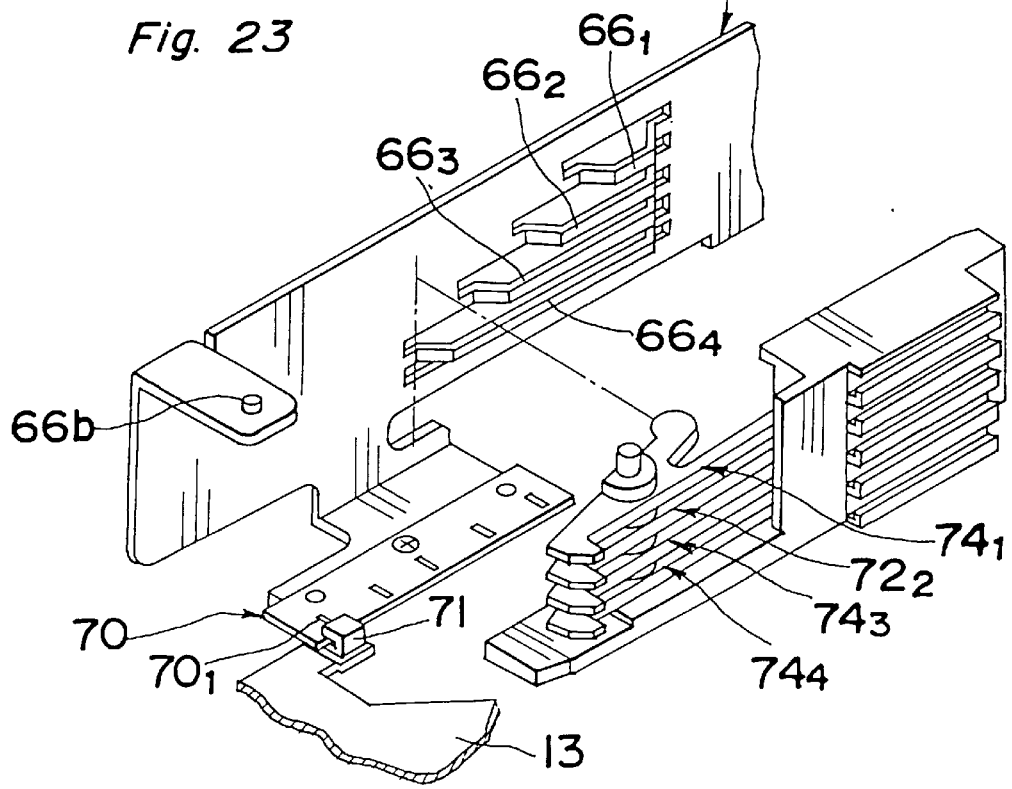
FIG. 23 is a view similar to FIG. 20, with the subtray holder held at a position ready to permit the lowermost subtray to be drawn towards the loaded position.

As best shown in FIG. 3, each of the subtrays $6_1$ to $6_5$ has its opposite side edges formed with a substantially L-sectioned support step 7 and extending from a portion adjacent the front edge thereof towards another portion adjacent the rear edge thereof so that, when the plural subtrays $6_1$ to $6_5$ are stacked on the main tray 1, the support steps 7 on each side of the stack of the subtrays $6_1$ to $6_5$ can define a generally U-shaped guide groove 8 between the neighboring members of the stacked subtrays $6_1$ to $6_5$ as best shown in FIG. 19, the guide groove 8 opening laterally outwardly of the stack of the subtrays $6_1$ to $6_5$. It is to be noted that although the guide grooves 8 referred to above are formed on both sides of the stacked subtray assembly, no guide groove is needed between only a right-hand side edge of the lowermost one of the stacked subtrays, that is, the subtray $6_1$, and a subtray receiving surface or bottom surface 9 of the main tray 1.

Figure 4:
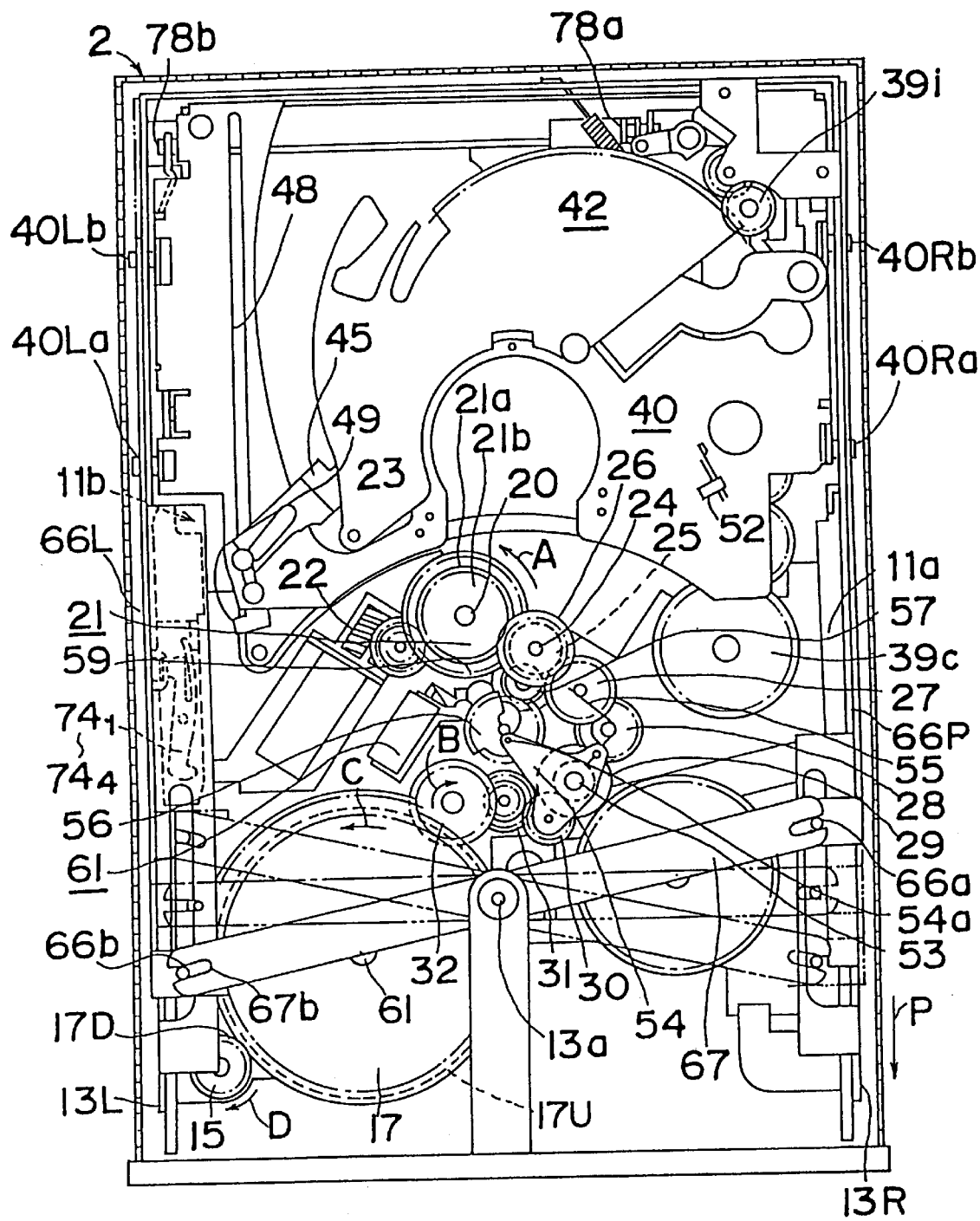
FIG. 4 is a plan view of the optical disc drive apparatus embodying the present invention, with the main tray removed.
Figure 15:
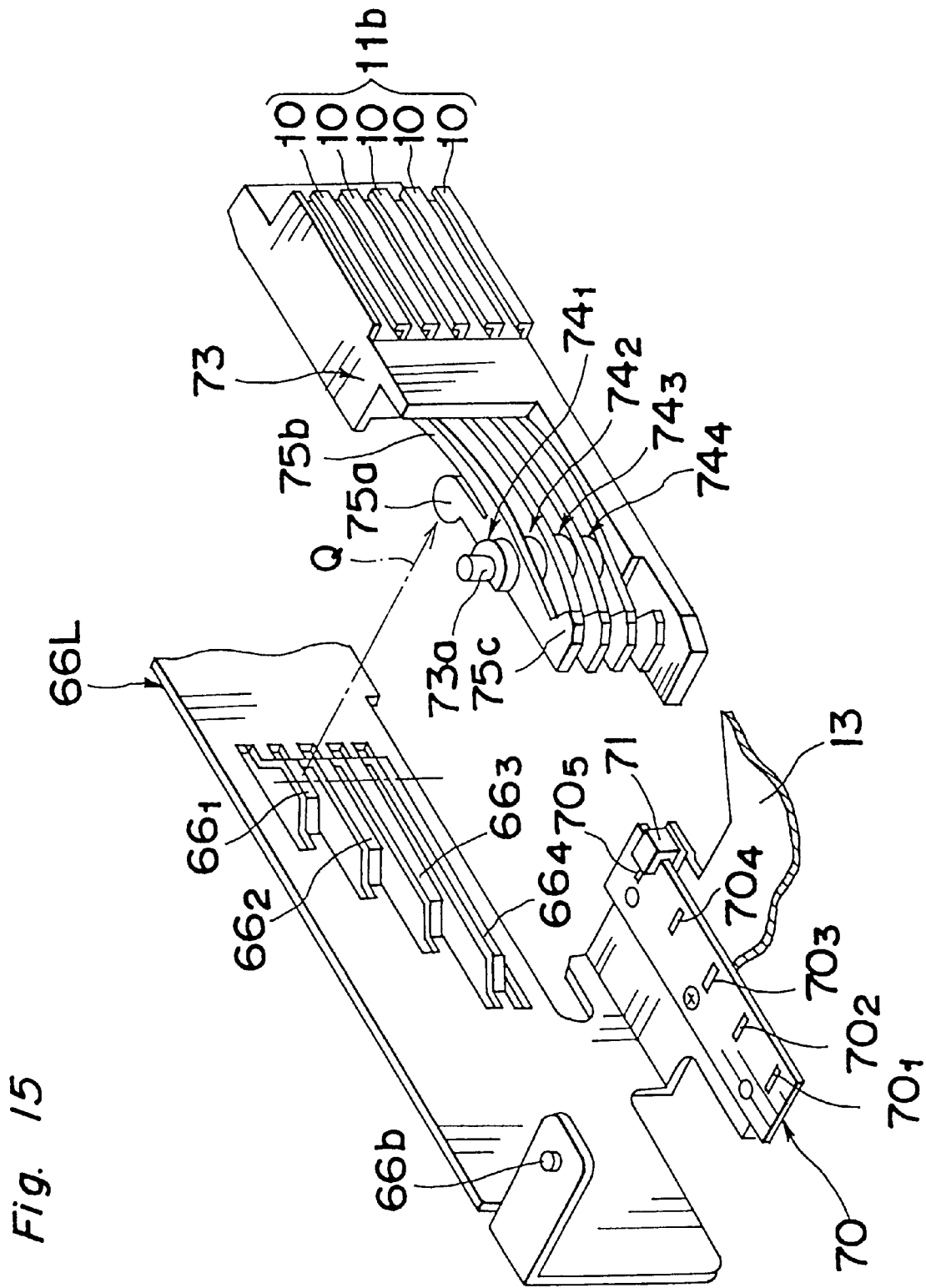
FIG. 15 is an exploded view of a subtray holder employed in the optical disc drive apparatus.
Figure 16A:
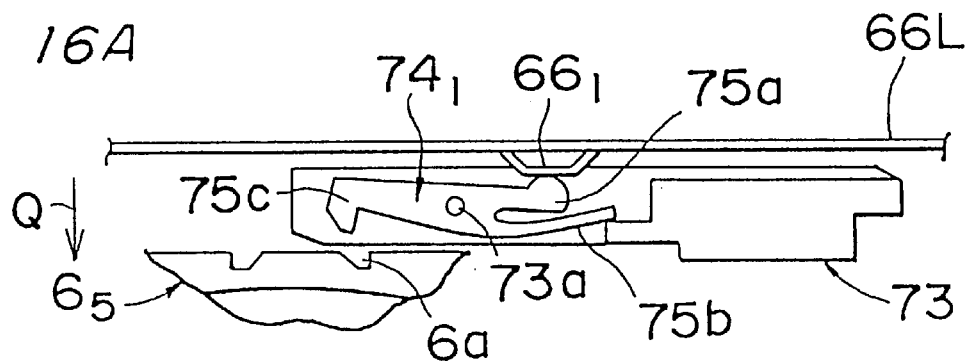
FIGS. 16A to 16D are fragmentary top plan views, showing how first to fourth holder levers are positioned relative to the associated subtrays when the optical disc resting on the uppermost one of the subtrays is in position to be played back.
Figure 16B:
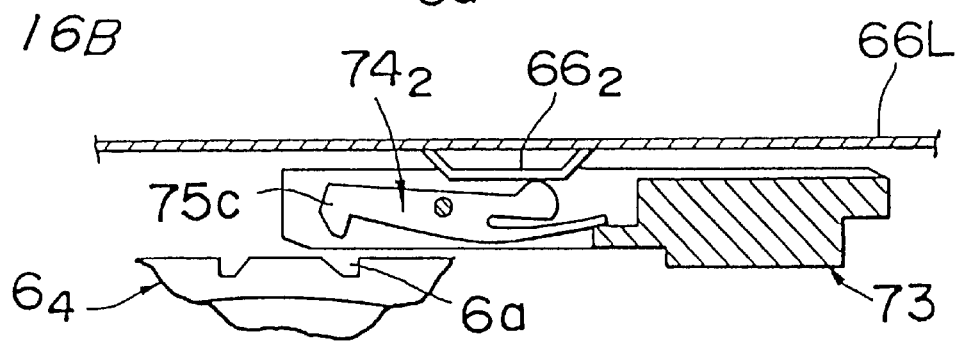
Figure 16C:
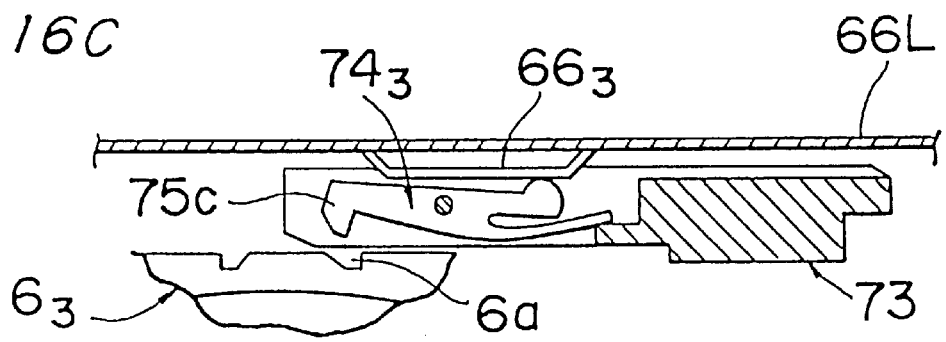
Figure 16D:
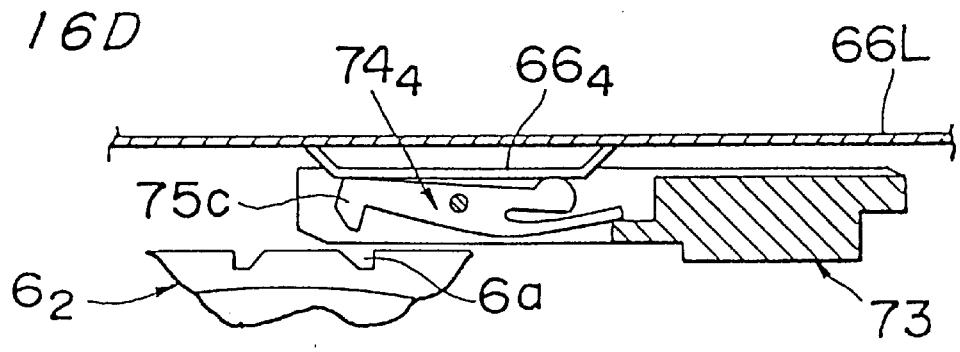

Referring to FIGS. 4, 15 and 19, the drive housing 2 includes a chassis 13 installed inside the drive housing 2 and including right and left side walls 13L and 13R having respective fixed guide blocks 11a and 11b secured thereto so as to confront the disc chamber. Each fixed guide block 11a or 11b has a plurality of parallel ribs 10 formed therein which can be engaged slidingly in the respective guide grooves 8 in the stacked subtray assembly when the main tray 1 carrying the stacked subtrays $6_1$ to $6_5$ is moved to the inserted position with the stacked subtrays $6_1$ to $6_5$ consequently held at the stand-by position.

Replacement of the optical disc 5 on any one of the subtrays $6_1$ to $6_5$ with a different optical disc, while as shown in FIG. 1B the main tray 1 carrying the stacked subtrays $6_1$ to $6_5$ is held at the inserted position, or while one of the subtrays $6_1$ to $6_5$ on the main tray 1 then held at the inserted position is drawn from the stand-by position towards the loaded position as shown in FIG. 1C, can be carried out in the following manner.

Figure 1E:
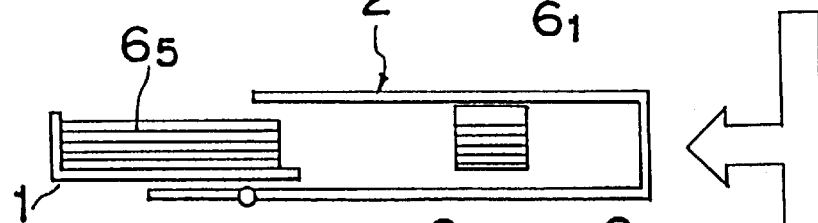
FIGS. 1E to 1I are schematic diagrams showing how the subtrays stacked on the main tray are when optical discs resting on the subtrays are to be removed or replaced, respectively, in accordance with a disc changing method of the present invention.

Assuming that one of the stacked subtrays $6_1$ to $6_5$ is held at the loaded position, the one of the stacked subtrays $6_1$ to $6_5$ has to be returned to the stand-by position before replacement of the optical disc on such one of the subtrays is carried out. By way of example, assuming that the uppermost one of the subtrays, that is, the subtray $6_5$, is held at the loaded position as shown in FIG. 1C, replacement of the optical disc 5 on the uppermost subtray $6_5$ is carried out after the uppermost subtray $6_5$ is returned to the stand-by position and the main tray 1 carrying the stacked subtrays $6_1$ to $6_5$ is subsequently moved back to the withdrawn position as shown in FIG. 1E. Once the main tray 1 is moved back to the withdrawn position as shown in FIG. 1E, the optical disc 5 resting on the uppermost subtray $6_5$ is readily exposed to the outside and, therefore, the optical disc 5 on the uppermost subtray $6_5$ can readily be replaced with a different optical disc.

Figure 1F:
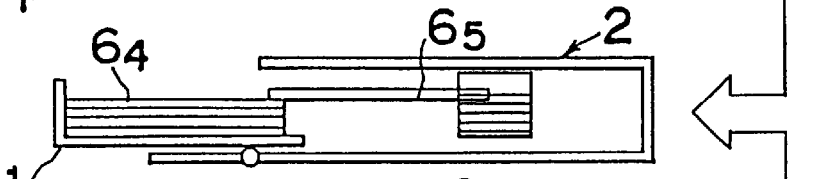

On the other hand, where the optical disc 5 on one of the subtrays intervening between the uppermost and lowermost subtrays $6_5$ and $6_1$ is desired to be replaced, for example, where the optical disc 5 on the fourth subtray $6_4$ immediately below the uppermost subtray $6_5$ is desired to be replaced, the main tray 1 carrying the subtrays $6_4$, $6_3$, $6_2$ and $6_1$ is moved back to the withdrawn position leaving only the uppermost subtray $6_5$ at the stand-by position as shown in FIG. 1F, so that when the main tray 1 is brought to the withdrawn position the optical disc 5 resting on the fourth subtray $6_4$ can be exposed to the outside and can, therefore, be readily replaced.

The uppermost subtray $6_5$, left at the stand-by position as shown in FIG. 1F during the replacement of the optical disc on the fourth subtray $6_4$ as discussed above, is held there and retained substantially horizontally with its rear ends supported by the associated ribs 10 of the fixed guide blocks 11a and 11b and with its front edge resting on respective rear ends of the subtrays $6_1$ to $6_4$ remaining on the main tray 1 then moved to the withdrawn position.

Figure 1G:
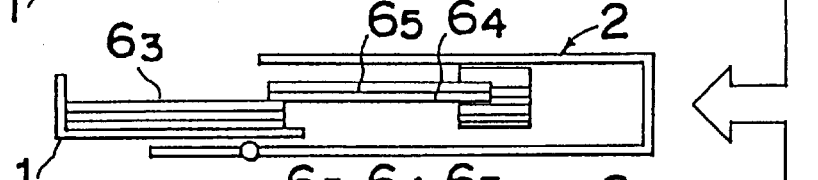
Figure 1H:
Figure 1I:

Replacement of the optical disc 5 on any one of the subtrays $6_3$, $6_2$ and $6_1$ can be carried out in a manner similar to that described above. Briefly speaking, replacement of the optical disc 5 on the subtray $6_3$, $6_2$ or $6_1$ is carried out by leaving the uppermost and fourth subtrays $6_5$ and $6_4$, the uppermost, fourth and third subtrays $6_5$, $6_4$ and $6_3$, or the uppermost, fourth, third and second subtrays $6_5$, $6_4$, $6_3$ and $6_2$, at the stand-by positions and then moving the main tray 1 carrying the subtrays $6_3$, $6_2$ and $6_1$, the subtrays $6_2$ and $6_1$, or only the lowermost subtray $6_1$, back to the withdrawn position, respectively, as shown in FIGS. 1G, 1H or 1I.

As described above, while the optical disc drive apparatus of the present invention is so designed as to allow the plural subtrays to be mounted on the main tray in a stacked fashion and as to allow the plural subtrays to be accommodated within the disc chamber together with the main tray then moved to the inserted position, one of the subtrays which carries the optical disc to be replaced can be exposed to the outside when the main tray is moved back to the withdrawn position. Thus, the optical disc drive apparatus of the present invention has an excellent operation. In addition, the optical disc drive apparatus of the present invention can accommodate an increased number of the subtrays since the plural subtrays can be stacked on the main tray 1 in a reasonable fashion, making it possible to accomplish maximized utilization of the limited space.

Hereinafter, the various components of the optical disc drive apparatus of the present invention effective to accomplish the foregoing principle of disc replacement will be described in detail.

Drive System for Main Tray 1

Figure 5:
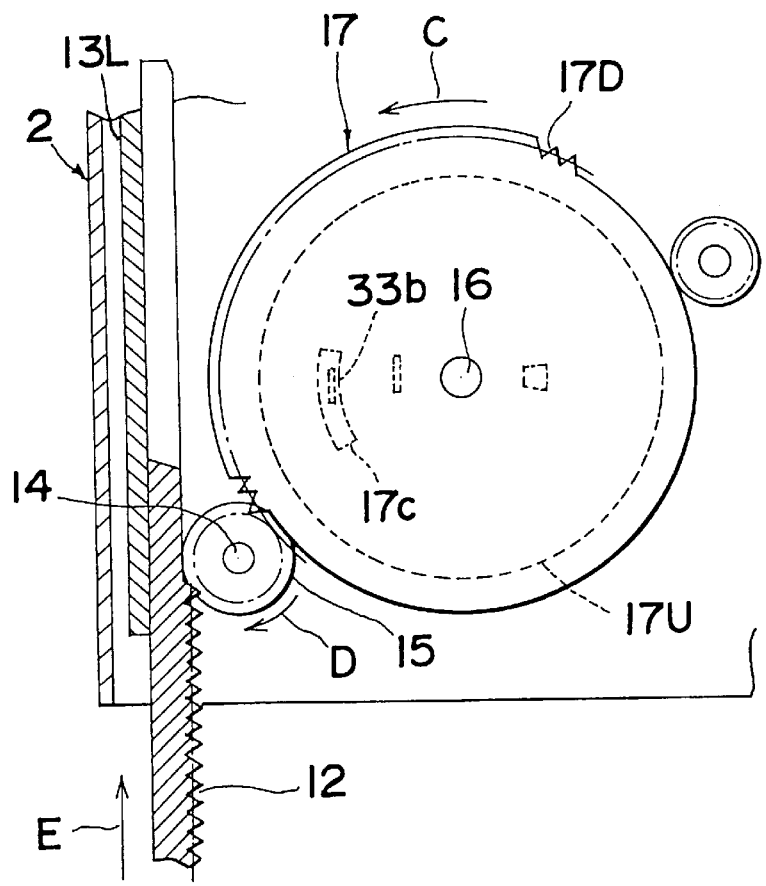
FIG. 5 is a schematic plan view, on an enlarged scale, showing a main tray drive mechanism employed in the optical disc drive apparatus, with a main gear assembly held at one operative position.
Figure 6:
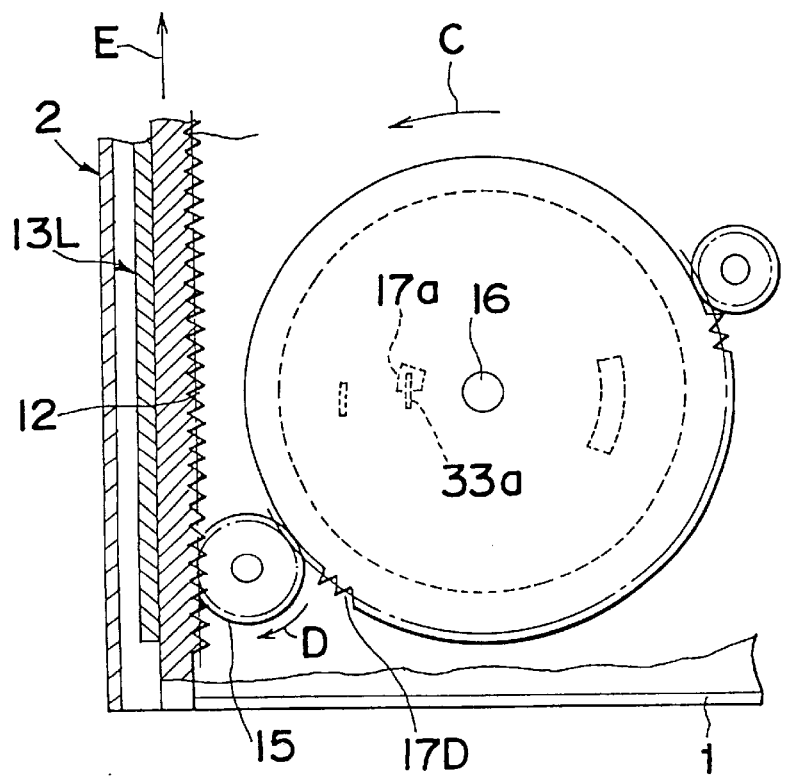
FIG. 6 is a view similar to FIG. 5, showing the main gear assembly held at a different operative position.

As best shown in FIG. 2, a rack 12 is formed on an undersurface of the main tray 1 so as to extend along at least one side edge, for example, a left side edge, thereof in a direction lengthwise of the main tray 1, i.e., in a direction conforming to the direction of movement thereof between the withdrawn and inserted positions. In the condition in which the main tray 1 is set in the drive housing 2, the rack 12 is, as best shown in FIGS. 5 and 6, drivingly engaged with a pinion gear 15 that is rotatably mounted on a pin 14 secured to the chassis 13 of the drive housing 2 and that is drivingly coupled with a main gear assembly 17.

The main gear assembly 17 is rotatable about a pin 16 secured to the chassis 13 and is comprised of an upper and a lower gear wheel formed coaxially therewith. The upper gear wheel has a toothless portion and a toothed portion 17D, whereas the lower gear wheel is in the form of a spur gear 17U. The pinion gear 15 meshed with the rack 12 is engageable with the toothed portion 17D of the upper gear wheel of the main gear assembly 17 so that when the pinion gear 15 is drivingly engaged with the toothed portion 17D a driving force of a drive motor 19 (FIG. 12) can be transmitted to the pinion gear 15 and in turn to the rack 12 through a gear 32 that is, as shown in FIG. 4, meshed with the lower gear wheel of the main gear assembly 17, that is, the spur gear 17U.

The chassis 13 has a pin 20 secured thereto, on which a friction gear assembly 21 is rotatably mounted. This friction gear assembly 21 may be of a design utilizing any known friction mechanism and includes input and output gears 21a and 21b rotatably mounted on the pin 20 in coaxial relation with each other, a friction element such as, for example, a piece of felt (not shown) interposed between the input and output gears 21a and 21b, and a biasing element (also not shown) such as, for example, a coil spring, for urging one of the input and output gears 21a and 21b towards the other of the input and output gears 21a and 21b.

Figure 12:
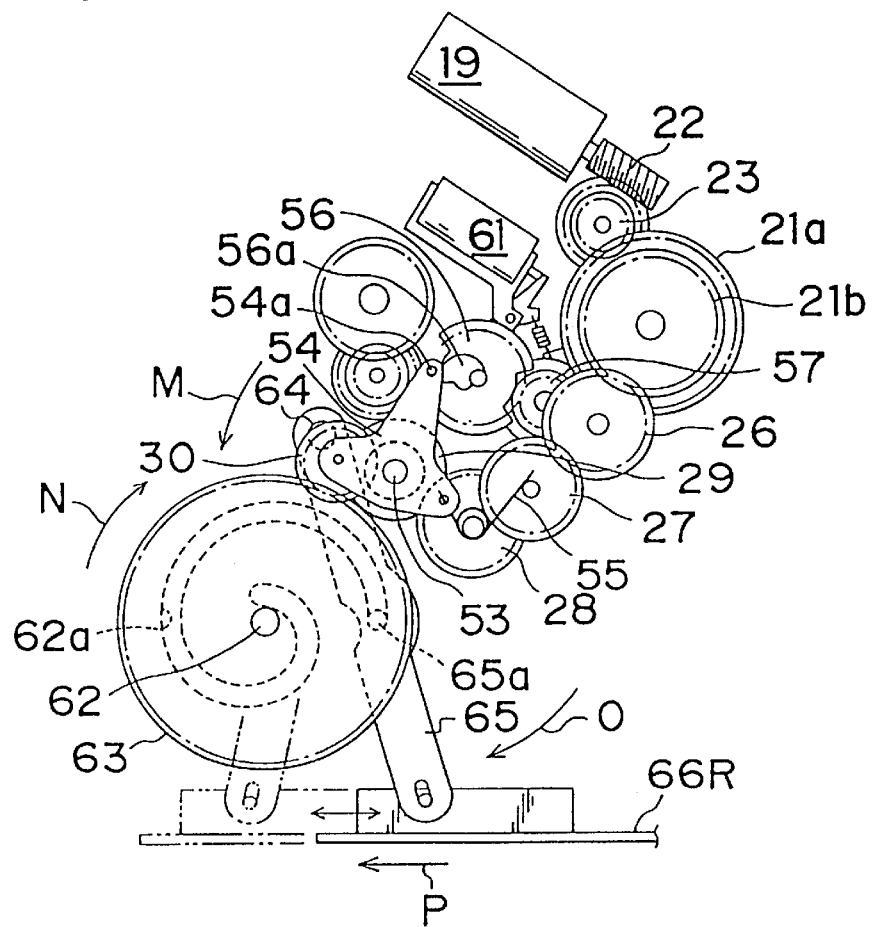
FIG. 12 is a fragmentary plan view of the optical disc drive apparatus, showing an elevating mechanism for selectively lifting and lowering the loading drive mechanism.

As shown in FIG. 12, a worm 22 mounted on a drive shaft of the drive motor 19 is meshed with the input gear 21a of the friction gear assembly 21 through an intermediate gear 23. Lower and upper gears 25 and 26 (FIG. 4) are coaxially rotatably mounted on a pin 24 secured to the chassis 13 and are respectively meshed with the input and output gears 21a and 21b of the friction gear assembly 21. Unless slip takes place between the input and output gears 21a and 21b of the friction gear assembly 21, the lower and upper gears 25 and 26 rotate together with each other about the pin 24.

Accordingly, when the drive motor 19 is driven in a first direction, the friction gear assembly 21 is rotated in a direction shown by the arrow A and the gear 32 is thus driven in a direction shown by the arrow B through gears 26, 27, 28 and 29, then through an idler gear 30 and finally through a gear 31. Since the gear 32 is meshed with the spur gear 17U of the main gear assembly 17 as hereinbefore described, the main gear assembly 17 is rotated in a direction shown by the arrow C and subsequently causes the toothed portion 17D of the upper gear wheel thereof to engage with the pinion gear 15, the pinion gear 15 being consequently rotated in a direction shown by the arrow D. Upon rotation of the pinion gear 15 in the direction of the arrow D, the main tray 1 is driven towards the inserted position in a direction shown by the arrow E shown in FIGS. 5 and 6.

A control unit (not shown) is so designed that upon arrival of the main tray 1 at the inserted position as shown in FIG. 6, a microswitch 33a fitted to the chassis 13 as shown in FIG. 6 can be activated by a feeler 17a formed integrally with an undersurface of the main gear assembly 17 to deenergize the drive motor 19 with the main tray 1 consequently held at the inserted position. During this movement of the main tray 1 from the withdrawn position towards the inserted position, an elevating unit of a loading drive system as will be described later is held at an uppermost one of plural operative positions, at which the uppermost subtray $6_5$ can be loaded, as will be described later.

Figure 7:
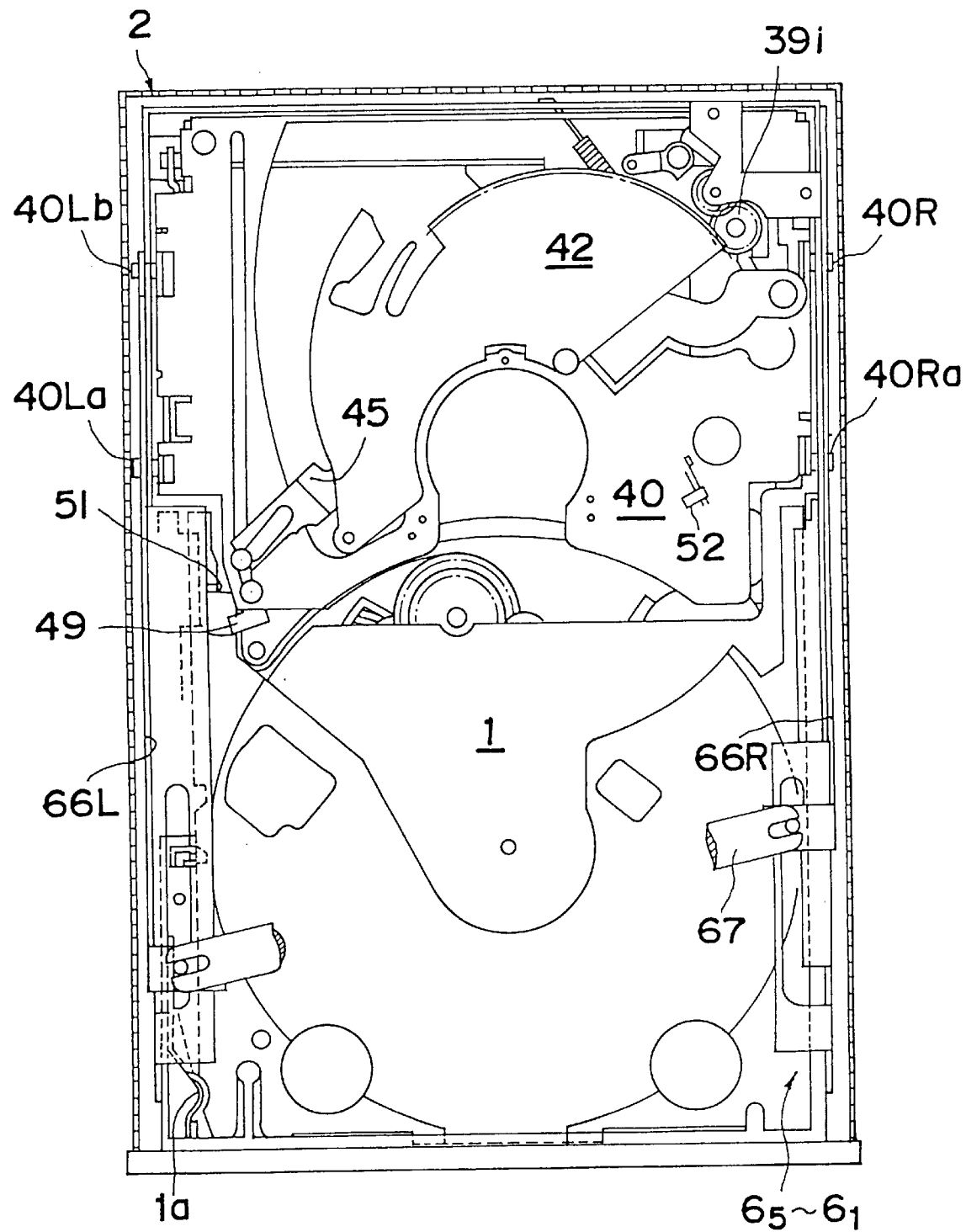
FIG. 7 is a plan view of the optical disc drive apparatus with the main tray held at the inserted position inside the drive housing.
Figure 8:
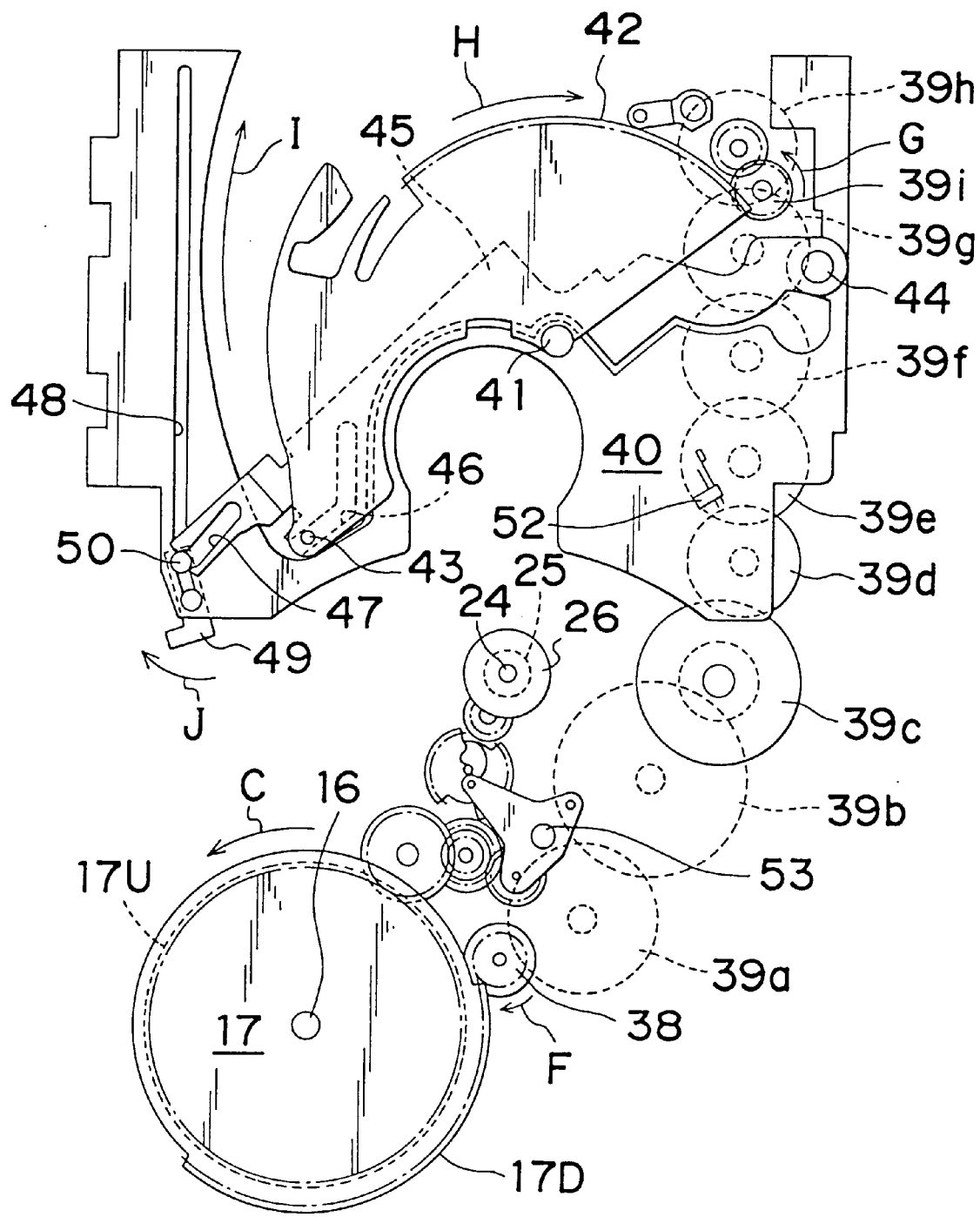
FIG. 8 is a fragmentary plan view showing a drive gear system employed in the optical disc drive apparatus with a sector gear held at one operative position.
Figure 9:
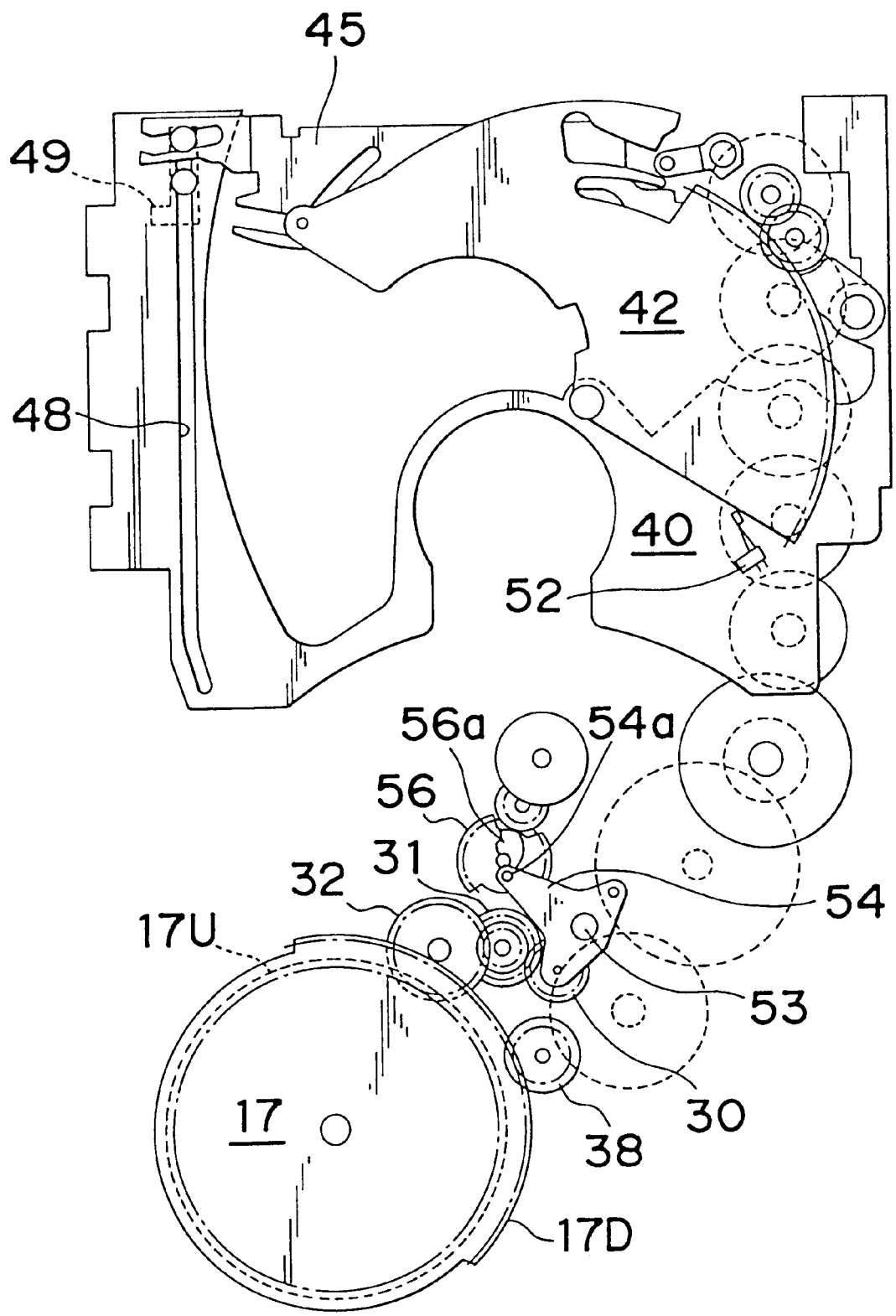
FIG. 9 is a view similar to FIG. 8, showing the sector gear held at a different operative position.

Drive System for Loading Subtrays

Where the optical disc 5 placed on the uppermost subtray $6_5$ with the main tray 1 held at the inserted position is to be loaded, with the uppermost subtray $6_5$ drawn from the stand-by position to a loaded position, the pinion gear 15 is disengaged from the toothed portion 17D of the upper gear wheel of the main gear assembly 17 and is instead aligned with the toothless portion of the upper gear wheel as shown in FIG. 6 upon arrival of the main tray 1 at the inserted position as shown in FIG. 7. When during this condition a command is given to the control unit to load the uppermost subtray $6_5$ to the loaded position, the drive motor 19 is driven in the first direction to rotate the gear 32 in the direction of the arrow B through the gear train. Consequently, the main gear assembly 17 is rotated in the direction of the arrow C with the spur gear 17D of the main gear assembly 17 consequently meshed with a gear 38 as shown in FIGS. 8 and 9 to drive the latter in a direction shown by the arrow F. Rotation of the gear 38 is then transmitted to a gear 39c through first and second intermediate gears 39a and 39b, rotatably secured to the undersurface of the chassis 13, and then to a gear 39i through a gear train including gears 39d, 39e, 39f, 39g and 39h all rotatably mounted on an upper surface of the chassis 13, to drive the gear 39i in a direction shown by the arrow G.

The gear 39i is meshed with a sector gear 42 pivotally mounted through a pin 41 on an elevating table 40 of a loading drive system and, therefore, when the gear 39i is driven in the direction of the arrow G in the manner described above, the sector gear 42 pivots from a first position towards a second position in a direction shown by the arrow H. The sector gear 42 carries a pin 43 fixedly mounted on one end of the sector gear 42, which pin 43 is relatively movably engaged in a cut groove 46 defined in a motion translating lever 45 journalled at one end thereof to the elevating table 40 through a pin 44 as shown in FIG. 8. Accordingly, as the sector gear 42 is pivoted in a direction shown by the arrow H about the pin 41, the motion translating lever 45 is pivoted about the pin 44 from a position shown in FIG. 8 towards a position shown in FIG. 9 in a direction shown by the arrow I.

Another cut groove 47 defined in one end of the motion translating lever 45 remote from the pin 44 and adjacent the cut groove 46 receives therein a pin 50 fixed on a loading hook member 49 that is slidably engaged in a longitudinal guide slot 48 defined in the elevating table 40 so as to extend in a direction parallel to the direction of insertion of the main tray 1. Accordingly, as the motion translating lever 45 is pivoted about the pin 44 in the direction of the arrow I, the loading hook member 49 is guided along a bent region of the longitudinal guide slot 48 that is defined at a front end thereof, and is, upon escape of the loading hook member 49 from the bent region of the guide slot 48, pivoted about the pin 50 in a direction shown by the arrow J so as to enter a straight region of the guide slot 48 before the loading hook member 40 attains the position shown in FIG. 9.

As the loading hook member 49 is moved from a position shown in FIGS. 7 and 8 towards the position shown in FIG. 9, the loading hook member 49 is engaged with an engagement 51 formed integrally with and defined at a left rear end of the subtray $6_5$ and then draws only the subtray $6_5$ from the stand-by position towards the loaded position. When the sector gear 42 is pivoted to the second position as shown in FIG. 9 with the subtray drawn from the stand-by position within the main tray 1 to the loaded position, the opposite end of the sector gear 42 remote from the end thereof where the pin 43 is fixedly mounted is brought into abutment with a leaf switch 52 secured to the elevating table 40 of the loading drive system. The control unit detects abutment of that end of the sector gear 42 against the leaf switch 52 to halt the drive motor 19, having then driven in the first direction.

Figure 25:
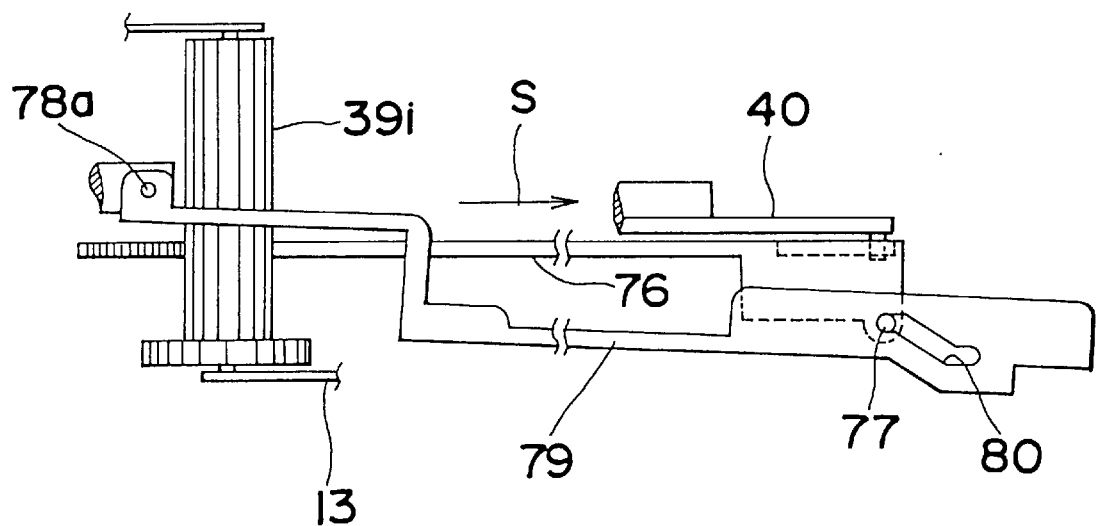
FIGS. 25 and 26 are fragmentary side views, showing a drive system for a disc clamp device in different operative positions.

It is to be noted that the gear 39i that drives the sector gear 42 in the manner described above is engaged with a clamp drive rack 76 as shown in FIG. 25 and that a pin 77 secured to one end of the clamp drive rack 76 remote from the gear 39i is slidingly engaged in a cam groove 80 defined in one end of a clamp support plate 79 having the opposite end rockingly supported by the elevating table 40 by means of pins 78a and 78b as shown in FIG. 4.

Figure 26:
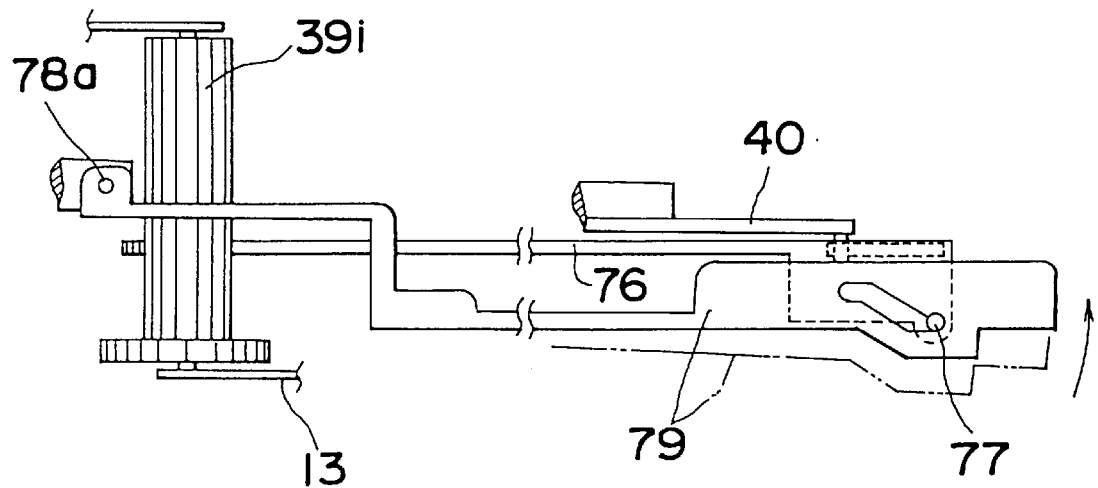

Thus, when the clamp drive rack 76 is slid in a direction shown by the arrow S along the elevating table 40 as a result of rotation of the gear 39i, the clamp support plate 79 is pivoted from a position, shown by the phantom line in FIG. 26, about a common axis connecting between the pins 78a and 78b with the pin 77 guided along the cam groove 80 so as to approach the elevating table 40 as shown by the solid line in FIG. 26, resulting in that the optical disc 5 on the subtray $6_5$ then drawn to the loaded position is clamped by any known clamp device (not shown) so that such optical disc 5 can eventually be driven in one direction.

Figure 10:
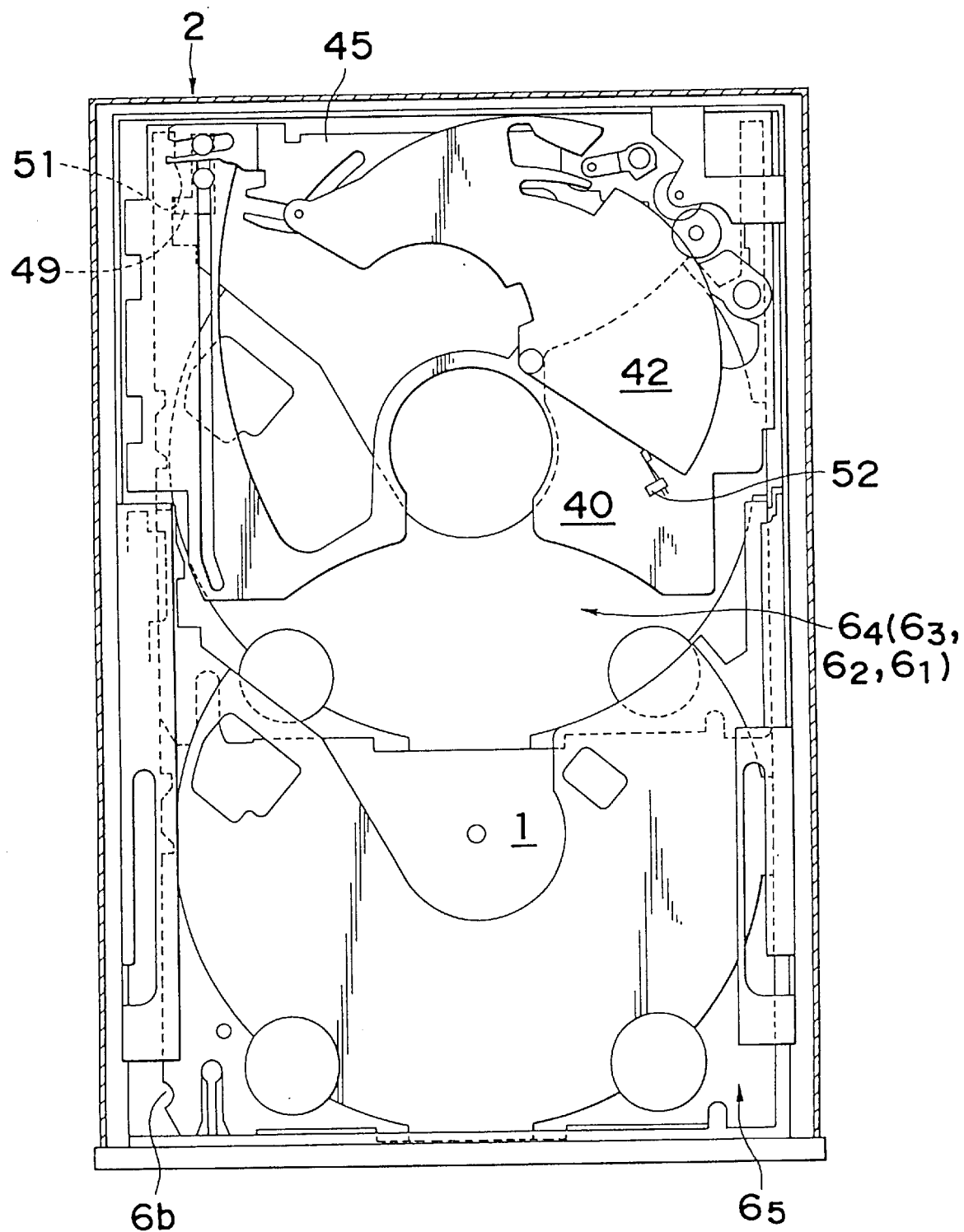
FIG. 10 is a plan view of the optical disc drive apparatus, showing one of the stacked subtrays on the main tray having been drawn to a loaded position.

In any event, where any one of the other subtrays $6_4$, $6_3$, $6_2$ and $6_1$ having the respective optical discs resting thereon is desired to be drawn to the loaded position, the elevating table 40 should be lowered to a level aligned with the optical disc accommodated in such one of the other subtrays and, thereafter, the optical disc accommodated in such one of the other subtrays has to be loaded as shown in FIG. 10 in a manner similar to that discussed in connection with the uppermost subtray $6_5$.

Elevating System of Loading Drive System

A drive system for selectively elevating and lowering the elevating table 40 while the main tray 1 is held at the inserted position is so structured and so designed as follows.

As shown in FIGS. 4 and 8, the idler gear 30 is mounted on a generally T-shaped pivot lever 54 pivotable about a pin 53 secured to the chassis 13 and is generally biased by a spring 55 so as to engage with the gear 31. This pin 53 also has the gear 29 rotatably mounted thereon and positioned below the T-shaped pivot lever 54. The position of the T-shaped pivot lever 54 is controlled by the shape of a cam member 56A integrally formed on an upper surface of an intermittent gear 56 as will be described later, since a pin 54a secured to the T-shaped pivot lever 54 is slidingly engaged with the cam member 56a. The intermittent gear 56 is of a structure wherein first and second toothless recesses 56a and 56b are formed spaced an angle of 180° from each other about the axis of rotation of the intermittent gear 56 as clearly shown in FIG. 11. It is to be noted that unless the loading drive system is in a mode of elevating or lowering the elevating table, the intermittent gear 56 is held in a position with the first toothless recess 56a aligned with a gear 57 and, therefore, the intermittent gear 56 will not be rotated.

Figure 11:
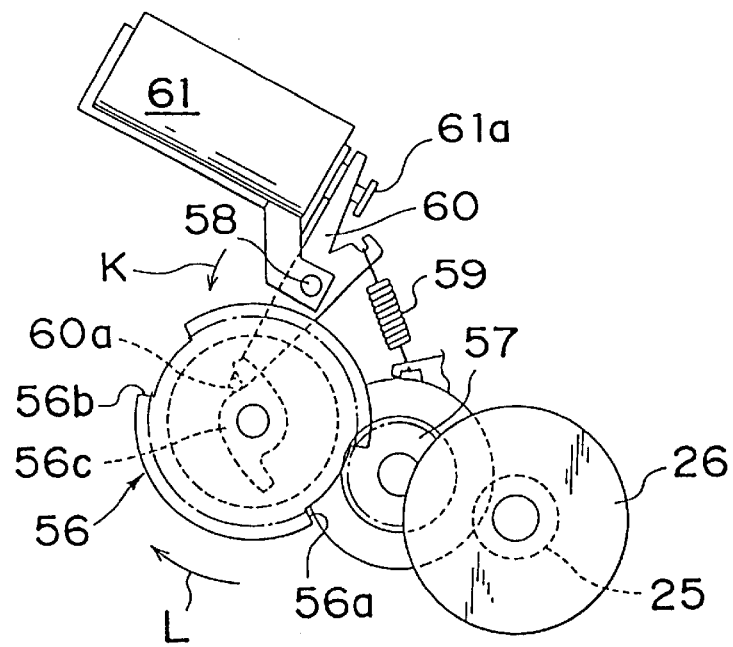
FIG. 11 is a fragmentary plan view of the optical disc drive apparatus, showing a drive motor and its associated drive switching system for selectively transmitting a drive of the motor to one of the main tray drive mechanism and a loading drive mechanism.

The intermittent gear 56 has an undersurface formed with a trigger cam member 56c of a shape as best shown in FIG. 11. Cooperable with this trigger cam member 56c is a trigger lever 60 pivotally supported at a generally intermediate portion thereof by a pin 58 secured to the chassis 13. The trigger lever 60 has one end formed with a projection 60a and the opposite end engaged with a movable piece 61a of a solenoid unit 61 and is normally biased by a tension spring 59 in one direction about the pin 58 with the projection 60a tending to separate away from the trigger cam member 60c.

In order to lower the elevating table 40 of the loading drive system, the solenoid unit 61 has to be temporarily energized to draw the movable piece 61a inwardly to cause the trigger lever 60 to pivot in a direction, shown by the arrow K in FIG. 11, about the pin 58 against the tension spring 59. As the trigger lever 50 is so pivoted against the tension spring 59, the projection 60a integral with the trigger lever 60 pushes the cam member 56c to rotate the intermittent gear 56 a slight angle in a direction shown by the arrow L until the intermittent gear 56 is brought into engagement with the gear 57. At the same time, the drive motor 19 has to be driven in the first direction.

When the drive motor 19 is thus driven in the first direction subsequent to engagement between the intermittent gear 56 and the gear 57, the intermittent gear 56 is driven in the direction shown by the arrow L and the trigger cam member 56A does therefore drive the T-shaped lever 54 in a direction shown by the arrow M about the pin 53 with the idler gear 30 consequently brought into engagement with a large-diameter gear wheel 63 to drive the latter as shown in FIG. 12. This large-diameter gear wheel 63 is rotatably supported by a pin 62 secured to the chassis 13. Once the large-diameter gear wheel 63 is so driven about the pin 62, rotation of the large-diameter gear wheel 63 continues until the intermittent gear 56 is rotated to a position where the second toothless recess 56b is aligned with the gear 57 to thereby disengage the intermittent gear 56 from the gear 57. In other words, the large-diameter gear wheel 63 is halted at the moment the second toothless recess 56b in the intermittent gear 56 then being rotated is brought into alignment with the gear 57.

When the drive motor 19 is subsequently driven in a second direction counter to the first direction to drive the friction gear assembly 21 in a direction counter to the direction of the arrow A, the large-diameter gear wheel 63 is rotated in a direction shown by the arrow N through the gear trains including the gears 26 to 29 and the idler gear 30.

Referring particularly to FIG. 12, the large-diameter gear wheel 63 has an undersurface formed with a generally helical cam groove 62a defined therein and slidably accommodating therein a guide pin 65a rigidly secured to a generally intermediate portion of a drive lever 65. This drive lever 65 has one end rotatably mounted on a pin 64 secured to the chassis 13 and the other end pivotally coupled with a lower end of a right guide plate 66R slidably supported by and positioned exteriorly of the right side wall 13R of the chassis 13 for sliding movement therealong. Accordingly, as the large-diameter gear wheel 63 is rotated in the direction of the arrow N, the drive lever 65 is pivoted about the pin 64 in a direction shown by the arrow O with the guide pin 65a slidingly guided along the helical cam groove 62a and that end of the drive lever 65 remote from the pin 64 consequently causes the right guide plate 66R to move along the right side wall 13R in a direction shown by the arrow P, that is, in a direction towards the front opening 3 of the drive housing 2.

As best shown in FIG. 4, the right guide plate 66R and a similar left guide plate 66L slidably supported by and positioned exteriorly of the left side wall 13L of the chassis 13 for sliding movement along the left side wall 13L have respective upper portions to which pins 66a and 66b are secured. Those pins 66a and 66b are loosely engaged in associated cutouts 67a and 67b defined in opposite ends of a connecting lever 67 that has an intermediate portion pivotally mounted on a pin 13a depending from a ceiling plate of the chassis 13. Accordingly, movement of the right guide plate 66R towards the front opening 3, that is, in the direction of the arrow P, is accompanied by movement of the left guide plate 66L in a direction counter to the direction of the arrow P. That is, the left and right guide plates 66L and 66R are supported for movement along the left and right side walls 13L and 13R in respective directions counter to each other depending on the direction of pivot of the connecting lever 67.

As best shown in FIG. 13A, the right guide plate 66R is formed with a pair of inclined guide grooves 68Ra and 68Rb, both extending generally parallel to each other at an angle relative to the longitudinal axis of the right guide plate 66R, and a straight guide groove 68Rc extending parallel to the longitudinal axis of the right guide plate 66R. Similarly, the left guide plate 66L is formed with a pair of inclined guide grooves 68La and 68Lb, both extending generally parallel to each other at an angle relative to the longitudinal axis of the left guide plate 66L, and a straight guide groove 68Lc extending parallel to the longitudinal axis of the right guide plate 66L. All of the inclined guide grooves 68Ra, 68Rb, 68La and 68Lb are of an identical configuration, but the inclined guide grooves 68Ra and 68Rb in the right guide plate 66R are inclined in an opposite sense relative to the inclined guide grooves 68La and 68Lb in the left guide plate 66R. This is necessitated because, as discussed previously, the right and left guide plates 66R and 66L are driven in the respective directions opposite to each other in response to the pivotal movement of the connecting lever 67 to thereby selectively lift or lower the elevating table 40 without allowing the latter to tilt relative to a plane in which the optical disc may lies.

The elevating table 4 of the loading drive system has opposite side portions to which guide pins 40Ra and 40Rb and similar guide pins 40La and 40Lb are secured, respectively, so as to extend laterally outwardly. The guide pins 40Ra and 40Rb secured to the right side portion of the elevating table 4 extend through respective vertical slots 69Ra and 69Rb, defined in the right guide plate 13L of the chassis 13, and then through the corresponding inclined guide grooves 68Ra and 68Rb also defined in the right guide plate 66R. Similarly, the guide pins 40La and 40Lb secured to the left side portion of the elevating table 40 extend through respective vertical slots 69La and 69Lb, defined in the left guide plate 13L of the chassis 13, and then through the corresponding inclined guide grooves 68La and 68Lb also defined in the left guide plate 66L.

Pins 40Rc and 40Lc secured to the right and left guide plates 66R and 66L, respectively, are engaged in the associated straight guide grooves 68Rc and 68Lc.

Figure 14A:
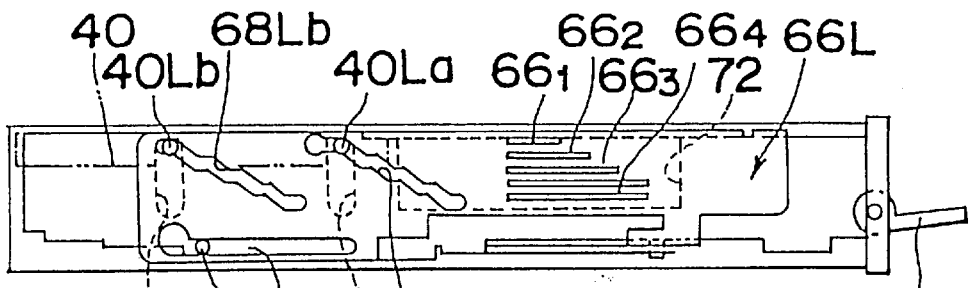
FIGS. 14A to 14E are views similar to FIGS. 13A to 13E, respectively, showing the opposite, left guide plate slidable along a left side wall of the housing in unison with the right guide plate.
Figure 14B:
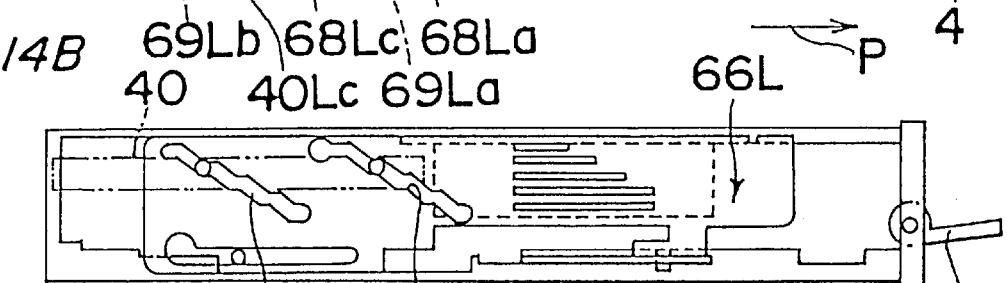
Figure 14C:
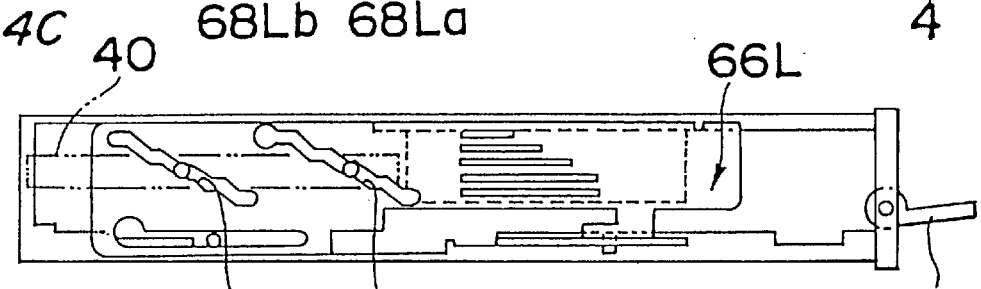
Figure 14D:
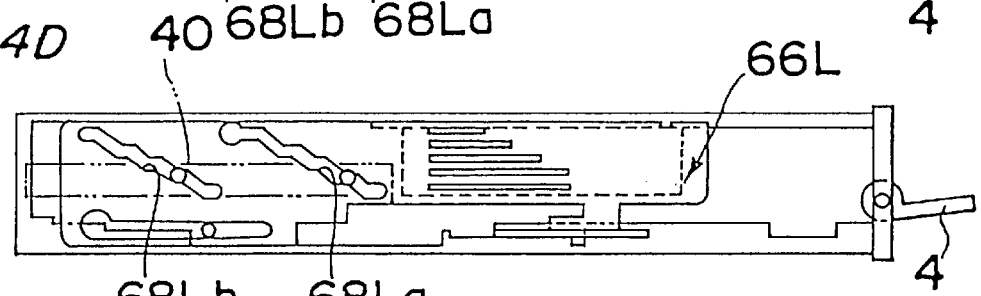
Figure 14E:
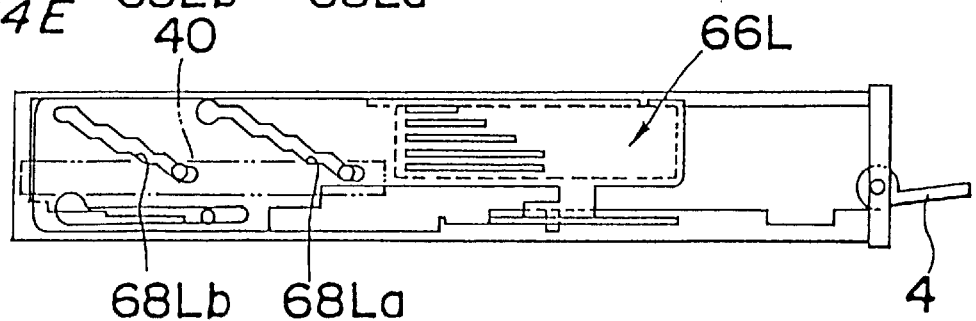

The right-side inclined guide grooves 68Ra and 68Rb and the left-side inclined guide grooves 68La and 68Lb are of an identical configuration and are so designed and so shaped that as the left and right guide plates 66L and 66R are moved in unison in response to the pivotal movement of the connecting lever 67, the elevating table 40 can, with the pins 40Lc and 40Rc guided within the associated straight guide grooves 68Lc and 68Rc, be moved in a direction perpendicular to the direction of movement of each guide plate 66L or 66R to assume one of five stop positions associated with the subtrays stacked on the main tray 1: a first stop position at which the loading drive system can be accessible to the uppermost or fifth subtray $6_5$ as shown in FIGS. 13A and 14A, a second stop position at which the loading drive system can be accessible to the fourth subtray $6_4$ as shown in FIGS. 13B and 14B, a third stop position at which the loading drive system can be accessible to the third subtray $6_3$ as shown in FIGS. 13C and 14C, a fourth stop position at which the loading drive system can be accessible to the second subtray $6_2$ as shown in FIGS. 13D and 14D, and a fifth stop position at which the loading drive system can be accessible to the lowermost or first subtray $6_1$ as shown in FIGS. 13E and 14E.

As shown in FIG. 15, a generally rectangular slitted plate 70 having defined therein a row of sensing slits $70_1$ to $70_5$ equal in number to the number of the subtrays that can be accommodated in the main tray 1 is secured to a lower side edge of the left guide plate 66L. Cooperable with any one of those sensing slits $70_1$ to $70_5$ is a photo-interrupter 71 fixedly mounted on a portion of the chassis 13 where the slitted plate 70 moves together with the left guide plate 66L so that passage of any one of the sensing slits $70_1$ to $70_5$ can be detected by the photo-interrupter 71.

When electric power is supplied to the control unit, the drive motor 19 is electrically energized for a predetermined length of time to drive in the first direction with the photo-interrupter 71 consequently set to an initial condition ready to detect the sensing slit $70_5$. When a command descriptive of the number allocated to one of the subtrays, for example, the third subtray $6_3$, desired to be accessed is inputted to the control unit, the drive motor 19 is driven in the second direction counter to the first direction until the photo-interrupter 71 detects the associated sensing slit $70_3$, causing the elevating table 40 to be lowered from the first stop position to the third stop position shown in FIGS. 13C and 14C past the second stop position shown in FIGS. 13B and 14B. A similar operation takes place even where any one of the other subtrays is desired to be accessed.

Subtray Holding Mechanism

As hereinbefore described, assuming that the main tray 1 having a stack of the subtrays $6_1$ to $6_5$ mounted thereon is held in the inserted position, and where an optical disc 5 placed on one of the stacked subtrays $6_1$ to $6_4$ except for the uppermost subtray $6_5$ is desired to be replaced, or where an optical disc 5 is desired to be placed on one of the stacked subtrays $6_1$ to $6_4$ except for the uppermost subtray $6_5$ (applicable where such one of the stacked subtrays is empty), the uppermost subtray $6_5$ or all of the subtrays positioned above such one of the stacked subtrays can be retained at the stand-by position so that, when the main tray 1 is subsequently moved to the withdrawn position, the user can quickly access to such one of the stacked subtrays for replacement or placement of the optical disc 5. A subtray holding mechanism for this purpose will now be described.

As shown in FIG. 14, a portion of the left guide plate 13L of the chassis 13 is formed with a window 72. A holder 73 made of synthetic resin is supported by the left guide plate 13L so as to confront the window 72 as shown in FIGS. 4 and 15. This holder 73 is integrally formed with the fixed guide block 11b and includes first to fourth holder levers $74_1$ to $74_4$ mounted at a generally intermediate portion thereof on the holder 73 by means of a pivot pin 73a secured thereto. Each of the holder levers $74_1$ to $74_4$ has one end branched into a feeler 75a and an elastically yieldable leg 75b of a length greater than that of the respective feeler 75a and the opposite end formed integrally with a hook 75c and positioned remote from the fixed guide block 11b. Cooperable with the holder levers $74_1$ to $74_4$ are first to fourth cam projections $66_1$ to $66_4$ secured to a portion of the left guide plate 66L generally in alignment with the holder 73, the first to fourth cam projections $66_1$ to $66_4$ being spaced at the same pitch as the holder levers $74_1$ to $74_4$.

Removal or Placement of Disc from or on Subtray $6_5$

Where the elevating table 40 of the loading drive system is held at the first stop position at which the loading drive system is accessible to the uppermost or fifth subtray $6_5$ as shown in FIGS. 13A and 14A, the feelers 75a of the first to fourth holder levers $74_1$ to $74_4$ ride over the associated cam projections $66_1$ to $66_4$ with the feelers 75a consequently pressed inwardly in a direction shown by the arrow Q. In this condition, the hooks 75c of the first to fourth holder levers $74_1$ to $74_4$ are pivoted clockwise, as viewed in FIG. 15, about the pivot pin 73a against the resiliency of the legs 75b, to thereby disengage from respective recesses 6a defined in the left side edges of the subtrays $6_5$ to $6_2$ as shown respectively in FIGS. 16A to 16D. In this condition, the main tray 1 can be moved to the withdrawn position together with the entire number of the subtrays $6_1$ to $6_5$ resting thereon and, thus, the user can make access to the uppermost subtray $6_5$ then exposed to the outside for removal or placement of the optical disc 5.

Assuming that the hooks 75c of the holder levers $74_1$ to $74_4$ are held in position to disengage from the associated recesses 6a in the subtrays as discussed above, the entire number of the subtrays $6_1$ to $6_5$ mounted on the main tray 1 can be withdrawn together with the main tray 1 then moving towards the withdrawn position. For this purpose, the main tray 1 is provided with a releasable catch mechanism for releasably trapping the subtrays $6_1$ to $6_5$, which will now be described.

Figure 17:
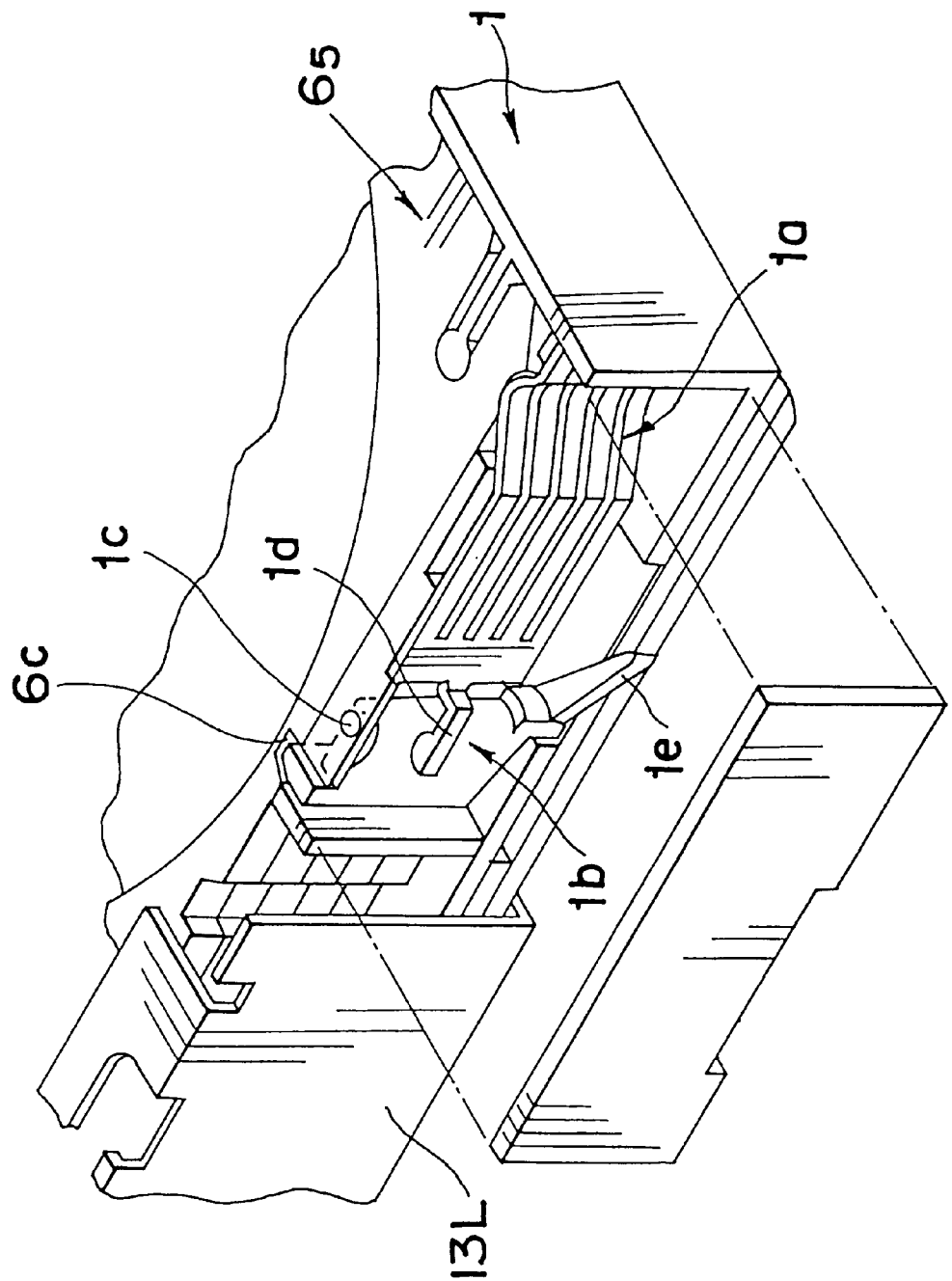
FIG. 17 is an exploded view of one side wall of the main tray, showing a retainer for retaining the stacked subtrays in the main tray.

The releasable catch mechanism includes, as best shown in FIGS. 2 and 17, a leaf spring member 1a integrally formed at one end with an auxiliary spring element 1d and at the opposite end with generally V-shaped resilient tongues equal in number to the number of the subtrays $6_1$ to $6_1$ that can be accommodated in the main tray 1. The generally V-shaped resilient tongues of the leaf spring member 1a are, when and so long as the subtrays $6_1$ to $6_5$ are stacked on the main tray 1, resiliently engaged in respective recesses 6b defined in the side edges of the subtrays $6_1$ to $6_5$ to thereby retain the latter temporarily on the main tray 1.

The releasable catch mechanism also includes a stopper 1b mounted on the main tray 1 for pivotal movement about a pin 1c and normally biased by the auxiliary spring element id in one direction with one end thereof remote from the V-shaped resilient tongues consequently protruding inwardly of the main tray 1. So long as the stopper 1b is biased by the auxiliary spring element 1d with that end thereof consequently protruding inwardly of the main tray 1 as described above, that end of the stopper 1b is engaged in respective recesses 6c defined in the left side edges of the subtrays $6_1$ to $6_5$ to avoid any possible separation of those subtrays $6_1$ to $6_5$ relative to the main tray 1.

However, since a lever 1e, formed integrally with the opposite end of the stopper 1b so as to protrude laterally outwardly from the left side wall of the main tray 1 as best shown in FIG. 17, is brought into sliding engagement with the left side wall 13L of the chassis as the main tray 1 is moved towards the inserted position, the stopper 1b is pivoted in the opposite direction about the pin 1c against the biasing force of the auxiliary spring element 1d, with that end of the stopper 1b consequently retracted inwardly to disengage from the recesses 6c in the subtrays $6_1$ to $6_5$.

Even though that end of the stopper 1b remote from the V-shaped resilient tongues of the leaf spring member 1a is disengaged from the recesses 6c in the subtrays $6_1$ to $6_5$, the subtrays $6_1$ to $6_5$ resting on the main tray 1 can be retained in position on the main tray 1 by the action of the V-shaped resilient tongues then engaged in the recesses 6b in the subtrays $6_1$ to $6_5$. This condition is maintained so long as the main tray 1 is moved to and maintained at the inserted position.

Thus, so long as the elevating table 40 of the loading drive system assumes the first stop position at which the loading drive system is accessible to the uppermost or fifth subtray $6_5$ as shown in FIGS. 13A and 14A, the hooks 75c of the first to fourth holder levers $74_1$ to $74_4$ are disengaged from the recesses 6a in the subtrays $6_2$ to $6_5$ on the main tray 1 as shown in FIGS. 16A to 16D. When during this condition a command indicative of replacement of the optical disc 5 resting on the uppermost subtray $6_5$ is inputted to the control unit, the control unit immediately instructs the drive motor 19 to rotate in the first direction to thereby drive the main gear assembly 17 in a direction counter to the direction of the arrow C so that the main tray 1 carrying the subtrays $6_1$ to $6_5$ can be driven towards the withdrawn position as shown in FIG. 1E. The supply of the electric power to the drive motor 19 then driven in the first direction is interrupted when another microswitch 33b detects a projection 17c formed on the undersurface of the main gear assembly 17.

Removal or Placement of Disc from or on Subtray $6_4$

Assuming that the elevating table 40 is held at the first stop position at which the loading drive system is accessible to the uppermost subtray $6_5$, and when a command indicative of replacement of the optical disc on the fourth subtray $6_4$ is subsequently inputted to the control unit while the entire subtrays $6_1$ to $6_5$ are held at the stand-by position with the main tray 1 held at the inserted position, the control unit causes the right and left guide plates 66R and 66L to move in the respective directions in response to the pivotal movement of the connecting lever 67 to thereby cause the elevating table 40 to move down to the second stop position at which the loading drive system is accessible to the fourth subtray $6_4$ immediately below the uppermost subtray $6_5$ as shown in FIGS. 13B and 14B.

In this condition, shown in FIGS. 13B and 14B, the feeler 75a of only the first holder lever $74_1$ is disengaged from the corresponding first cam projection $66_1$ as best shown in FIG. 18A, causing the first holder lever $74_1$ to be pivoted about the pin by the resilient force of the leg 75b with the hook 75c of the first holder lever $74_1$ consequently engaged in the recess 6a in the uppermost subtray $6_5$. On the other hand, the hooks 75c of the remaining second to fourth holder levers $74_2$ to $74_4$ associated with the subtrays $6_4$, $6_3$ and $6_2$ remain disengaged respectively from the recesses 6a of those subtrays $6_4$, $6_3$ and $6_2$ since the feelers 75a of the second to fourth holder levers $74_2$ to $74_4$ are engaged with the corresponding cam projections $66_2$ to $66_4$ and are consequently pressed inwardly in the direction of the arrow Q as shown in FIGS. 18B to 18D against the resiliency of the legs 75b of the second to fourth holder levers $74_2$ to $74_4$.

Upon completion of the lowering of the elevating table 40 to the second stop position as described above, the control unit causes the drive motor 19 to rotate in the first direction to thereby move the main tray 1 from the inserted position towards the withdrawn position, but the supply of the electric power to the drive motor 19 then rotating in the first direction is interrupted when the microswitch 33b detects the projection 17c on the undersurface of the main gear assembly 17.

As during this condition the main tray 1 with the subtrays thereon is moved towards the withdrawn position, only the uppermost and nest succeeding subtrays $6_5$, having their recess 6a in which the hook 75c of the first holder levers $74_1$ is engaged is retained at the stand-by position, allowing the remaining subtrays $6_4$, $6_3$, $6_2$ and $6_1$ to move together with the main tray 1 then moving towards the withdrawn position. Upon arrival of the main tray 1 at the withdrawn position, the user can access the subtray $6_4$ then exposed to the outside with the other subtrays $6_3$, $6_2$ and $6_1$ positioned between it and the bottom of the main tray 1.

Removal or Placement of Disc from or on Subtray $6_3$

Assuming that the elevating table 40 is held at the first stop position at which the loading drive system is accessible to the uppermost subtray $6_5$, when a command indicative of replacement of the optical disc on the third subtray $6_3$ is subsequently inputted to the control unit while the entire subtrays $6_1$ to $6_5$ are held at the stand-by position with the main tray 1 held at the inserted position, the control unit causes the right and left guide plates 66R and 66L to move in the respective directions in response to the pivotal movement of the connecting lever 67 to thereby cause the elevating table 40 to move down to the third stop position at which the loading drive system is accessible to the third subtray $6_3$ as shown in FIGS. 13C and 14C.

Figure 21A:
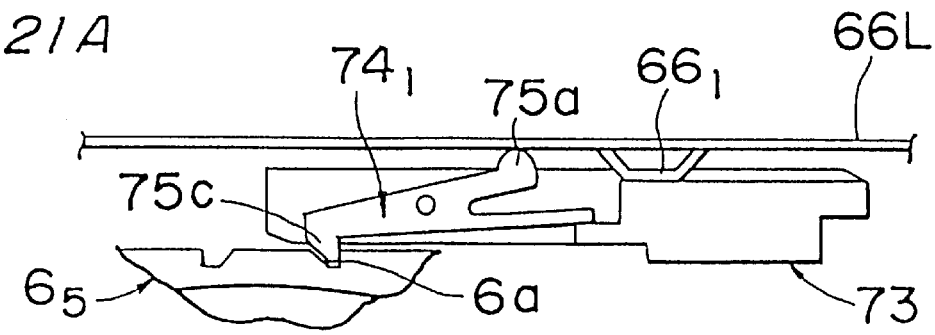
FIGS. 21A to 21D are views similar to FIGS. 16A to 16D, showing how the first to fourth holder levers are positioned relative to the associated subtrays when the optical disc resting on the third subtray is in position to be played back.
Figure 21B:
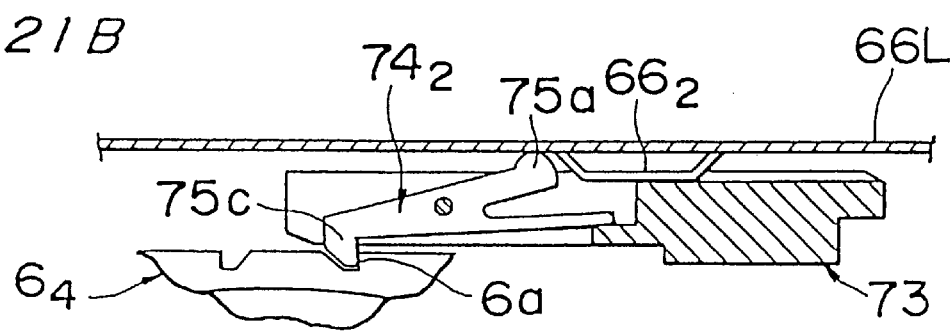
Figure 21C:
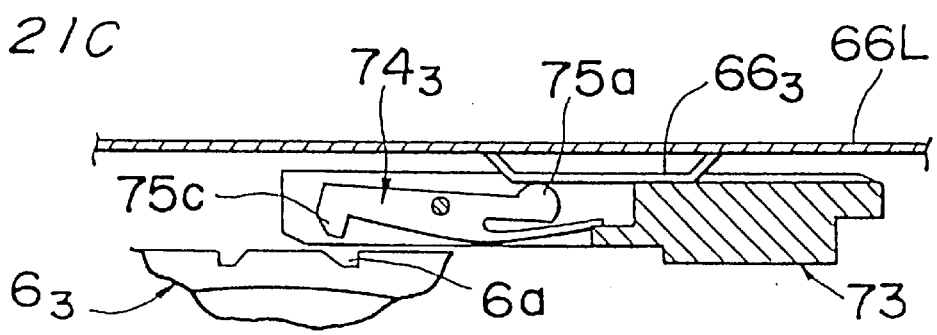
Figure 21D:
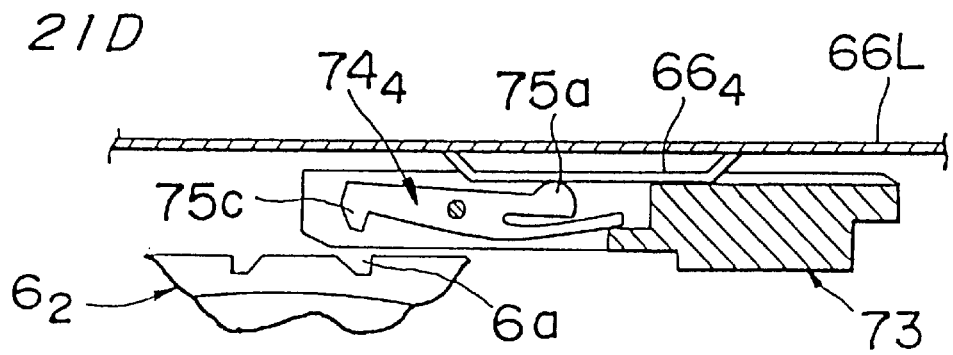

In this condition shown in FIGS. 13C and 14C, the feelers 75a of only the first and second holder levers $74_1$ and $74_2$ are disengaged from the corresponding first and second cam projections $66_1$ and $66_2$ as best shown in FIGS. 21A and 21B, causing the first and second holder levers $74_1$ and $74_2$ to be pivoted about the pin by the resilient force of the legs 75b with the hooks 75c of the first and second holder levers $74_1$ and $74_2$ consequently engaged in the recesses 6a in the fifth and fourth subtrays $6_5$ and $6_4$. On the other hand, the hooks 75c of the remaining third and fourth holder levers $74_3$ and $74_4$ associated with the subtrays $6_3$ and $6_2$ remain disengaged respectively from the recesses 6a of those subtrays $6_3$ and $6_2$ since the feelers 75a of the third and fourth holder levers $74_3$ and $74_4$ are engaged with the corresponding cam projections $66_3$ and $66_4$ and are consequently pressed inwardly in the direction of the arrow Q as shown in FIGS. 21C to 21D against the resiliency of the legs 75b of the third and fourth holder levers $74_3$ and $74_4$.

Upon completion of the lowering of the elevating table 40 to the third stop position as described above, the control unit causes the drive motor 19 to rotate in the first direction to thereby move the main tray 1 from the inserted position towards the withdrawn position, but the supply of the electric power to the drive motor 19 then rotating in the first direction is interrupted when the microswitch 33b detects the projection 17c on the undersurface of the main gear assembly 17.

As during this condition the main tray 1 with the subtrays thereon is moved towards the withdrawn position, only the uppermost and next succeeding subtrays $6_5$ and $6_4$, having their recesses 6a in which the hooks 75c of the first and second holder levers $74_1$ and $74_2$ are engaged, are retained at the stand-by position, allowing the remaining subtrays $6_3$, $6_2$ and $6_1$ to move together with the main tray 1 then moving towards the withdrawn position. Upon arrival of the main tray 1 at the withdrawn position, the user can access the subtray $6_3$ then exposed to the outside with the other subtrays $6_2$ and $6_1$ positioned between it and the bottom of the main tray 1.

Removal or Placement of Disc from or on Subtray $6_2$

Assuming that the elevating table 40 is held at the first stop position at which the loading drive system is accessible to the uppermost subtray $6_5$, when a command indicative of replacement of the optical disc on the fourth subtray $6_2$ is subsequently inputted to the control unit while all of the subtrays $6_1$ to $6_5$ are held at the stand-by position with the main tray 1 held at the inserted position, the control unit causes the right and left guide plates 66R and 66L to move in the respective directions in response to the pivotal movement of the connecting lever 67 to thereby cause the elevating table 40 to move down to the fourth stop position at which the loading drive system is accessible to the third subtray $6_2$ as shown in FIGS. 13D and 14D.

Figure 22A:
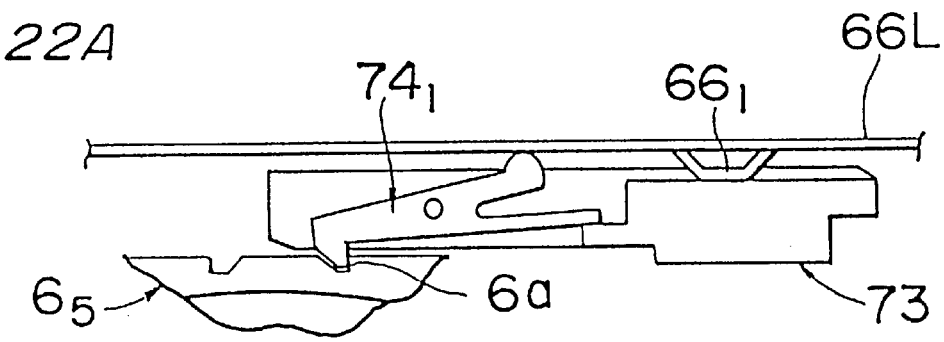
FIGS. 22A to 22D are views similar to FIGS. 16A to 16d, showing how the first to fourth holder levers are positioned relative to the associated subtrays when the optical disc resting on the subtray immediately above the lowermost subtray is in position to be played back.
Figure 22B:
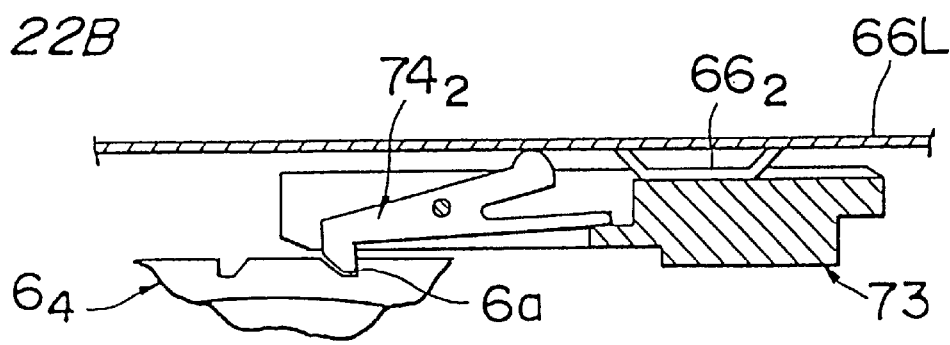
Figure 22C:
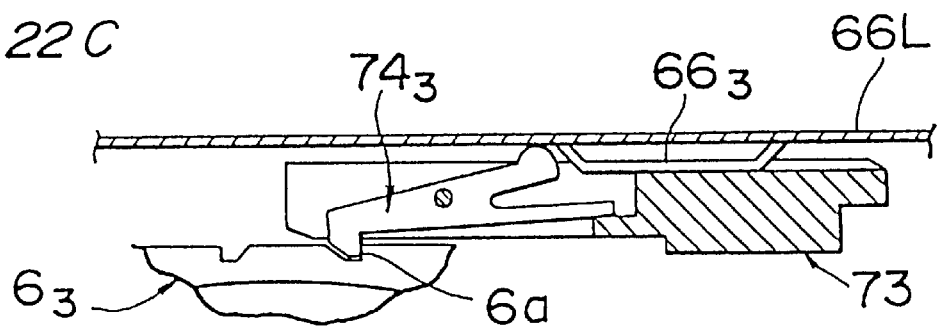
Figure 22D:
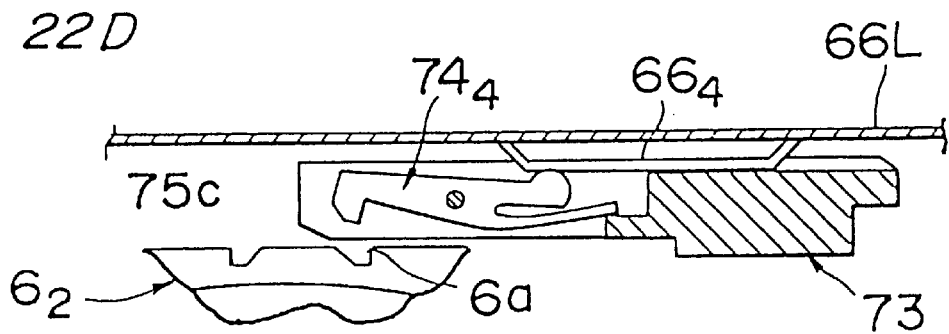
Figure 24A:
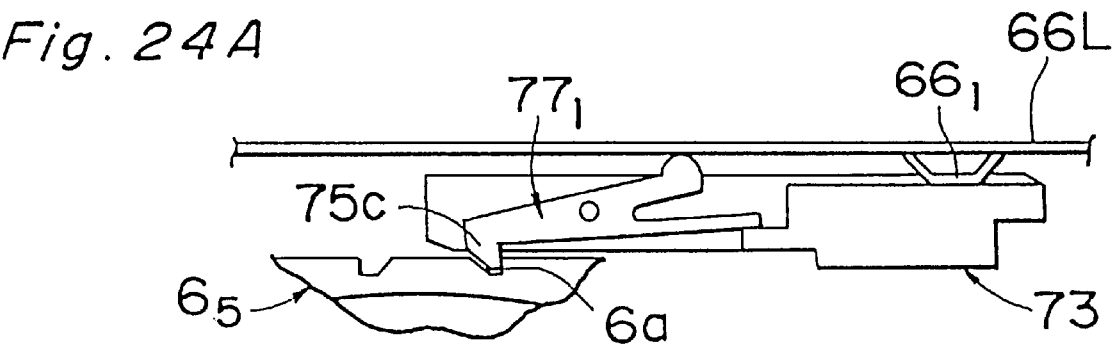
FIGS. 24A to 24D are views similar to FIGS. 16A to 16D, showing how the first to fourth holder levers are positioned relative to the associated subtrays when the optical disc resting on the lowermost subtray is in position to be played back.
Figure 24B:
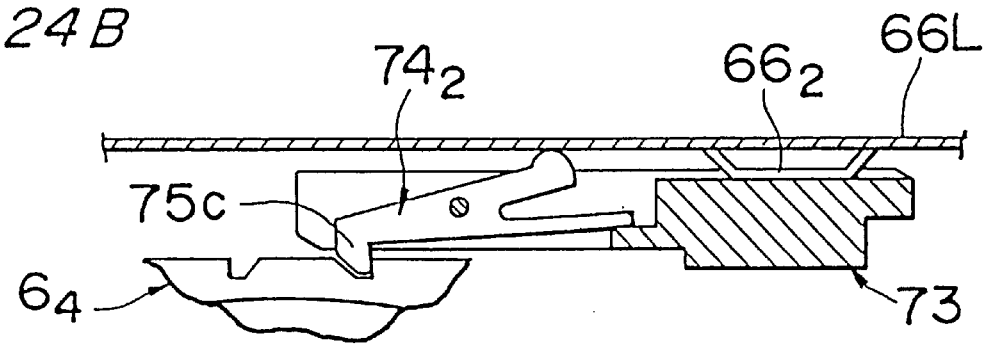
Figure 24C:
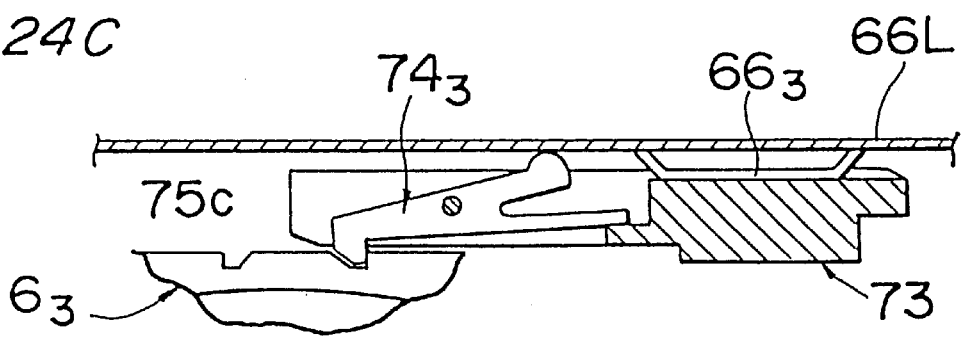
Figure 24D:
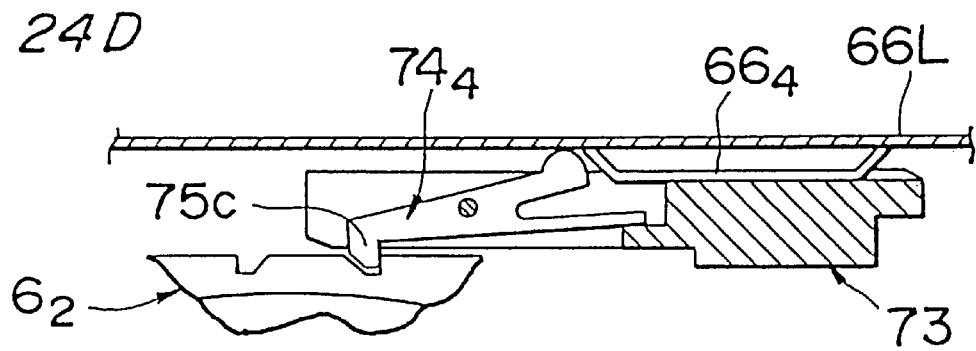

In this condition shown in FIGS. 13D and 14D, the feelers 75a of only the first to third holder levers $74_1$ to $74_3$ are disengaged from the corresponding first to third cam projections $66_1$ to $66_3$ as best shown in FIGS. 22A to 22B, causing the first to third holder levers $74_1$ to $74_3$ to be pivoted about the pin by the resilient force of the legs 75b with the hooks 75c of the first to third holder levers $74_1$ to $74_3$ consequently engaged in the recesses 6a in the fifth, fourth and third subtrays $6_5$, $6_4$ and $6_3$. On the other hand, the hooks 75c of the fourth holder lever $74_4$ associated with the subtray $6_2$ remains disengaged respectively from the recess 6a of those subtrays $6_2$ since the feeler 75a of the fourth holder lever $74_4$ is engaged with the corresponding cam projection $66_4$ and is consequently pressed inwardly in the direction of the arrow Q as shown in FIG. 22D against the resiliency of the leg 75b of the fourth holder lever $74_4$.

Upon completion of the lowering of the elevating table 40 to the fourth stop position as described above, the control unit causes the drive motor 19 to rotate in the first direction to thereby move the main tray 1 from the inserted position towards the withdrawn position, but the supply of the electric power to the drive motor 19 then rotating in the first direction is interrupted when the microswitch 33b detects the projection 17c on the undersurface of the main gear assembly 17.

As during this condition the main tray 1 with the subtrays thereon is moved towards the withdrawn position, only the subtrays $6_5$ to $6_3$ having their recesses 6a in which the hooks 75c of the first to third holder levers $74_1$ to $74_3$ are engaged are retained at the stand-by position, allowing the remaining subtrays $6_2$ and $6_1$ to move together with the main tray 1 then moving towards the withdrawn position. Upon arrival of the main tray 1 at the withdrawn position, the user can make an access to the subtray $6_2$ then exposed to the outside with the lowermost subtray $6_1$ positioned between it and the bottom of the main tray 1.

Removal or Placement of Disc from or on Subtray $6_1$

Assuming that the elevating table 40 is held at the first stop position at which the loading drive system is accessible to the uppermost subtray $6_5$, when a command indicative of replacement of the optical disc on the lowermost subtray $6_1$ is subsequently inputted to the control unit while the entire subtrays $6_1$ to $6_5$ are held at the stand-by position with the main tray 1 held at the inserted position, the control unit causes the right and left guide plates 66R and 66L to move in the respective directions in response to the pivotal movement of the connecting lever 67 to thereby cause the elevating table 40 to move down to the fifth stop position at which the loading drive system is accessible to the lowermost subtray $6_1$ as shown in FIGS. 13E and 14E.

In this condition shown in FIGS. 13E and 14E, the feelers 75a of only the first to fourth holder levers $74_1$ to $74_4$ are disengaged from the corresponding first to fourth cam projections $66_1$ to $66_4$ as best shown in FIGS. 24A to 24D, causing the first to fourth holder levers $74_1$ to $74_4$ to be pivoted about the pin by the resilient force of the legs 75b with the hooks 75c of the first to fourth holder levers $74_1$ to $74_4$ consequently engaged in the recesses 6a in the fifth, fourth, third and second subtrays $6_5$, $6_4$, $6_3$ and $6_2$.

Upon completion of the lowering of the elevating table 40 to the fifth stop position as described above, the control unit causes the drive motor 19 to rotate in the first direction to thereby move the main tray 1 from the inserted position towards the withdrawn position, but the supply of the electric power to the drive motor 19 then rotating in the first direction is interrupted when the microswitch 33b detects the projection 17c on the undersurface of the main gear assembly 17.

As during this condition the main tray 1 with the subtrays thereon is moved towards the withdrawn position, the subtrays $6_5$ to $6_2$ having their recesses 6a in which the hooks 75c of the first to fourth holder levers $74_1$ to $74_4$ are engaged are retained at the stand-by position, allowing only the lowermost subtray $6_1$ to move together with the main tray 1 then moving towards the withdrawn position. Upon arrival of the main tray 1 at the withdrawn position, the user can access the subtray $6_1$ then exposed to the outside with the other subtrays $6_2$ to $6_5$ retained at the stand-by position inside the disc chamber.

Lock Mechanism for Main Tray

Figure 27:
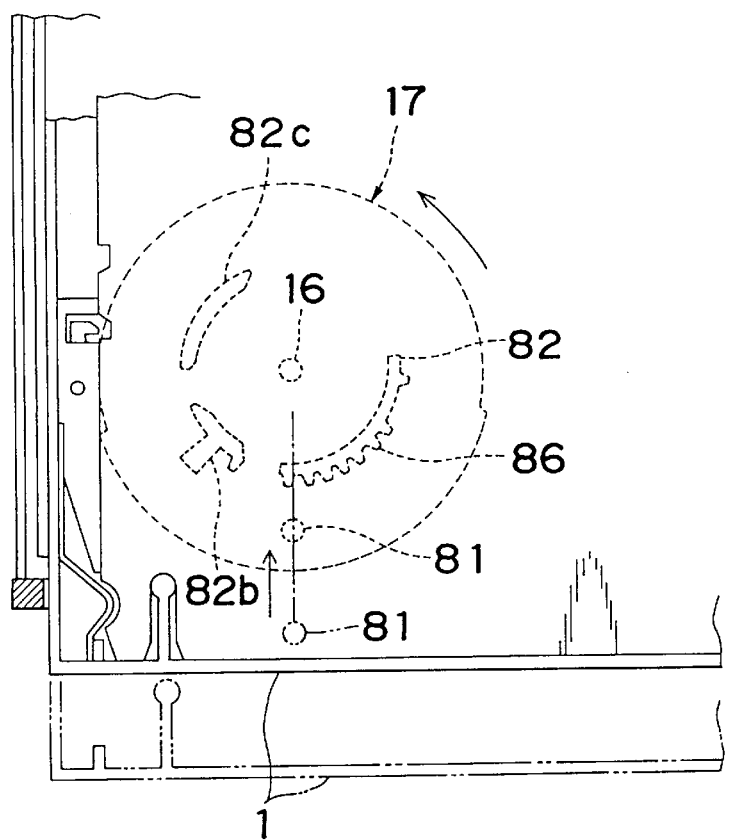
FIGS. 27 to 30 are fragmentary top plan views, showing different positions of the main gear assembly and used to explain the sequence of operation of a stopper mechanism for the main tray and that of a lock mechanism for the subtray drawing mechanism.
Figure 28:
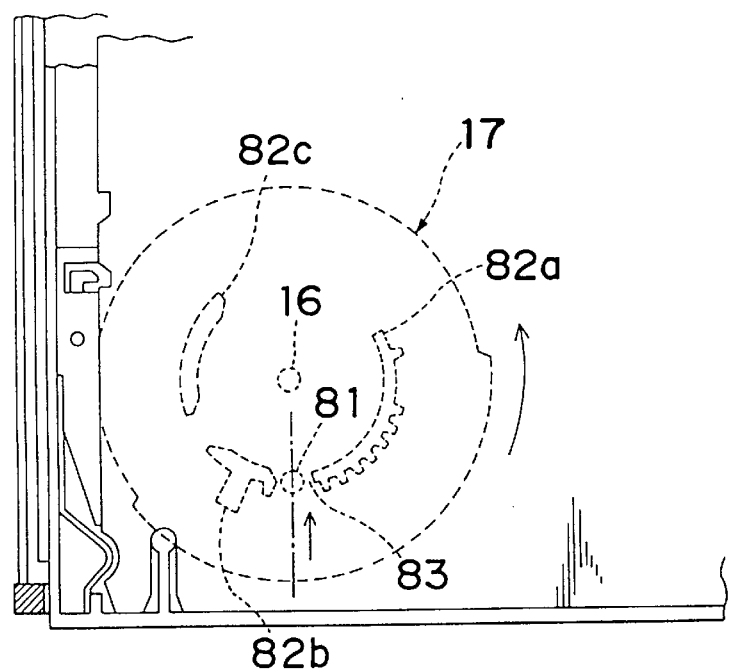
Figure 29:
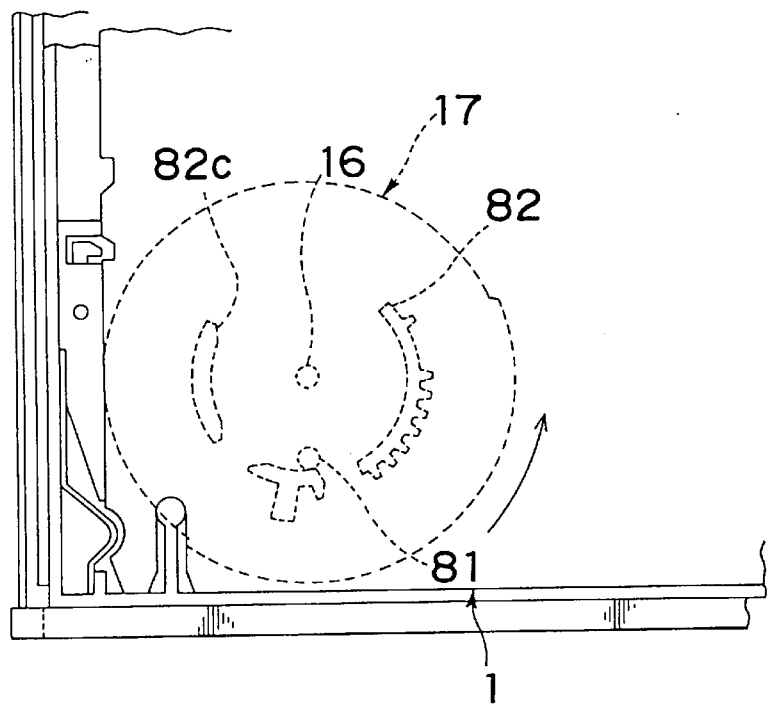

As shown in FIG. 2, the main tray 1 has a projection 81 formed on the undersurface thereof so as to protrude downwardly therefrom. On the other hand, the main gear assembly 17 has an upper surface formed with a generally arcuate projections 82a concentric with the pin 16 as shown in FIG. 27. Two separate tapered segments 82b and 82c are formed adjacent one end of the arcuate projection 82a in concentric relation with the pin 16.

Figure 31:
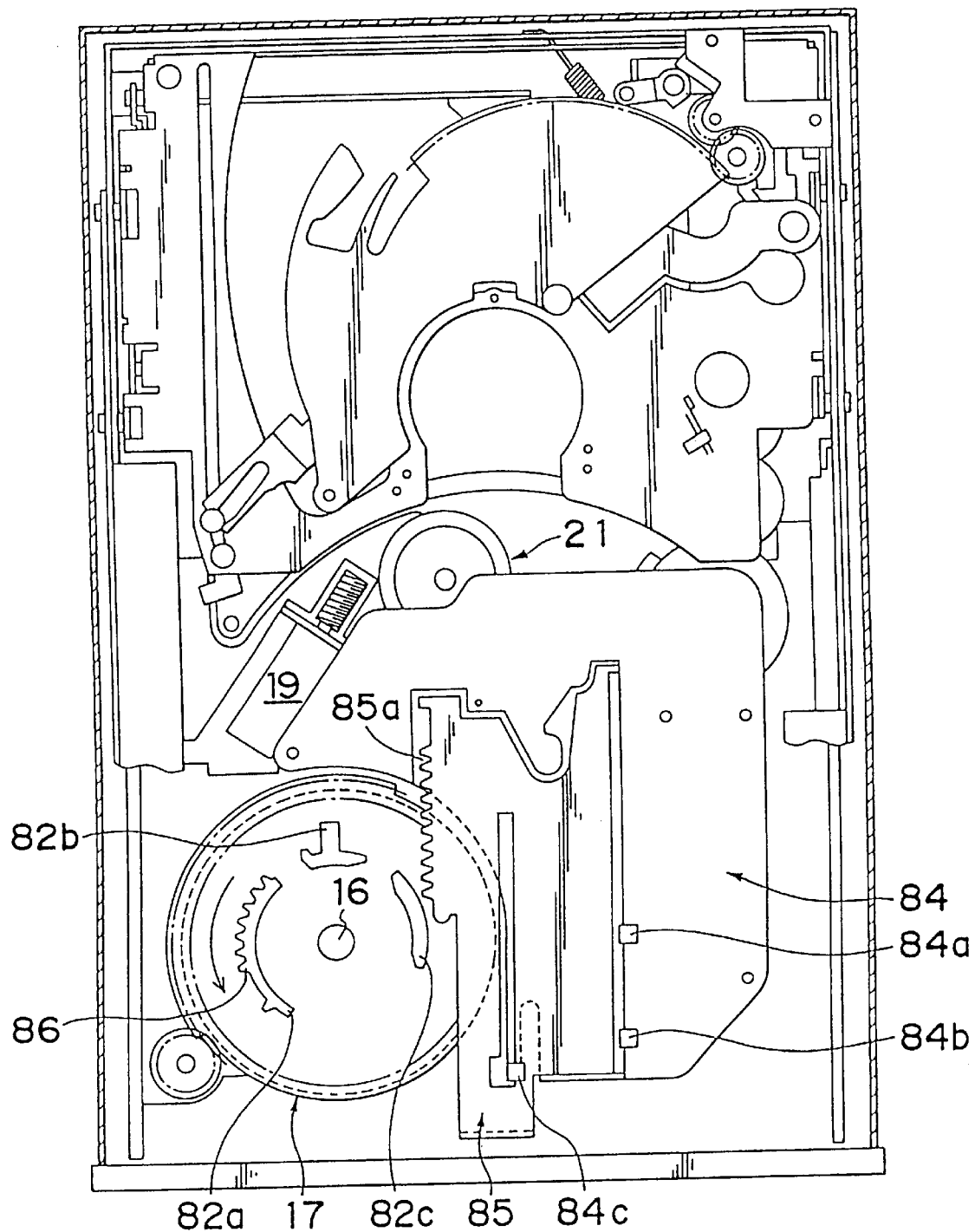
FIG. 31 is a top plan view of the optical disc drive apparatus, showing a safety ejecting mechanism for the main tray.
Figure 32:
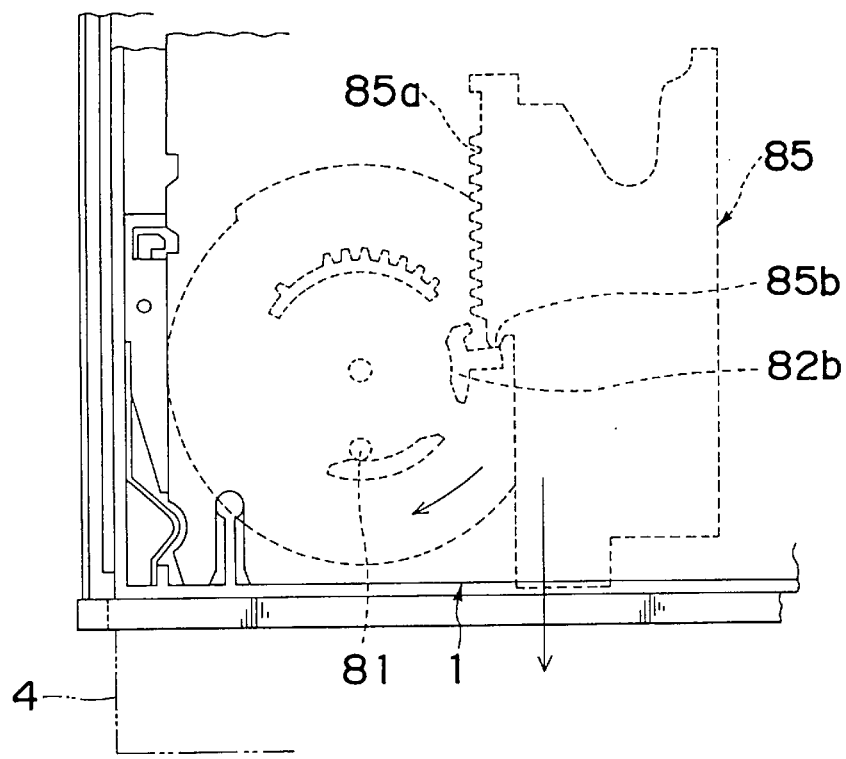
FIGS. 32 to 34 are fragmentary top plan views, showing the sequence of operation of the main tray safety ejecting mechanism shown in FIG. 31.

FIG. 27 illustrates a condition in which the main tray 1 is being drawn towards the inserted position by the gear 15 then driven as a result of rotation of the main gear assembly 17, and the main gear assembly 17 may assume such transit conditions as shown respectively in FIGS. 27 to 31 before the main tray 1 is completely drawn to the inserted position as shown in FIG. 32, the sequence of which will now be described.

Figure 30:
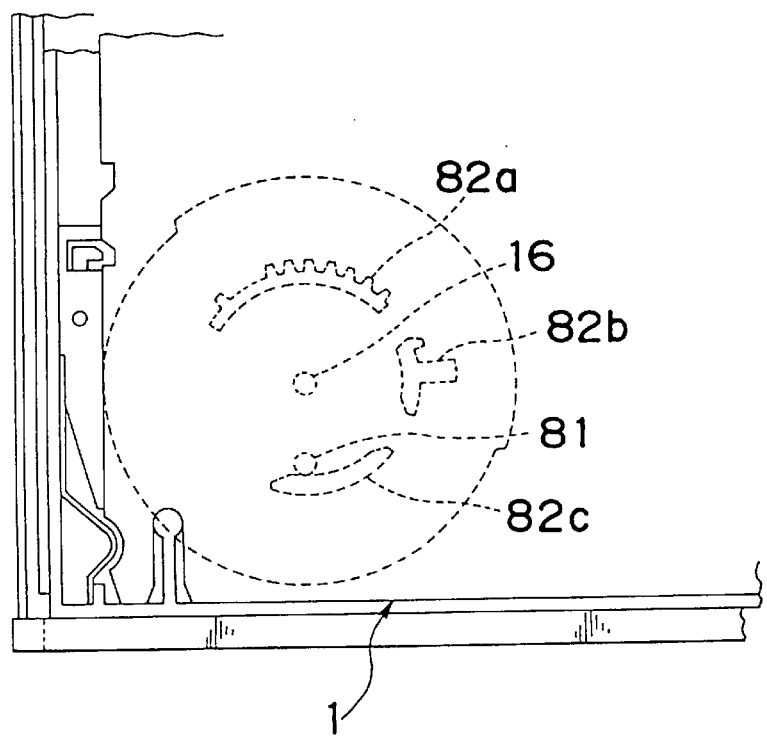

When as a result of rotation of the main gear assembly 17 the projection 81 fast with the main tray 1 moves past laterally of the tapered segment 82c fast with the main gear assembly 17 and the tapered segment 82b subsequently comes to a position where the tapered segment 82b encompasses the projection 81 as shown in FIG. 30, the main gear assembly 17 is disengaged from the pinion gear 15, allowing the main tray 1 to be drawn towards the inserted position, as shown in FIG. 31, by the action of the tapered segment 82c fast with the main gear assembly 17. Also, even though the main gear assembly 17 rotates until a condition is established in which one of the subtrays on the main tray 1 is drawn from the stand-by position towards the loaded position and is then clamped by the clamping mechanism at the loaded position, the projection 81 fast with the main tray 1 is engaged with the arcuate projection 82a fast with the main gear assembly 17 to thereby inhibit the main tray 1 from being manually drawn towards the withdrawn position, thereby locking the main tray 17 at the inserted position.

Lock Mechanism for Subtray Drawing System

Figure 41:
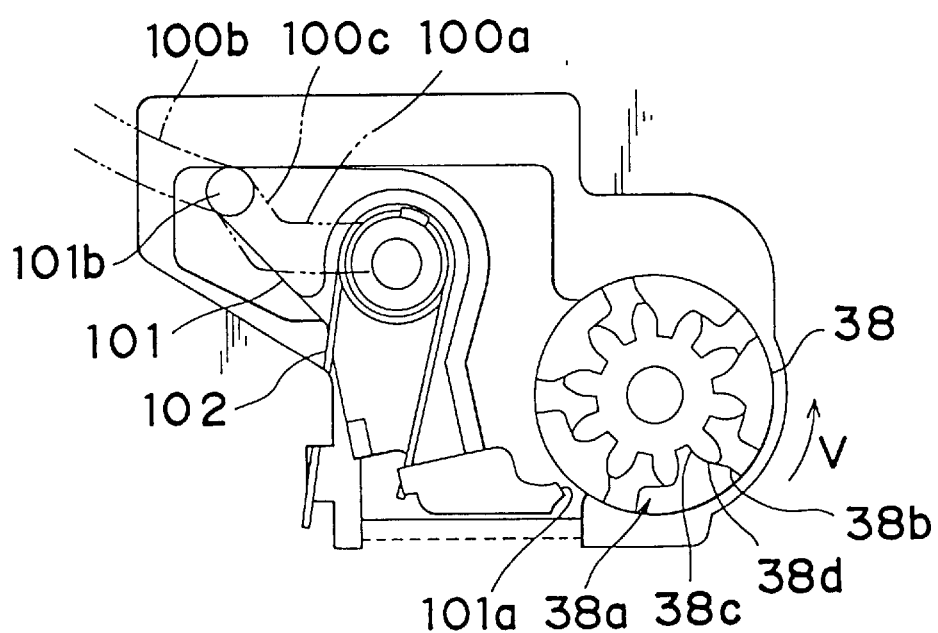
FIG. 41 is a top plan view, on an enlarged scale, showing the lock mechanism for the subtray drawing mechanism.

As shown in FIG. 41, the gear 38 is formed with five recesses 38a spaced an equal angle from each other with respect to the axis of rotation thereof. Each of the recesses 38a has one side wall delimited by straight wall segments 38b and 38c extending in a direction generally radially of the gear 38 and an inclined wall segment 38d connecting the straight wall segments 38b and 38c together. A mode lock lever (drawing inhibitor) 101 is pivotally mounted on the chassis 13 and has one end formed with a pawl 101a of a shape identical with the shape of each recess 38a in the gear 38 and the other end carrying a pin 101b engageable in arcuate grooves 100a and 100b and a tapered groove 100c defined in the main gear assembly 17 as will be described later. This mode lock lever 101 is normally biased by a torsion spring 102 in a direction required for the pawl 101a to be engaged in one of the recesses 38a in the gear 38.

The arcuate grooves 100a and 100b have a curvature different from each other and are formed on the undersurface of the main gear assembly 17 together with the tapered groove 100c communicating the arcuate grooves 100a and 100b together. Thus, as the main gear assembly 17 is rotated, the mode lock lever 101 is pivoted to bring the gear 30 to a halt or to release the gear 38 depending on the direction of pivot of the mode lock lever 101.

Figure 39:
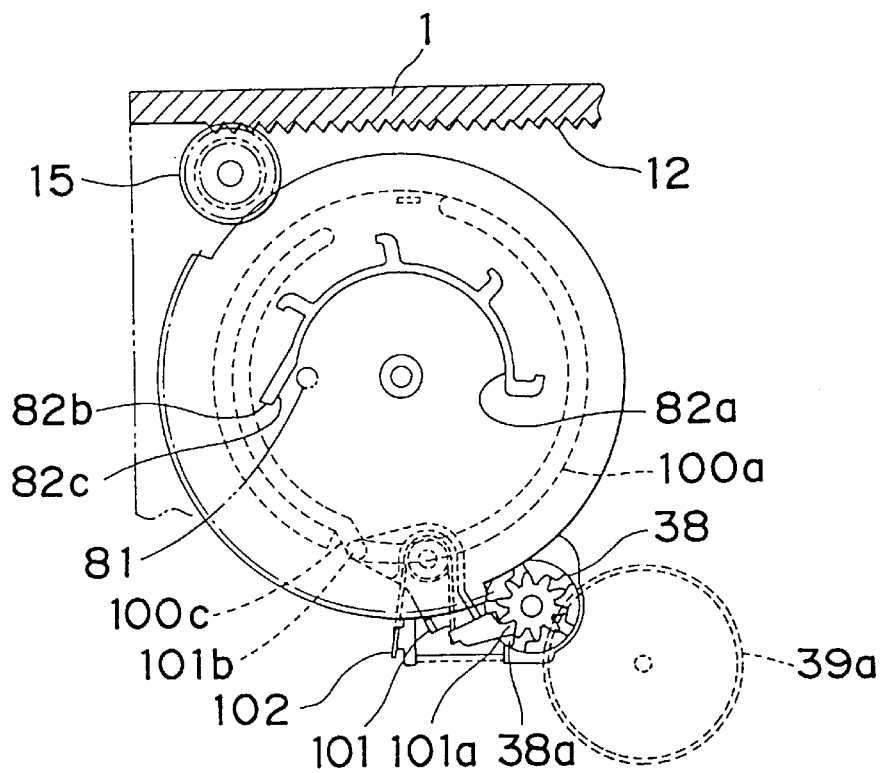

FIG. 39 illustrates a stand-by condition in which the elevating table 40 is ready to move, During this condition, the pin 101b rigid with the mode lock lever 101 is engaged in the arcuate groove 101a in the main gear assembly 17 to thereby lock the gear 38 non-rotatable at a predetermined phase.

Figure 40:
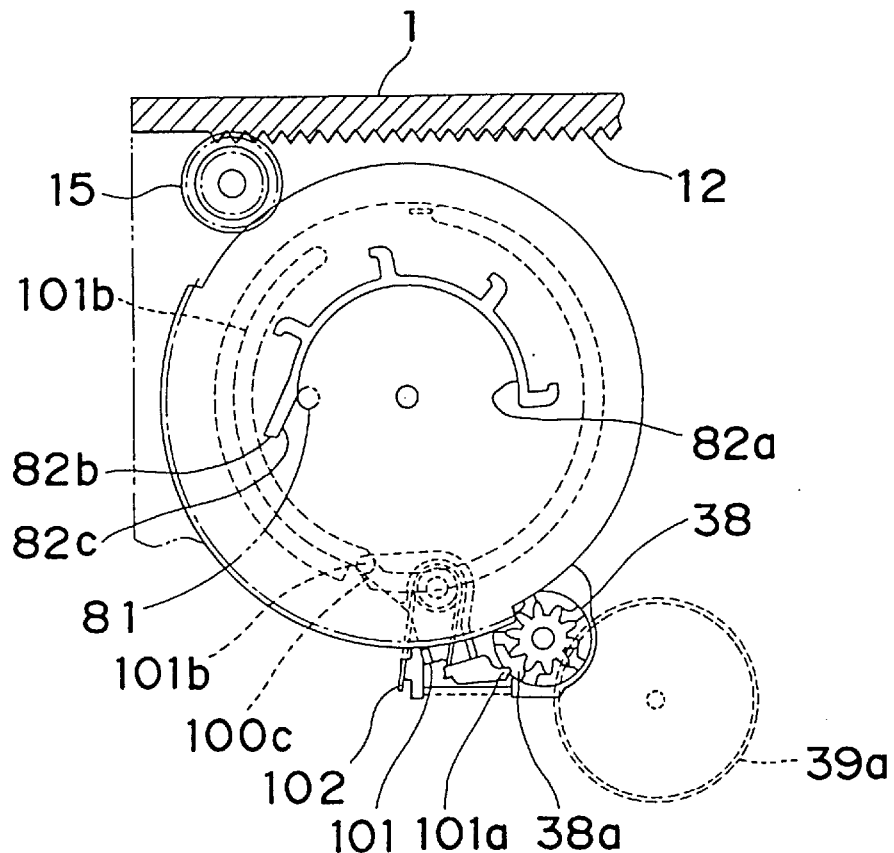

When starting from the condition shown in FIG. 39 the main gear assembly 17 is rotated, the mode lock lever 101 is pivoted against the biasing force of the torsion spring 102 with the pin 101b guided along the tapered groove 100c in the main gear assembly 17 and the pawl 101a is subsequently disengaged from the straight wall segment 38c of the recess 38a in the gear 39, allowing the gear 38 to engage with the main gear assembly 17 to drive the latter as shown in FIGS. 8 and 40. Starting from this condition, the loading hook member 49 is driven to draw one of the stacked subtrays on the main tray 1 towards the loaded position in the manner hereinbefore described. Up until the optical disc on the subtray then drawn to the loaded position is clamped in position as shown in FIG. 10, the gear 38 is released from a locked condition by sliding engagement of the pin 101b rigid with the mode lock lever 101 in the arcuate groove 101b in the main gear assembly 17.

When the optical disc drive apparatus is to be assembled, the loading hook member 49 as shown in FIG. 8 has to be moved in a direction counter to the direction of the arrow I and the gear 30a has to be rotated in a direction shown by the arrow T to eliminate any possible rattling motion which would otherwise result from backlash and/or flexure of the gear trains. While in this condition, the gear 38 should be mounted on the chassis 13 with the pawl 101a of the mode lock lever 101 matched in phase with any one of the recesses 38a in the gear 38.

By so doing, even though the main gear assembly 17 is disengaged from the gear 38, rotation of the main gear assembly 17 causes the pawl 101a of the mode lock lever 101 to push the inclined wall segment 38d of the recess 38a in the gear 38 to thereby rotate the gear 38 to a predetermined phase at which any possible backlash is compensated for. Also, since the pawl 101a is engaged deep in the recess 38a even at the moment the main gear assembly 17 is disengaged from the gear 38, there is no possibility that the pawl 101a would push the straight wall segment 38b to reverse the gear 38 when the gear 38 is excessively loaded, and therefore, any possible occurrence of a phase shift can be advantageously eliminated.

Forced Ejector—First Embodiment

As shown in FIG. 31, a lever support plate 84 is fixedly mounted on the chassis 13 by means of a plurality of set screws so as to overlay the gear mechanism. This lever support table 84 has engagement pieces 84a, 84b and 84c integrally formed therewith, and a safety ejection lever 85 is slidably supported by those engagement pieces 84a to 84c. In FIGS. 30 and 31, the safety ejection lever 85 is shown as held still at a disengaged position at which a rack 85a formed in the safety ejection lever 85 is not engaged with a toothed portion 86 of the arcuate projection 82a fast with the main gear assembly 17. FIG. 32 illustrates the condition in which the safety ejection lever 85 is still held at the disengaged position while the main tray 1 is moved to the inserted position.

In the event of a power failure occurring while the clamp device clamps the optical disc 5, a manual pull of the safety ejection lever 85 effected after the lid 4 then closing the front opening 3 of the drive housing 2 has been opened results in that a projection 85b integral with the safety ejection lever 85 is brought into engagement with the tapered segment 82b fast with the main gear assembly 17 to drive the main gear assembly in a direction counter to the direction of the arrow C. In this condition, the safety ejection lever 85 has been moved from the disengaged position to an eject position. The resultant rotation of the main gear assembly 17 is transmitted through a gear train to the gear 39i to initiate an unloading operation in which not only is the clamp device caused to release the optical disc, but the corresponding subtray then held at the loaded position is returned to the stand-by position. It is to be noted that where the gear train is manually forcibly driven by means of the safety ejection lever 85, relative slip takes place between the input and output gears 21a and 21b of the friction gear assembly 21 to thereby disconnect the output gear 21b from a gear train ranging from the input gear 21a to the drive motor 19 and, therefore, the manual force necessary to apply to the safety ejection lever 85 can be lessened to facilitate a ready and quick manual pull of the safety ejection lever 85.

Figure 33:
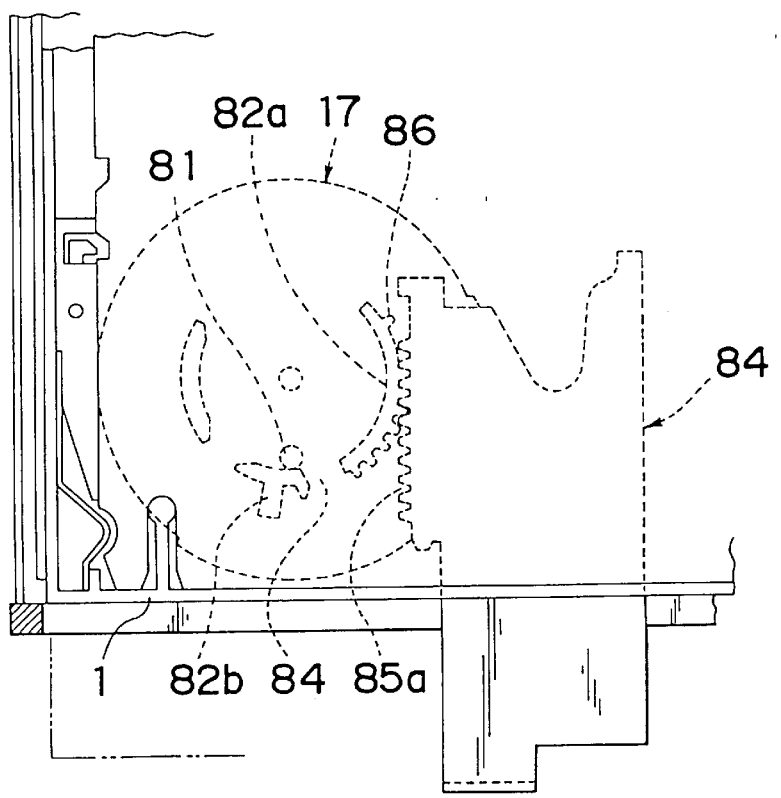
Figure 34:
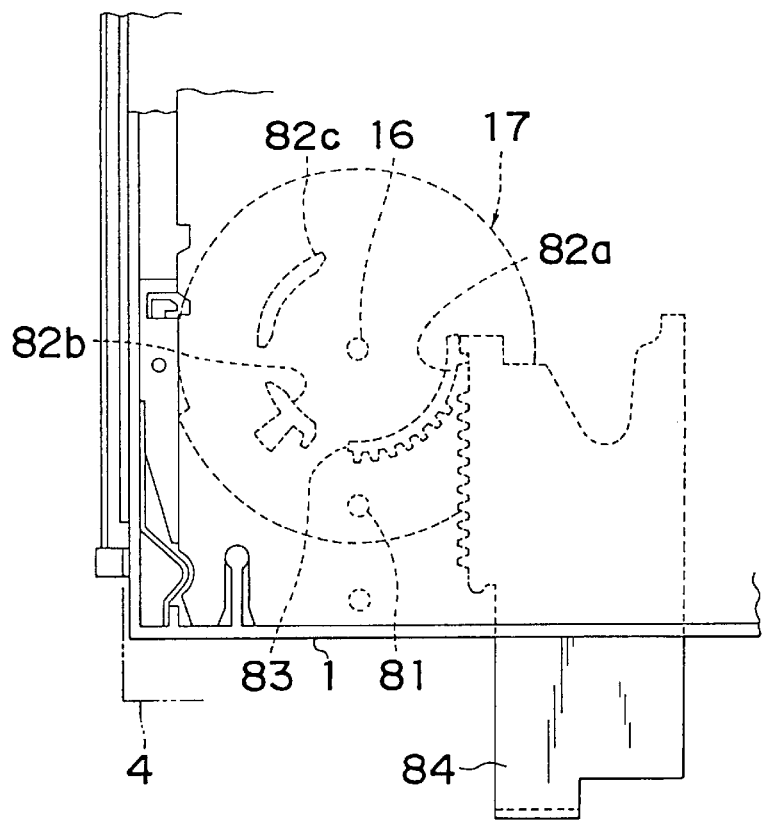
Figure 35:
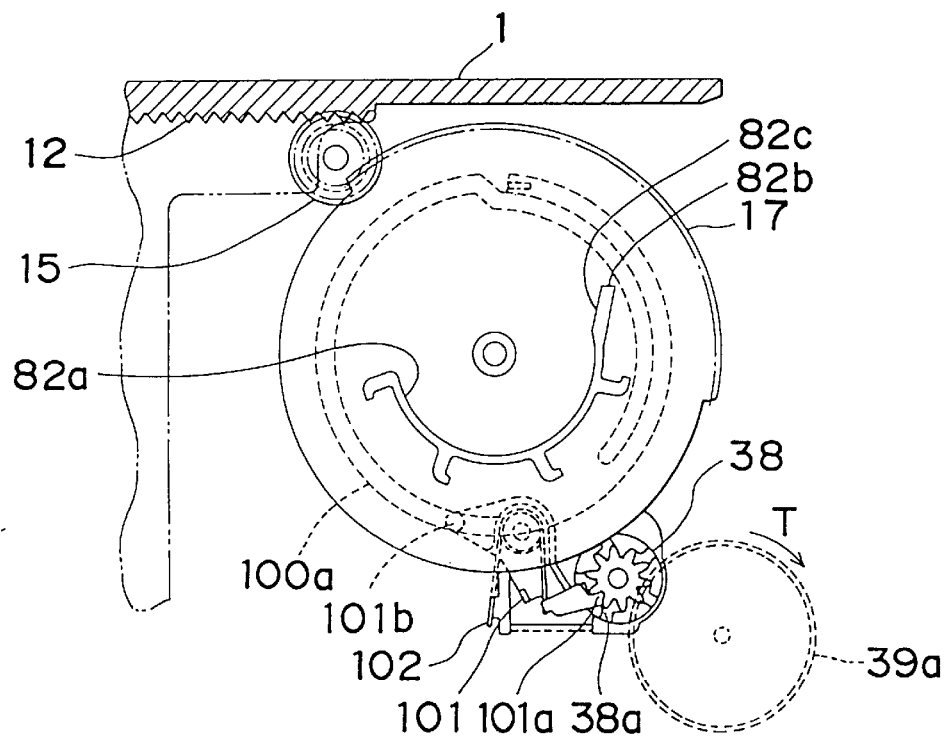
FIGS. 35 to 40 are views similar to FIGS. 32 to 34, showing a modified form of the main tray safety ejecting mechanism and also the sequence of operation of the main tray stopper mechanism and the lock mechanism for the subtray drawing mechanism.
Figure 36:
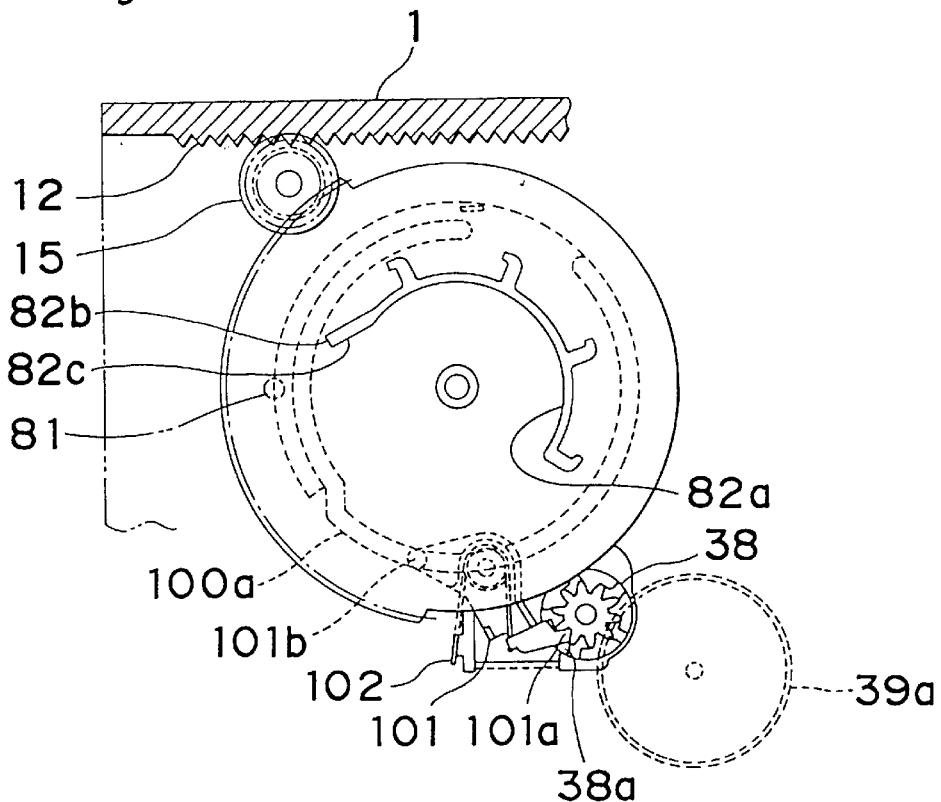
Figure 37:
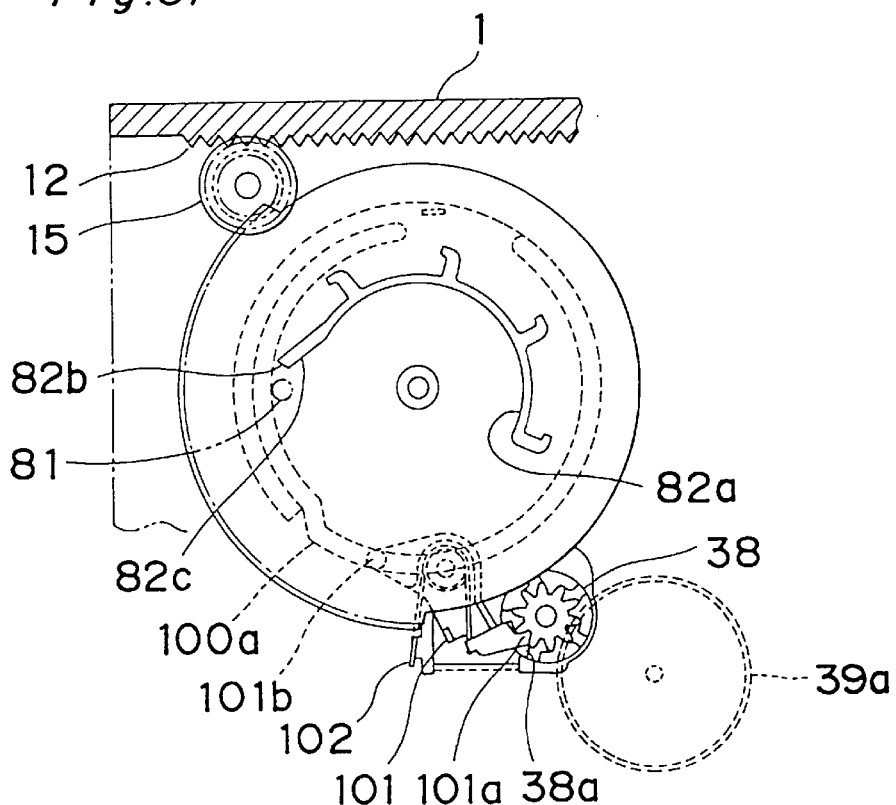
Figure 38:
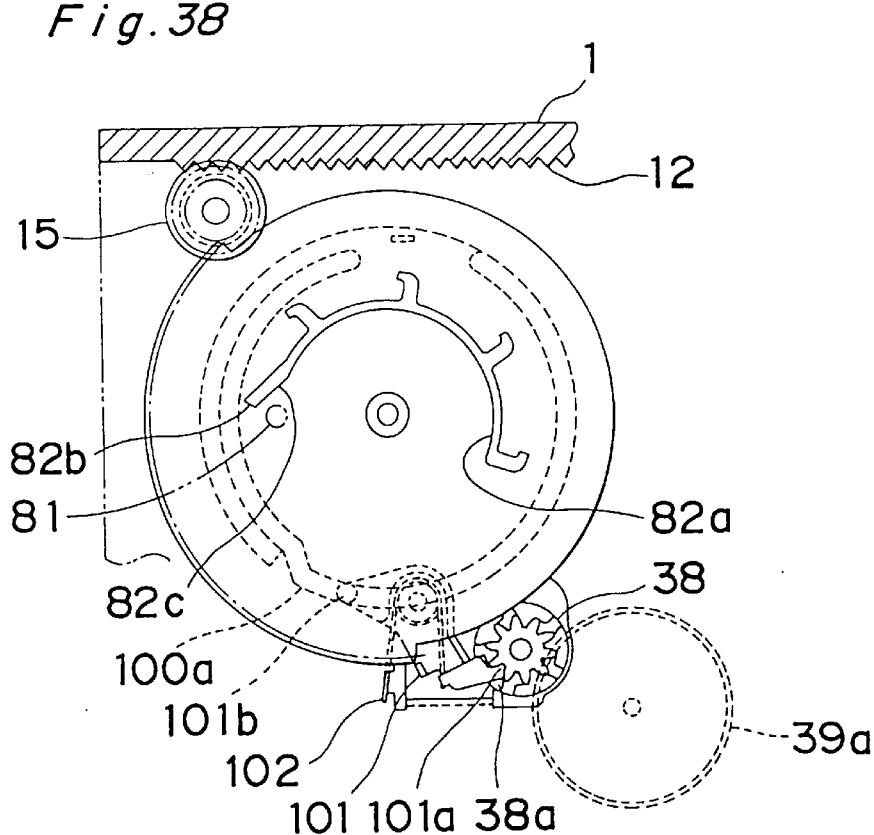

By manually forcibly pulling the safety ejection lever 85 in a direction outwardly of the drive housing 2, the rack 85a of the safety ejection lever 85 and the toothed portion 86 of the arcuate projection 82a fast with the main gear assembly 17 are meshed with each other as shown in FIGS. 33 and 34 to drive the main gear assembly 17 in a direction counter to the direction of the arrow C to thereby complete the unloading operation, accompanied by movement of the main tray 1 from the inserted position towards the withdrawn position. In this way, a forced ejection is completed.

As hereinabove described, even though power failure occurs, the unloading operation and the subsequent withdrawal of the main tray towards the withdrawn position are possible by the manipulation of the safety ejection lever 85.

As discussed above, a main tray drawing system for drawing the main tray towards the inserted position is constituted by the rack 12, the pinion gear 15 and other component parts. The loading drive system for drawing one of the stacked subtrays from the stand-by position towards the loaded position and also for causing the clamp device to claim the optical disc placed on the subtray then drawn to the loaded position in response to completion of the drawing of such subtray is constituted by the gears 38, 39a to 39i, the sector gear 42, the loading hook member 49, the clamp drive rack 76, the clamp support plate 79 and other component parts. Also, the elevating system for selectively lifting and lowering the loading drive system in a direction parallel to the direction, in which the subtrays are stacked one above the other on the main tray 1, so that one of the stacked subtrays on the main tray 1 then held at the inserted position can be drawn towards the loaded position is constituted by the large-diameter gear 63, the right and left guide plates 66R and 66L and other component parts, and a first drive switching means for transmitting rotation of the drive motor 19 selectively to one of the main tray drawing system and the loading drive system is constituted by the main gear assembly 17 and other component parts.

A second drive switching means interposed between the drive motor 19 and the first drive switching means for transmitting rotation of the drive motor 19 selectively to one of the first drive switching means and the elevating system is constituted by the intermittent gear 56, the idler gear 30, the solenoid unit 61 and other component parts. Accordingly, even though the single drive motor 19 is employed in the practice of the present invention, drawing of the main tray, the loading of the optical disc and the selective lifting and lowering of the loading device can be accomplished by respective switching operations of the first and second drive switching means.

Also, when the safety ejection lever 85 is manipulated when the loading of the optical disc has been completed, the loading drive system is reversed to return the subtray and the optical disc then held at the loaded position back to the stand-by position, and further manipulation of the safety ejection lever 85 results in reversed rotation of the main tray drawing system to return the main tray then held at the inserted position back to the withdrawn position. Accordingly, even though the drive motor 19 is halted, all of the optical discs on the respective subtrays can be ejected out of the drive housing.

Although in the foregoing embodiment the main gear assembly 17 has been described as manually rotated by means of the safety ejection lever 85, the use of the safety ejection lever 85 is not always essential in the practice of the present invention. Where no safety ejection lever 85 is employed, the unloading and the subsequent return of the main tray back to the withdrawn position can be accomplished by manually rotating the main gear assembly 17 directly while the lid 4 is opened as shown in FIG. 2.

Forced Ejector—Second Embodiment

Figure 42:
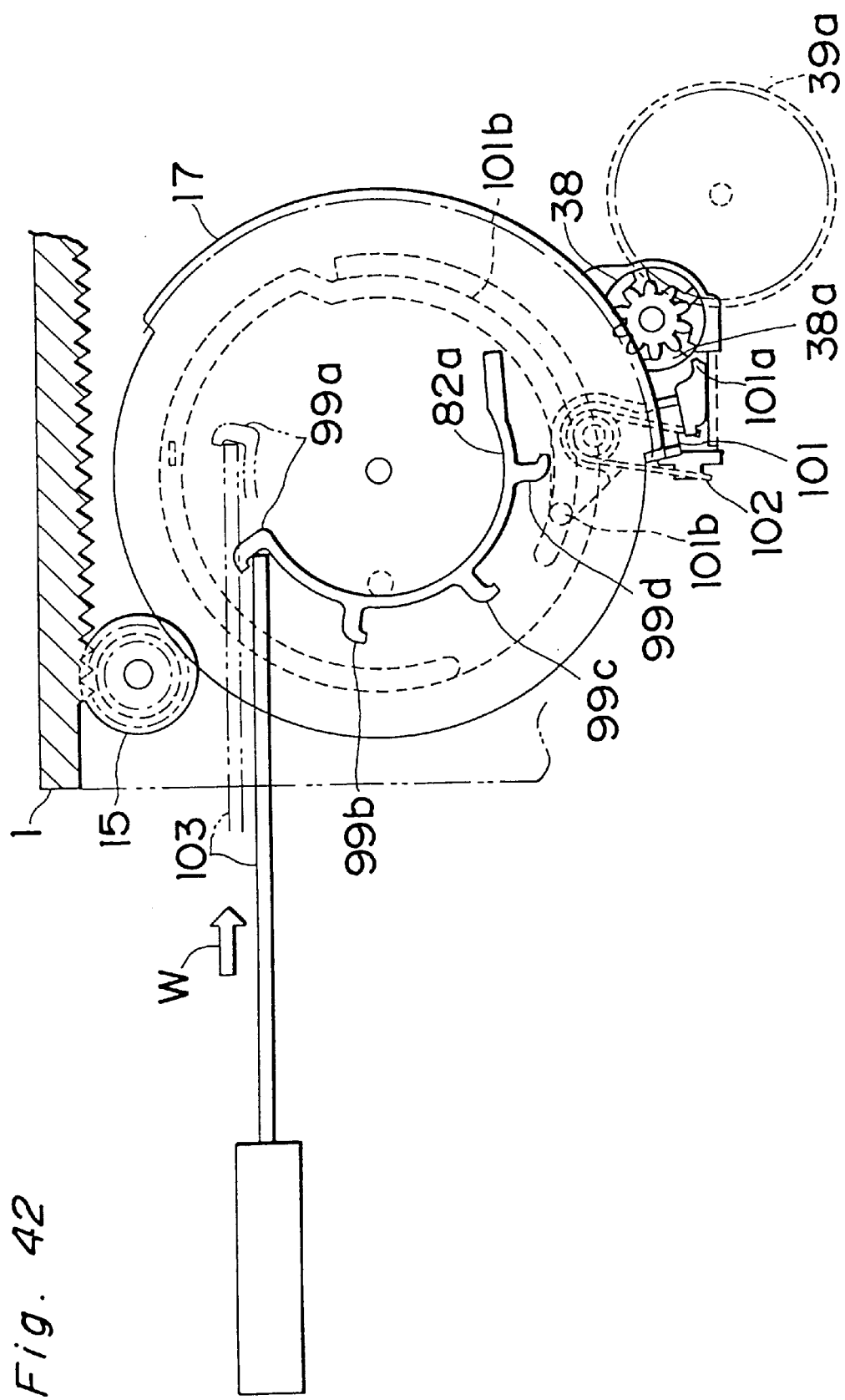
FIGS. 42 to 46 are views similar to FIGS. 32 to 34, showing the sequence of operation of the modified main tray safety ejecting mechanism.

A second embodiment of the forced ejector for forcibly ejecting the main tray carrying the subtrays back to the withdrawn position will now be described. As shown in FIG. 42, the main gear assembly 17 has its surface formed with a plurality of key-shaped projections (engagements) 99a to 99d for engagement with a free end of a safety ejection rod (an auxiliary drive member) 103 adapted to be inserted from outside of the drive housing 2.

While in the condition shown in FIG. 42 and the apparatus malfunctions by any reason, the lid 4 has to be opened manually and the safety ejection rod 103 should then be inserted to extend into a gap between the main tray 1, then inserted into the disc chamber, and the main gear assembly 17 until the free end of the safety ejection rod 103 is brought into engagement with the key-shaped projection 99a. Starting from this condition, the safety ejection rod 103 has to be pushed in a direction shown by the arrow W to rotate the main gear assembly 17 to a position shown by the double-dotted chain line to thereby release the optical disc from the clamp device. Since the key-shaped projections 99a to 99d are so shaped as to represent a generally channel-shape, the free end of the safety ejection rod 103 once engaged with any one of the key-shaped projections 99a to 99d will not be disengaged therefrom during rotation of the main gear assembly 17.

Figure 43:
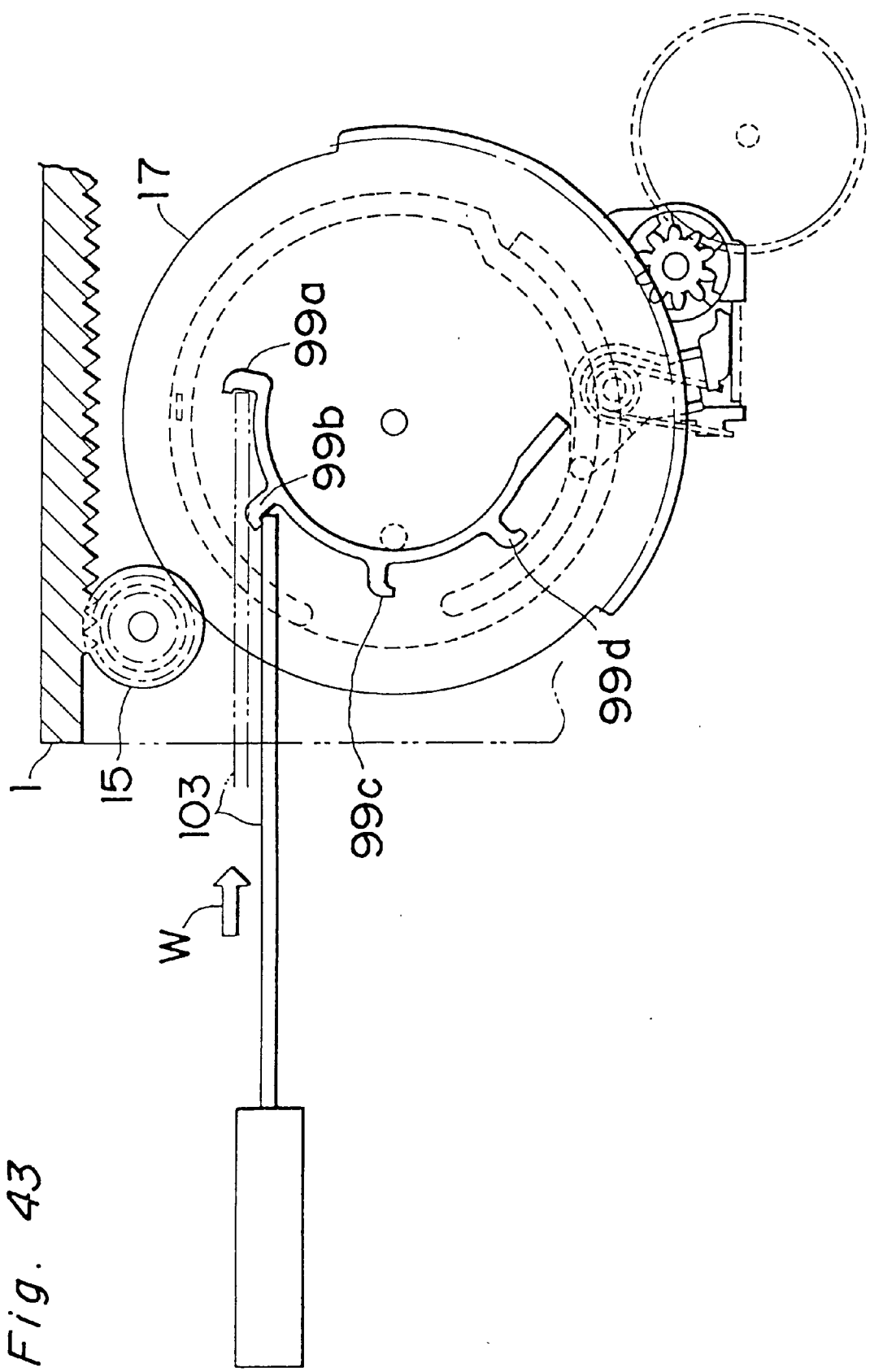
Figure 44:
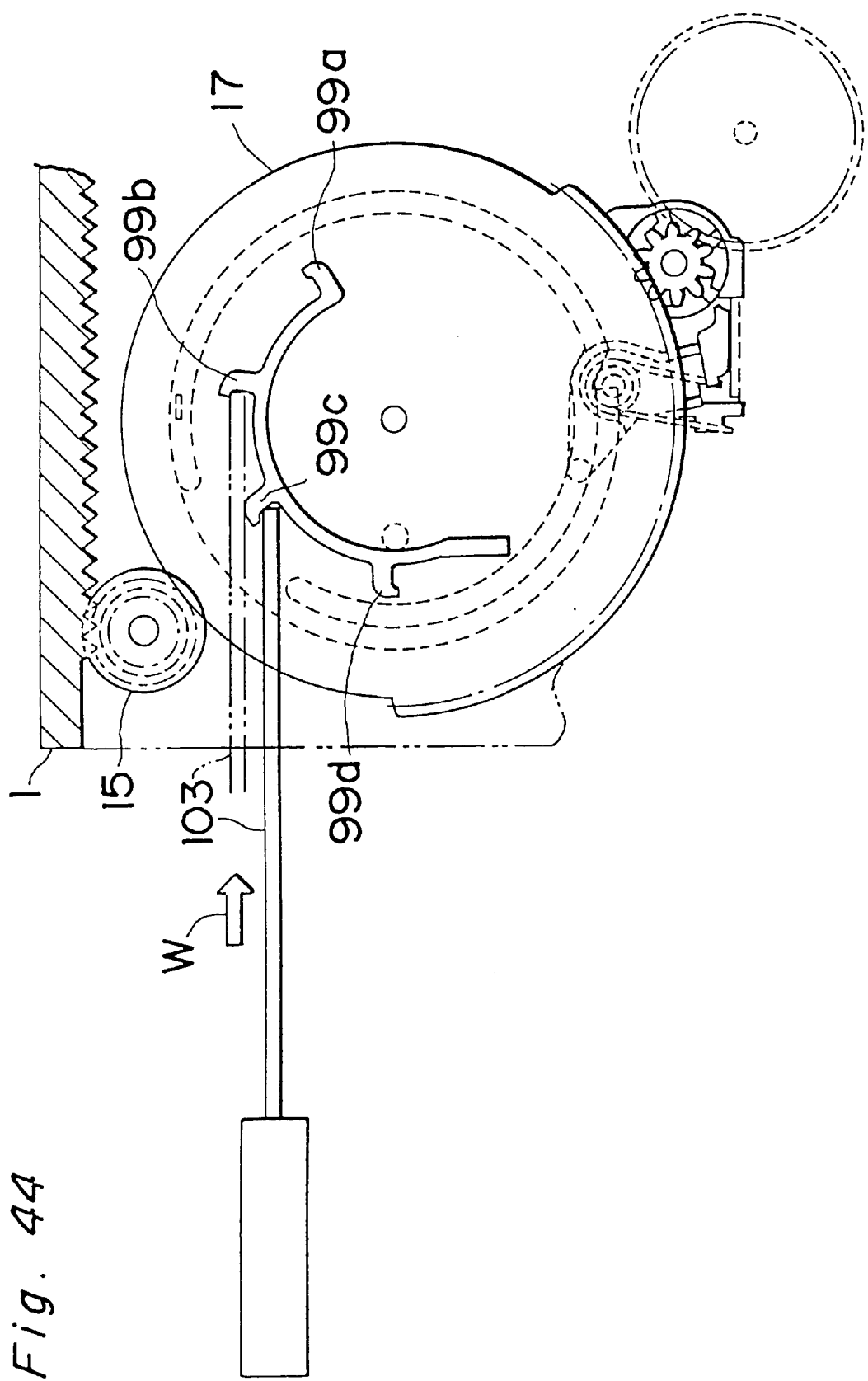
Figure 45:
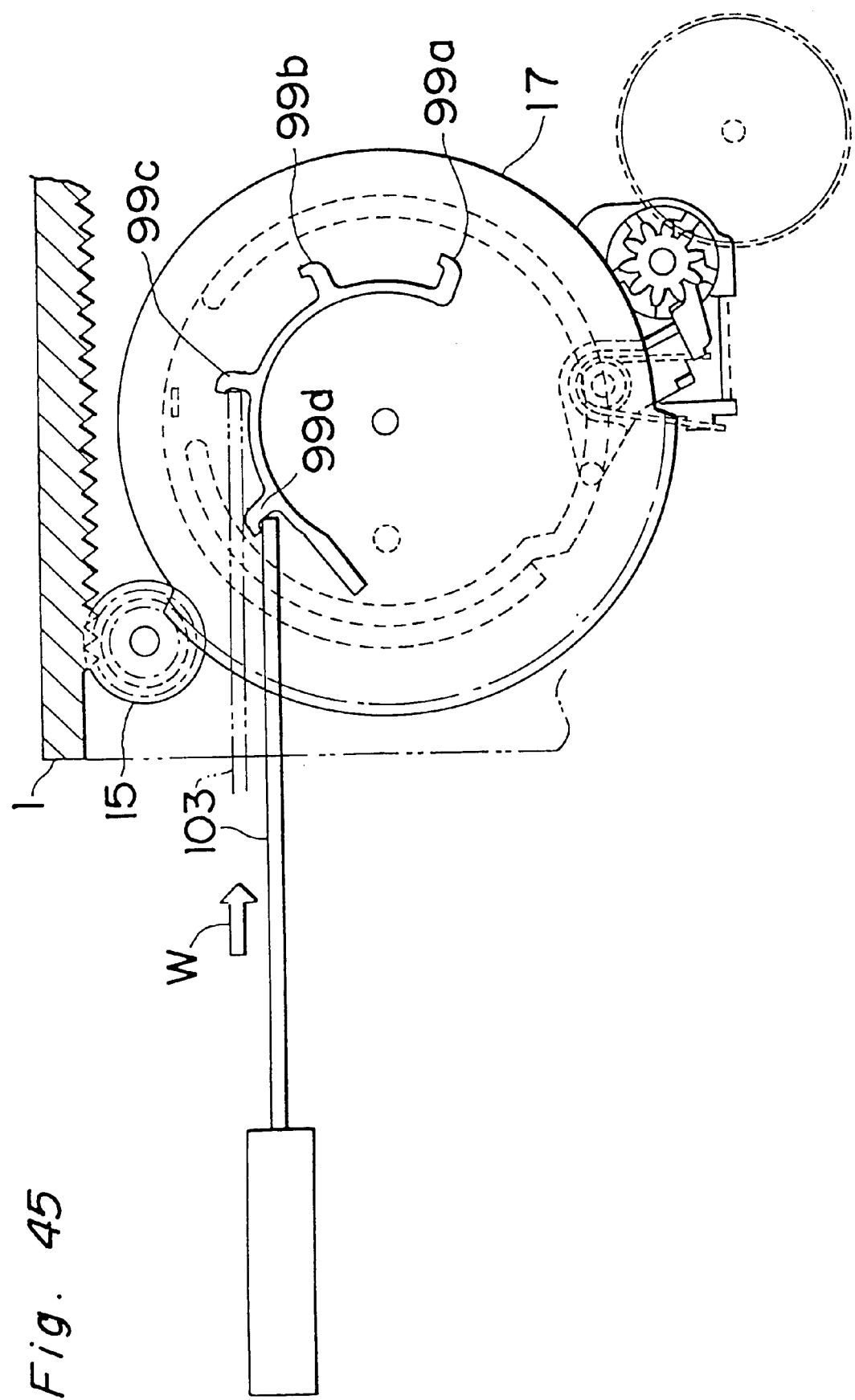
Figure 46:
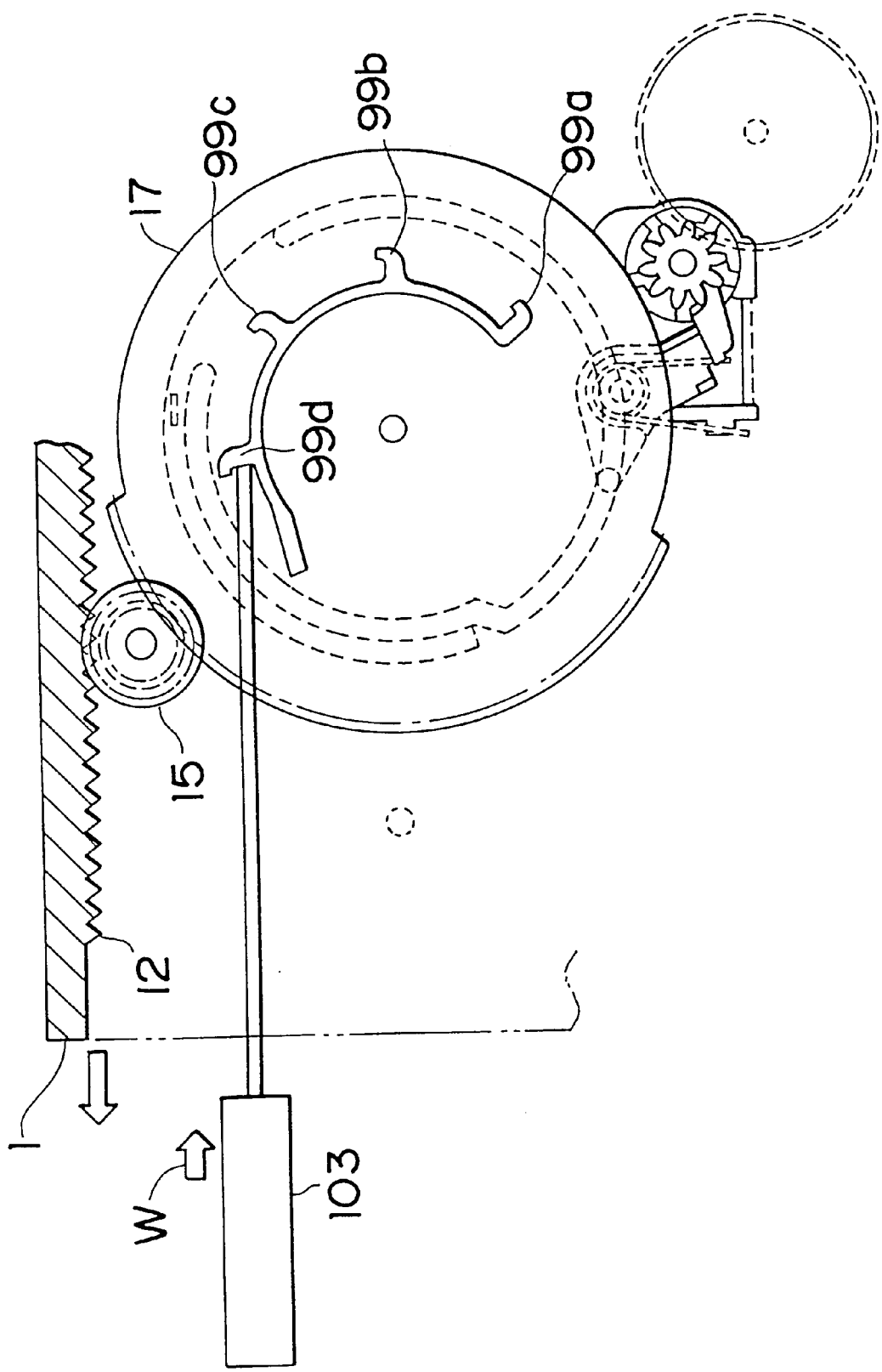
Figure 47:
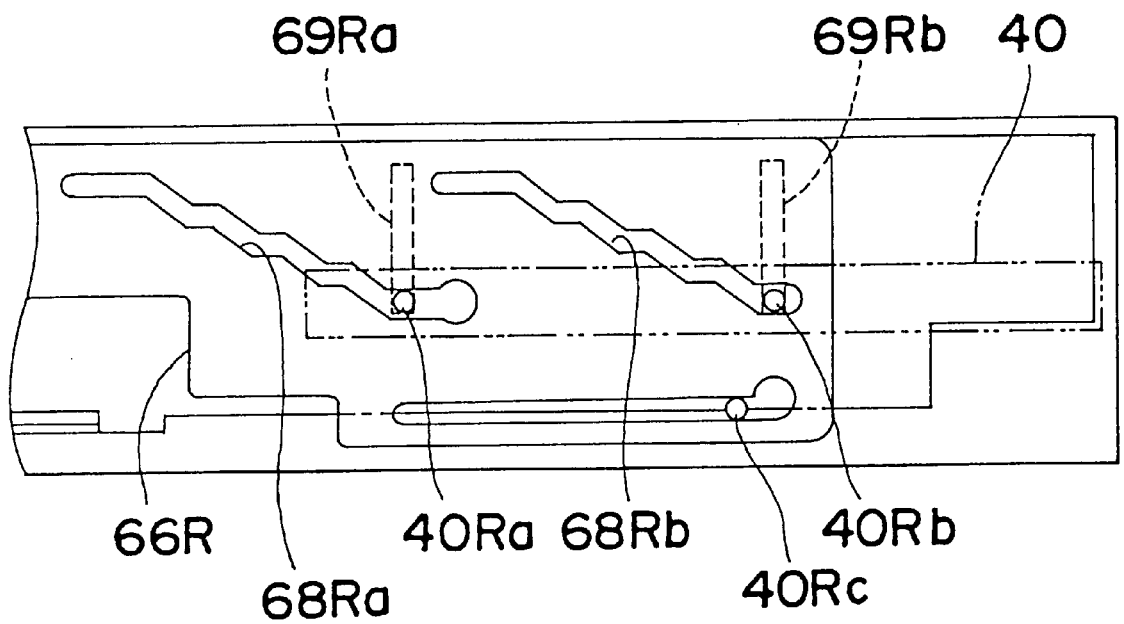
FIGS. 47 and 48 are fragmentary side views of the right and left guide plates, respectively, showing the elevating mechanism held in position to permit the lowermost subtray to be loaded.
Figure 48:
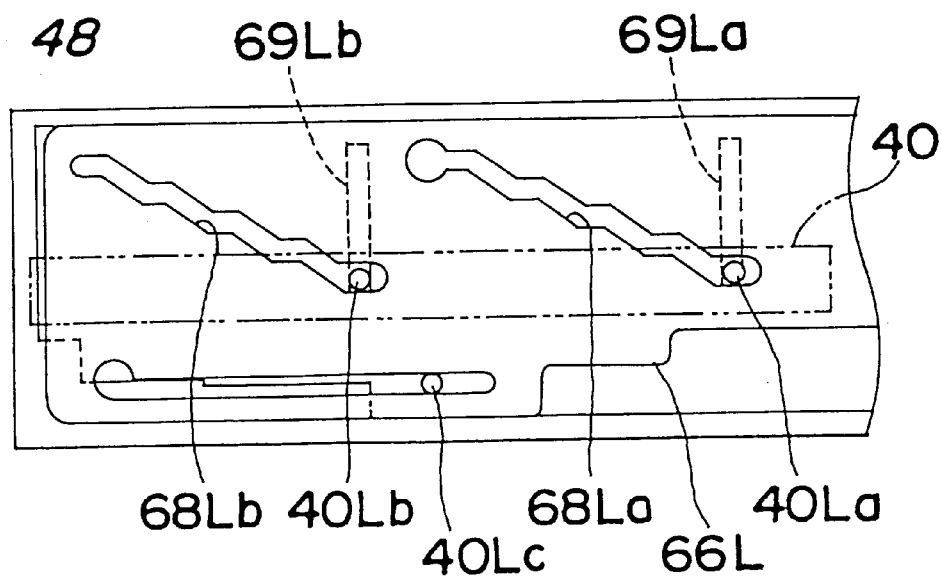
Figure 49:
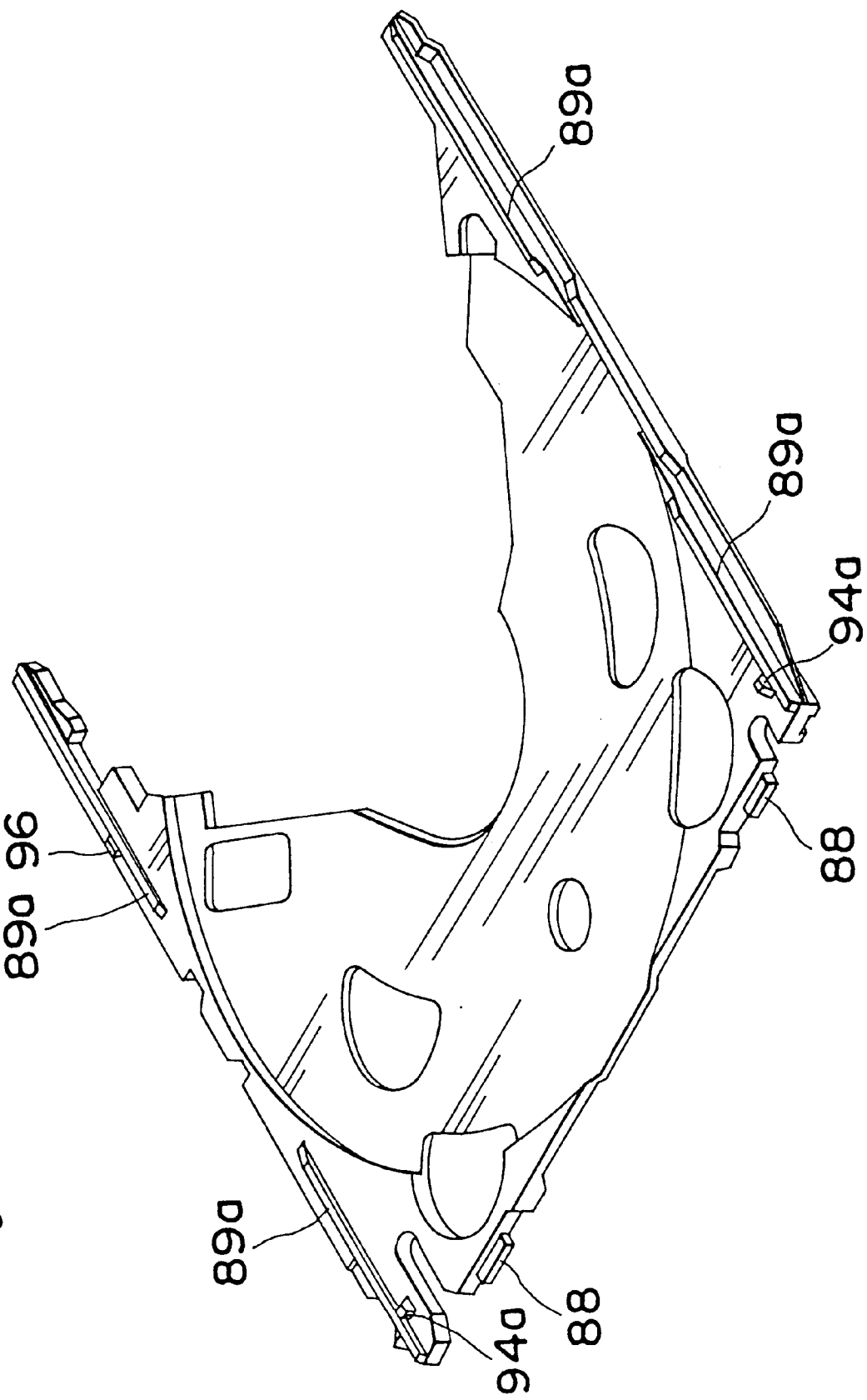
FIG. 49 is a schematic perspective view of one of the subtrays employed in the present invention, as viewed from the bottom, but at an angle different from the angle at which the subtray shown in FIG. 3 is viewed.

As the safety ejection rod 103 is pushed in the direction of the arrow W, the safety ejection rod 103 will no longer be pushed because the next succeeding key-shaped projection 99b is brought into contact with the safety ejection rod 103 as shown in FIG. 43. Once this occurs, the safety ejection rod 103 should be withdrawn a certain distance in a direction counter to the direction of the arrow W and be again pushed t allow the free end thereof to be engaged with the next succeeding key-shaped projection 99b. This procedure is repeated four times as shown in FIGS. 42 to 45 until the main gear assembly 17 is rotated an angular distance corresponding to the angular distance from the key-shaped projection 99a to the key-shaped projection 99d. By so doing, the main tray 1 can be withdrawn a certain distance out of the drive housing 2 as shown in FIG. 46 and a complete return of the main tray 1 back to the withdrawn position is accomplished when the user subsequently manually pulls the main tray 1.

At that time, one or some of the subtrays positioned above the subtray then drawn to the loaded position remain within the disc chamber of the drive housing 2. In order that the entire number of the subtrays including such one or some of the subtrays can be withdrawn out of the drive housing together with the main tray 1, the subtrays $6_1$ to $6_5$ employed in the practice of the present invention are preferably made of synthetic resin having a relatively small thickness. In other words, in order for the subtray or subtrays remaining within the disc chamber to be removed out of the disc chamber, it or they should be elastically deformed to allow it or them to escape from engagement with the corresponding holder lever or levers $74_1$ to $74_4$. By so doing, the subtray or subtrays remaining within the disc chamber can be forcibly removed out of the disc chamber.

As discussed above, a main tray drawing system for drawing the main tray towards the inserted position is constituted by the rack 12, the pinion gear 15 and other component parts. The loading drive system for drawing one of the stacked subtrays from the stand-by position towards the loaded position and also for causing the clamp device to claim the optical disc placed on the subtray then drawn to the loaded position in response to completion of the drawing of such subtray is constituted by the gears 38, 39a to 39i, the sector gear 42, the loading hook member 49, the clamp drive rack 76, the clamp support plate 79 and other component parts, and the drive switching means is constituted by the main gear assembly 17 formed by the intermittent gear. The drawing inhibiting means is constituted by the mode lock lever 101 having the pawl 101a adapted to drive the gear 38 to minimize the backlash. Accordingly, even though the single drive motor 19 is employed in the practice of the present invention, the subtray loading operation and the main tray drawing operation can be accomplished with no phase shift occurring therebetween.

Also, since the safety ejection rod 103 is adapted to repeatedly inserted to sequentially engage with the key-shaped projections 99a to 99d fast with the main gear assembly 17, the subtray then held at the loaded position can be removed out of the drive housing together with the main tray.

Furthermore, where the disc drive apparatus of the present invention is transported from place to place, the elevating table 40 is lowered to the lowermost position with the pins 40Ra and 40Rb, 40La and 40Lb rigid with the elevating table 40 supported in the respective vertical slots 69Ra and 69Rb, 69La and 69Lb defined in the chassis. Accordingly, the drive apparatus of the present invention is robust against an external impact.

Positional Control of (n+1)th Subtray

Figure 50:
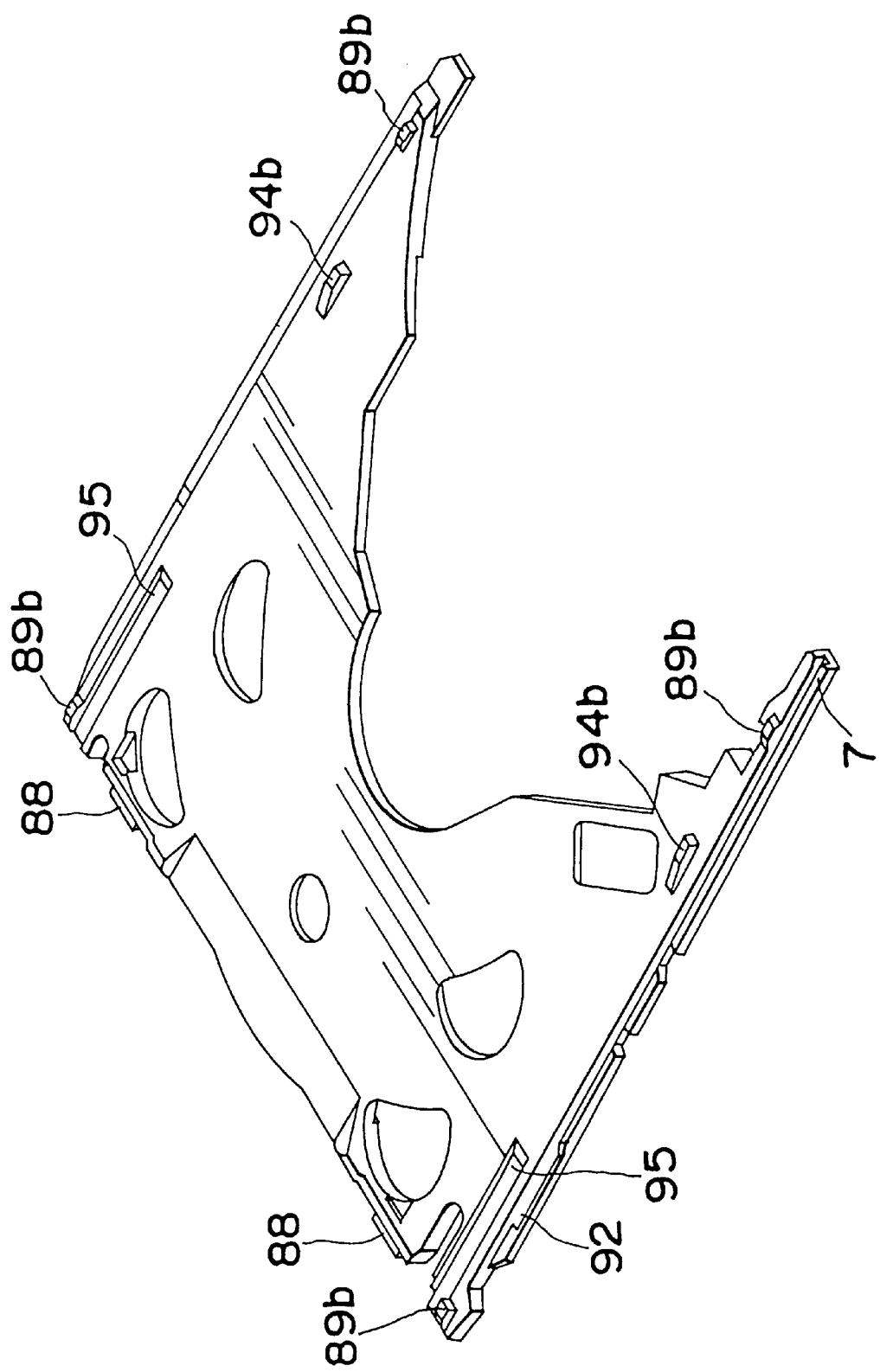
FIG. 50 is a schematic perspective view of each subtray as viewed from the bottom.
Figure 51:
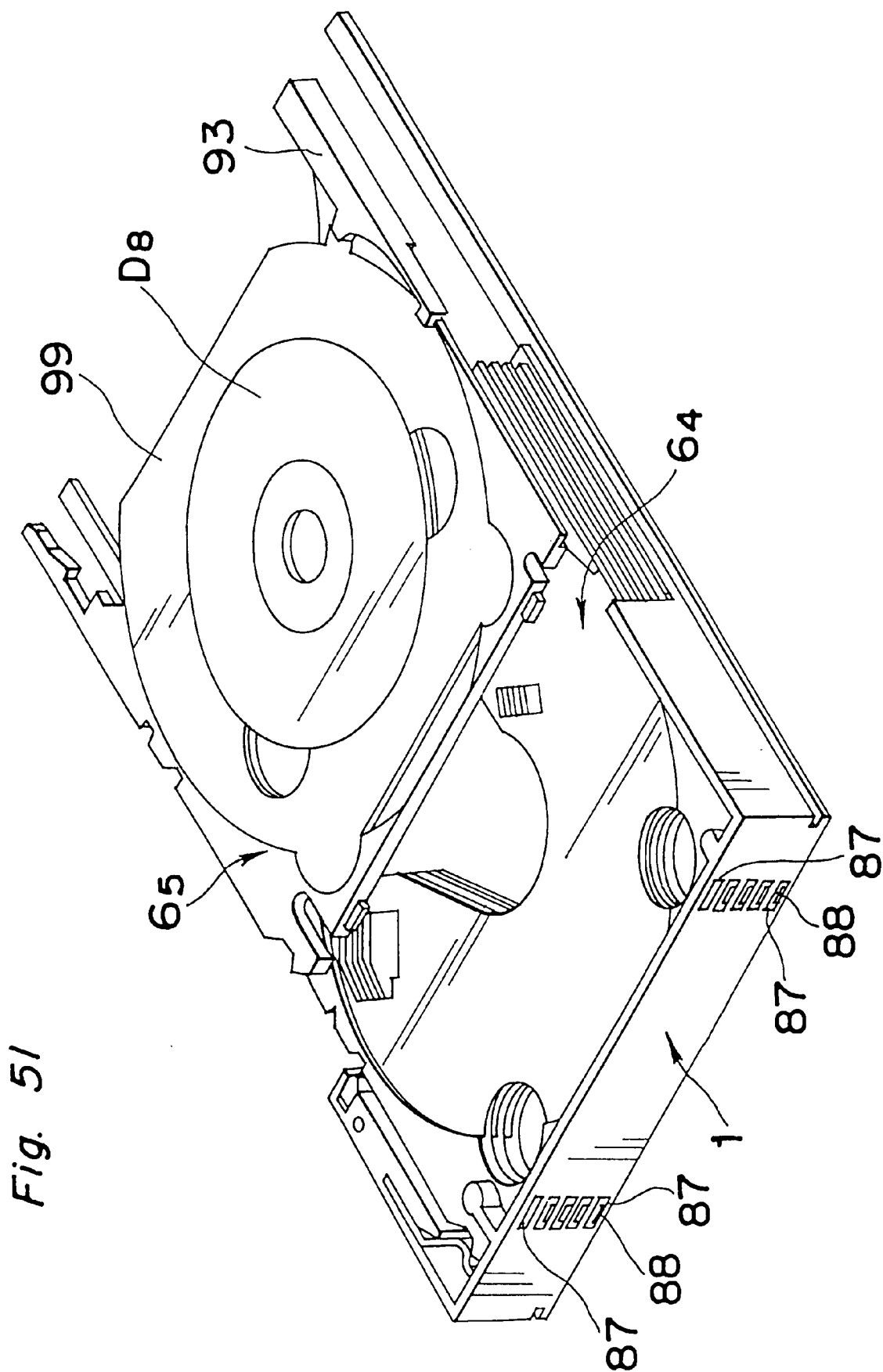
FIG. 51 is a perspective view of the main tray having the subtrays stacked thereon with the uppermost subtray being drawn from the stand-by position towards the loaded position.

The structural details of each of the subtrays $6_1$ to $6_5$ are shown in FIGS. 49 to 52. As shown therein, each subtray is of a generally rectangular configuration having a front edge formed with a pair of nails 88 engageable in corresponding slots 87 defined in a front wall of the main tray 1 as shown in FIG. 51. Each subtray also has a rear portions formed with upper and lower pairs of spacer ribs 89a and 89b, the spacer ribs 89a of the upper pair protruding outwardly from an upper surface thereof and the spacer ribs 89b of the lower pair protruding outwardly from the undersurface thereof. It is to be noted that the uppermost one of the subtrays $6_1$ to $6_5$ stacked on the main tray 1 is shown as having mounted thereon an optional adaptor 99 with which an optical disc $D_8$ of a smaller diameter can be placed on the subtray.

So long as the main tray 1 is held at the withdrawn position, the stacked subtrays $6_1$ to $6_5$ are uniformly spaced within the main tray with the nails 88 engaged in the respective slots 87 in the front wall of the main tray and with the lower pair of the spacer ribs 89b of one subtray resting on the upper pair of the spacer ribs 89a of the subtray immediately above such one subtray as shown in FIG. 52A.

However, when the main tray 1 having the subtrays $6_1$ to $6_5$ stacked thereon is moved to the inserted position, the respective rear portions of the subtrays $6_1$ to $6_5$ are supported by the fixed guide blocks 11a and 11b, as shown in FIG. 52B, with the ribs 10 engaged in the grooves 8 each defined between the neighboring subtrays stacked on the main tray 1 as hereinbefore described. Accordingly, as compared with the case in which holding members are used and provided in the main tray to keep the respective rear portions of the stacked subtrays apart from each other, the position of any one of the subtrays $6_1$ to $6_5$ stacked on the main tray 1 relative to the loading mechanism can be accurately controlled.

Since according to the present invention such holding members need not be employed, the drive apparatus as a whole can be assembled compact by disposing on both sides of the path of movement of the main tray 1 a lock mechanism for the subtrays such as comprised of the first to fourth holder levers $74_1$ to $74_4$ disposed in a space in front of the fixed guide block 11a.

Figure 53:
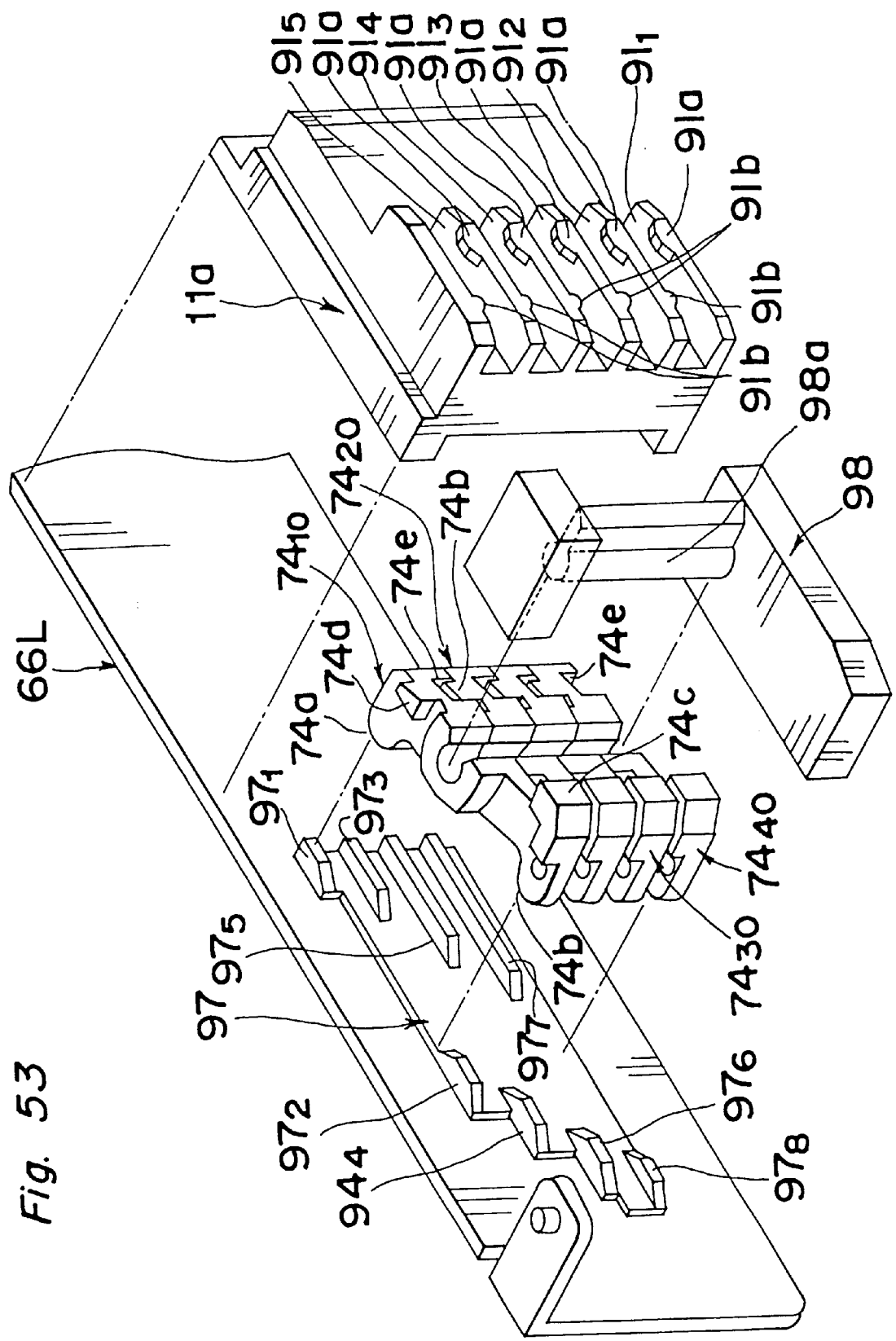
FIG. 53 is an exploded view of a modified form of the subtray holder and the lock mechanism for the subtrays.

It is to be noted that although in FIG. 15 a portion of the lock mechanism for the subtrays and the fixed guide block 11a have been shown as formed integrally with the holder 73, in the example shown in FIG. 53 the subtray lock mechanism and the fixed guide block 11a are shown as members separate from each other.

Referring now to FIG. 53, the fixed guide block 11a shown therein has defined therein holding passages $91_1$ to $91_5$ for supporting the respective subtrays $6_1$ to $6_5$ and is formed with guide projections 91a, each protruding a slight distance upwardly into the associated holding passages $91_1$ to $91_5$, and control projections 91b each operable to suppress any possible lateral displacement of the subtrays and protruding a slight distance downwardly into the associated holding passages $91_1$ to $91_5$ and positioned forwardly of the corresponding guide projection 91b with respect to the direction of insertion of the main tray 1. Each guide projection 91a is engageable in a groove (see FIGS. 50 and 54) delimited by the L-sectioned support step 7, formed on the undersurface of each subtray $6_1$ to $6_5$, to suppress any possible lateral displacement of the subtray in a direction generally perpendicular to the direction of movement of the main tray 1 between the withdrawn and inserted positions. The function of the control projections 91b will further be described in detail later.

Figure 54:
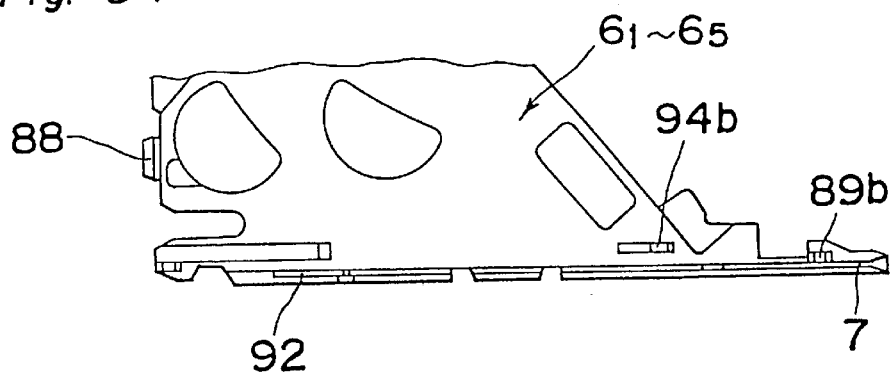
FIG. 54 is a fragmentary top plan view, showing a portion of each subtray.
Figure 55A:
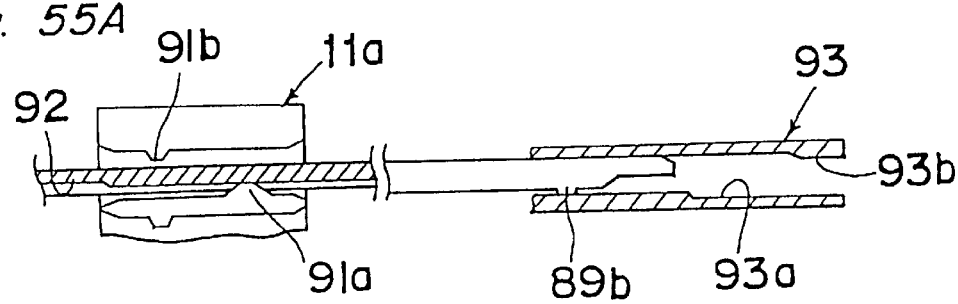
FIGS. 55A and 55B are schematic side sectional views, showing how the subtray being drawn towards the loaded position is stabilized.
Figure 55B:
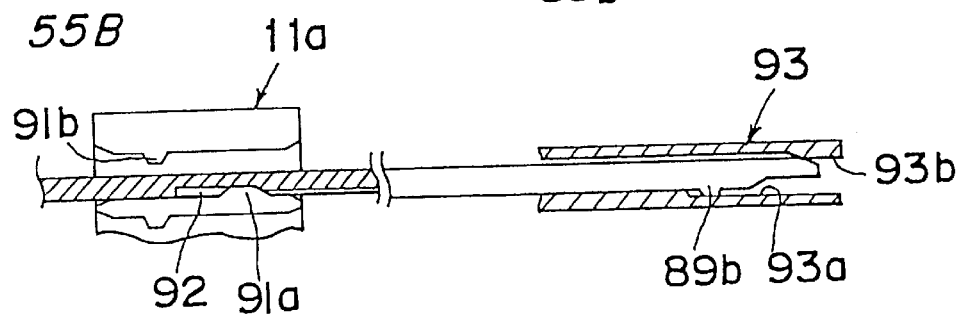

A front end of the groove delimited by the support step 7 on one side edge of each subtray $6_1$ to $6_5$ is formed with a recess 92 as shown in FIGS. 50 and 54. FIG. 55A illustrates the condition in which the subtray is being loaded and FIG. 55B illustrates the condition in which the subtray is loaded to a position a slight distance preceding the loaded position. The recess 92 in each of the subtrays $6_1$ to $6_5$ is so positioned that when the subtray is loaded to the position shown in FIG. 55B, the associated guide projection 91a can be engaged in such recess 92. Accordingly, as shown in FIG. 55B, when one of the subtrays $6_1$ to $6_5$ is loaded, the front end of such subtray is lowered a distance corresponding to the depth of the recess 92.

Also, as shown in FIGS. 51 and 55, the elevating table 40 includes a depressing means such as a depressor member 93 fixed thereto, with which one of the subtrays drawn out from the stack engages during its movement from the position a slight distance preceding the loaded position to the loaded position. As shown in FIG. 55B, shortly before the loading is completed, the spacer ribs 89b in each subtray are engaged in respective recesses 93a defined in a lower surface portion of the depressor member 93 defining a guide groove in cooperation with an upper surface portion thereof, while the rear portion of the subtray is depressed downwardly in contact with a projection 93a defined in the upper surface defining the guide groove in the depressor member 93. Accordingly, not only is the front end of the subtray lowered, but the rear portion thereof is also lowered, as the subtray then drawn towards the loaded position approaches the loaded position.

One of the subtrays $6_1$ to $6_5$ so drawn to the loaded position in the manner described above is, after having passed through a gap in the clamping device for clamping and driving the optical disc, lowered a slight distance to thereby minimize the amount of movement of the clamp device that takes place when the latter clamps the optical disc.

Figure 56:
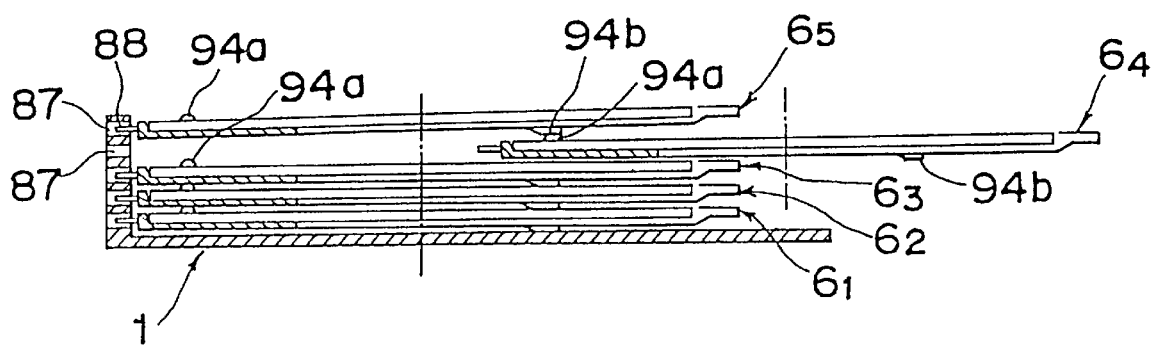
FIG. 56 is a schematic side sectional view of the main tray having the stacked subtrays thereon, showing the subtray immediately below the uppermost subtray being drawn towards the loaded position.
Figure 57:
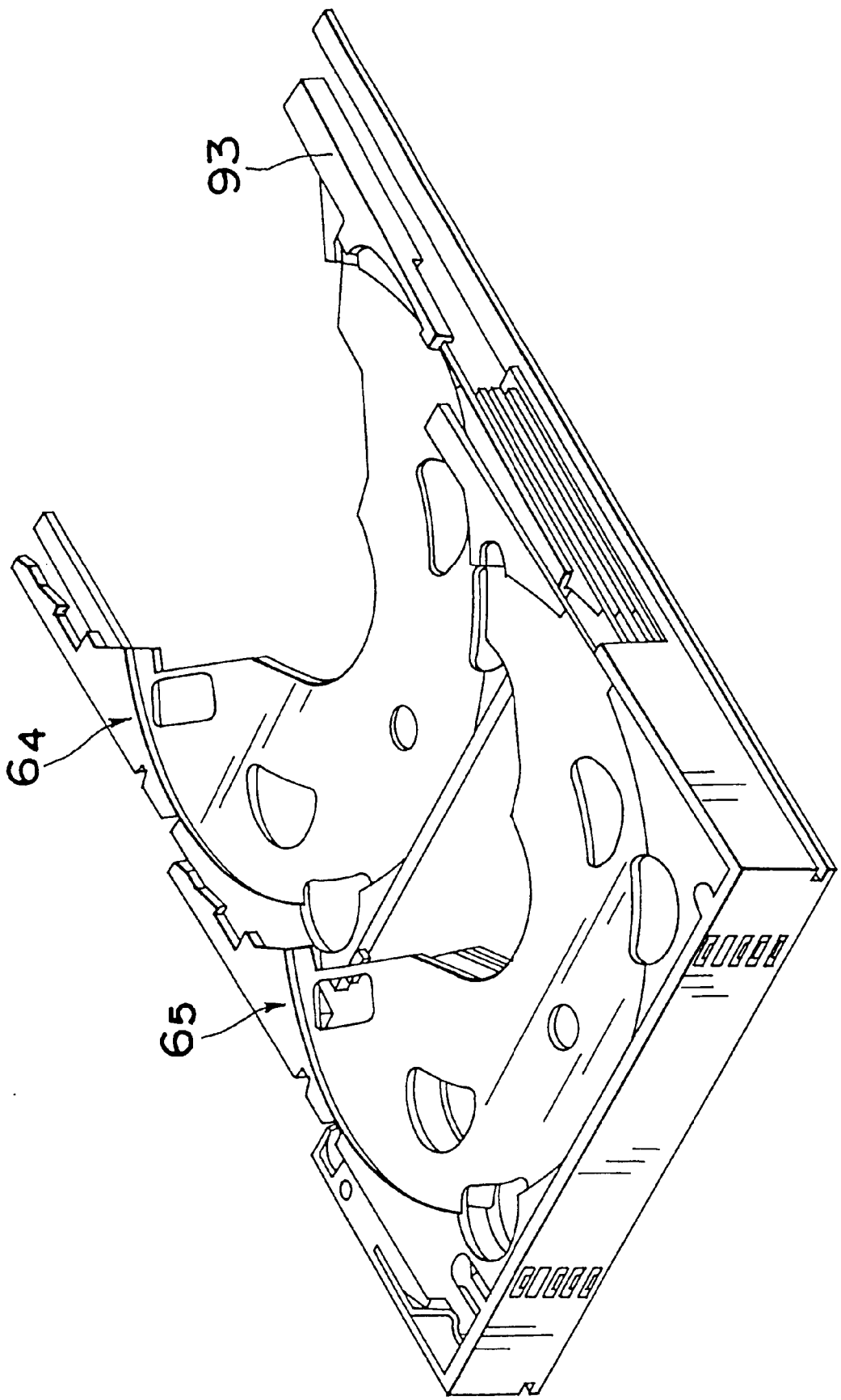
FIG. 57 is a view similar to 51, showing the subtray immediately above the lowermost subtray being drawn to the loaded position.

When the subtray drawn towards the loaded position is, after having been lowered in the manner described above, further drawn to a completely loaded position, a first projection 94a formed on the upper surface of the n-th subtray then drawn form the stack of the subtrays on the main tray 1 is brought into engagement with a second projection 94b formed on the undersurface of the (n+1)th subtray (that is, another one of the subtrays positioned immediately above the n-th subtray). Where the n-th subtray is represented by the subtray $6_4$ and the (n+1)th subtray is hence represented by the subtray $6_5$, the subtray $6_5$ is, upon engagement of the first projection 94a integral with the subtray $6_4$ with the second projection 94b integral with the subtray $6_5$, pivoted a slight angle upwardly about the point of engagement between each nail 88 integral with the (n+1)th subtray $6_5$ and the associated slot 87 in the front wall of the main tray 1 to expand the space between it and the n-th subtray $6_4$ then drawn to the loaded position as shown in FIG. 56. It is to be noted that in order to avoid the possibility of the first projection 94a constituting an obstacle to reduction in thickness of the main tray 1, each of the subtrays $6_1$ to $6_5$ employed in the practice of the present invention has its undersurface formed with a recess 95 for accommodating therein the first projection 94a integral with the subtray immediately below the respective subtray when the subtrays are stacked on the main tray 1.

Thus, it is clear that even though the space between the neighboring subtrays $6_1$ to $6_5$ stacked on the main tray is minimized to eventually reduce the size of the disc drive apparatus of the present invention, the space between the n-th subtray and the (n+1)th subtray is substantially expanded during playback of the optical disc and, therefore, the optical disc resting on the n-th subtray will not interfere with the (n+1)th subtray to accomplish a stabilized operation.

In addition to the n-th subtray designed to push the (n+1)th subtray upwardly as described above, the n-th subtray does also push the (n+1)th subtray upwardly when the n-th subtray is lowered from the stand-by position and, therefore, the space between the n-th subtray held at the loading position and the (n+1)th subtray can be expanded to a size larger than that accomplished in the prior art optical disc drive apparatus. In other words, even though the space between each neighboring subtrays $6_1$ to $6_5$ stacked on the main tray is further minimized, a stabilized operation can be attained in a manner similar to that accomplished with the prior art optical disc drive apparatus. Also, the lowering of the n-th subtray takes place at a timing earlier than the upward push of the (n+1)th subtray and, therefore, there is no possibility that the lowering of the n-th subtray and the upward push of the (n+1)th subtray take place simultaneously, not the possibility that where the upward push of the (n+1)th subtray takes place at a timing earlier than the lowering of the n-th subtray, the n-th subtray and the (n+1)th subtray may move up and down simultaneously. Thus, with the optical disc drive apparatus of the present invention, the stabilized operation can be obtained.

The function of the control projections 91*b* formed in the fixed guide block 11*a* for suppressing any possible lateral displacement of the subtrays will now be described.

Figure 58A:
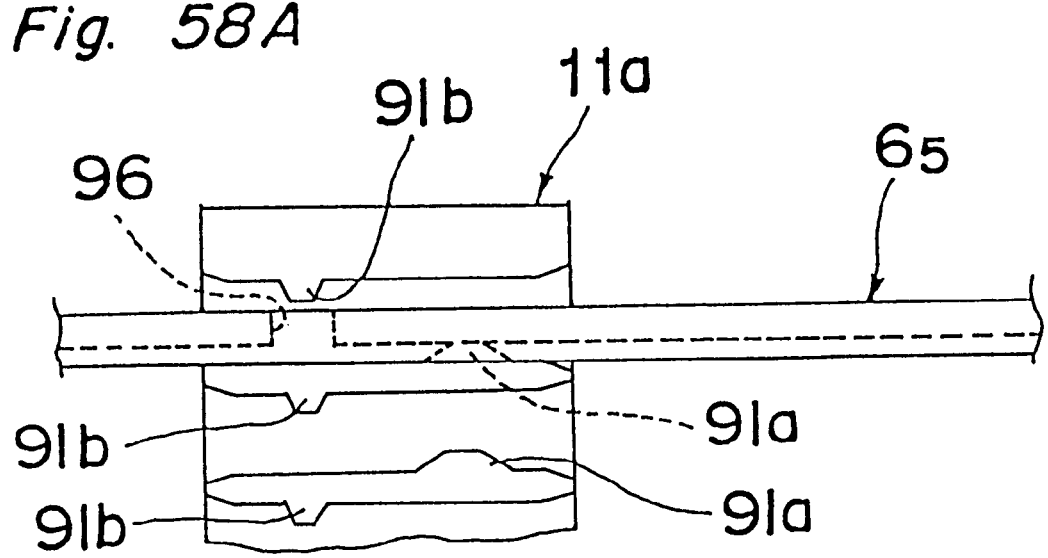
FIGS. 58A and 58B are schematic side views, showing how the subtray being drawn towards the loaded position is pushed upwardly.

Each control projection 91*b* is so formed and so positioned in the fixed guide block 11*a* relative to the (n+1)th subtray $6_5$ then held at the stand-by position as to occupy a position above a hole 96 defined in each subtray as shown in FIG. 58A. In this condition, the guide projection 91*a* is engaged in the groove delimited by the corresponding L-sectioned support step 7.

Figure 58B:
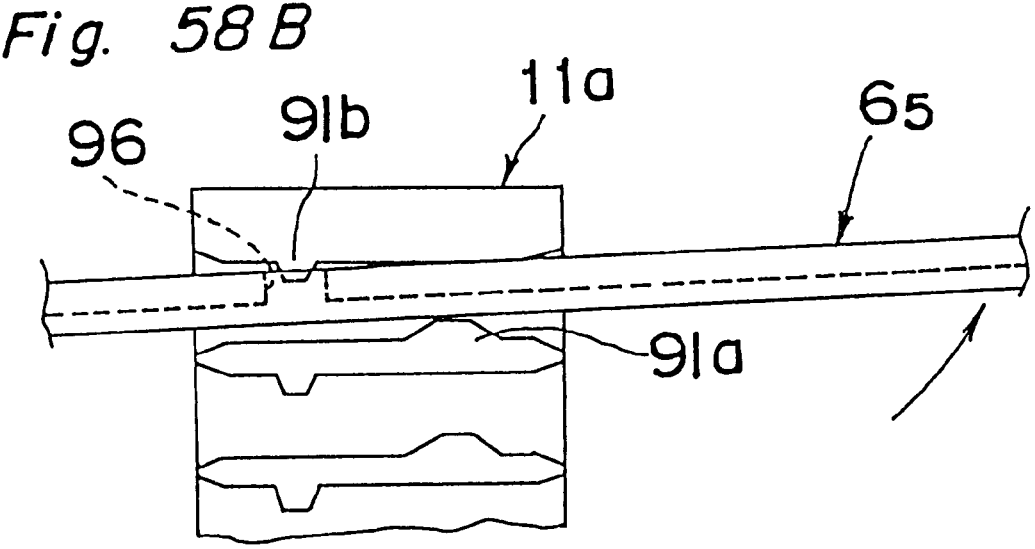
Figure 60A:
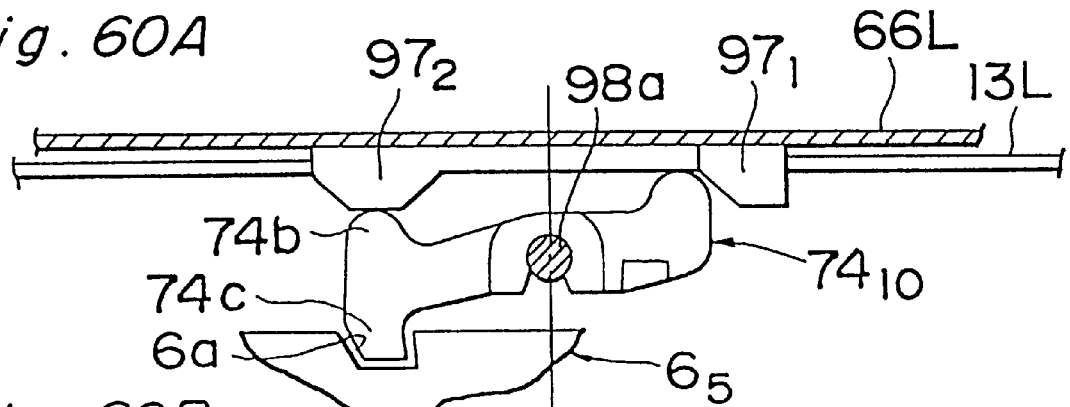
FIGS. 60A to 60D are views similar to FIGS. 18A to 18D, respectively, showing how first to fourth holder levers of the modified subtray holder are positioned relative to the associated subtrays when the optical disc resting on the subtray immediately below the uppermost one of the subtrays is in position to be played back.
Figure 60B:
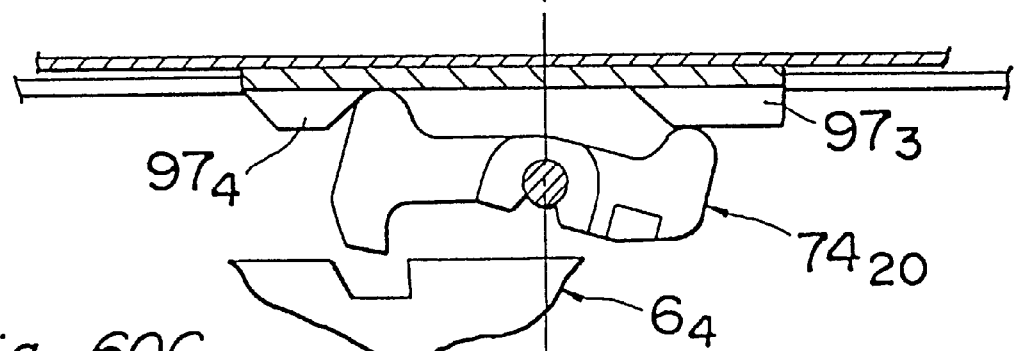
Figure 60C:
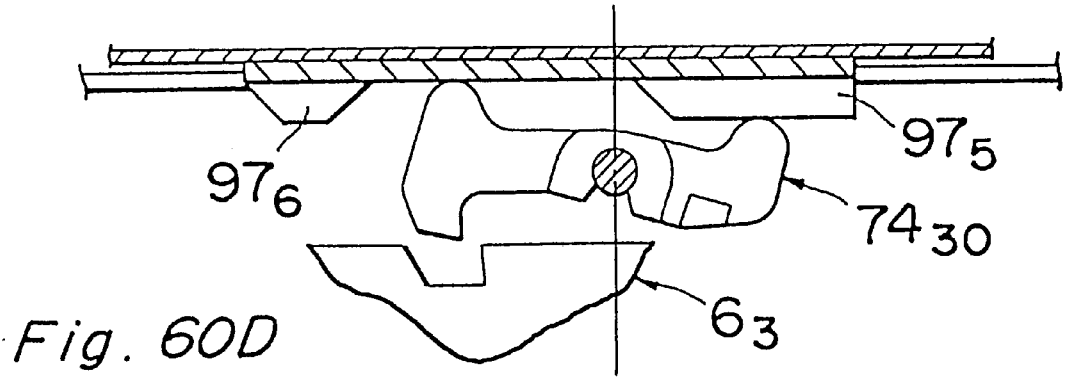
Figure 60D:
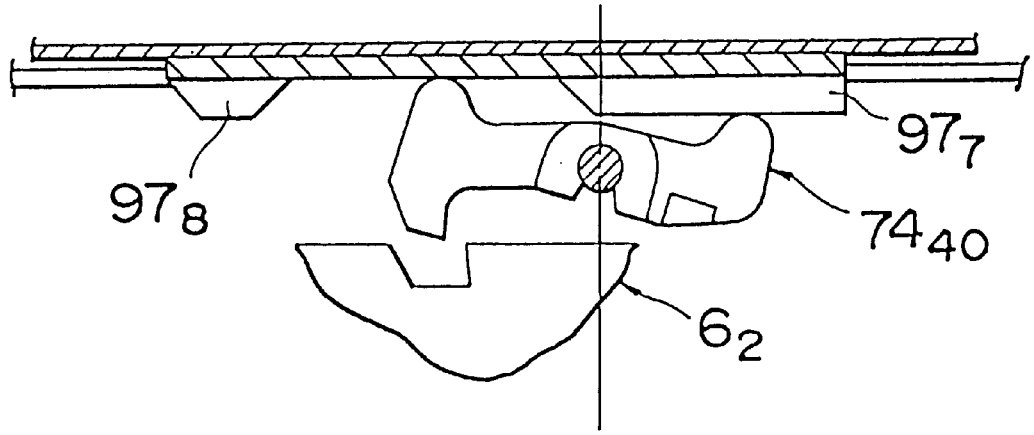
Figure 61A:
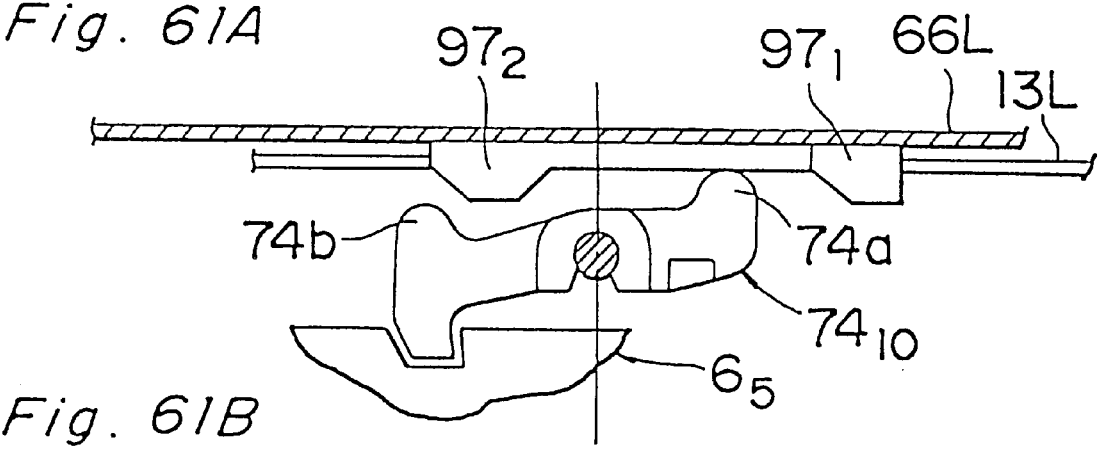
FIGS. 61A to 61D are views similar to FIGS. 21A to 21D, respectively, showing how first to fourth holder levers of the modified subtray holder are positioned relative to the associated subtrays when the optical disc resting on the third subtray is in position to be played back.
Figure 61B:
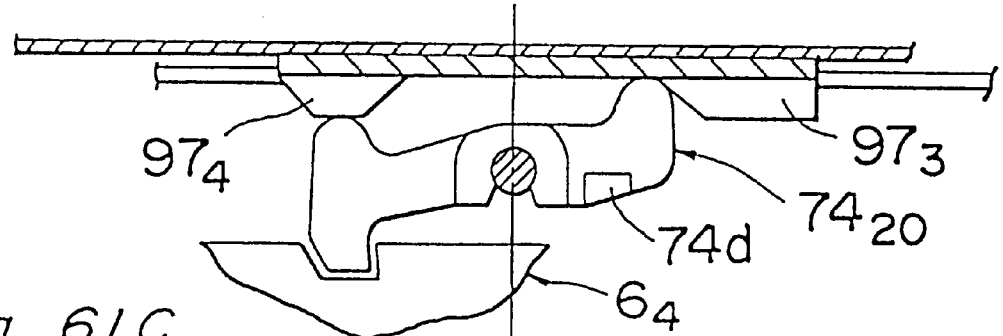
Figure 61C:
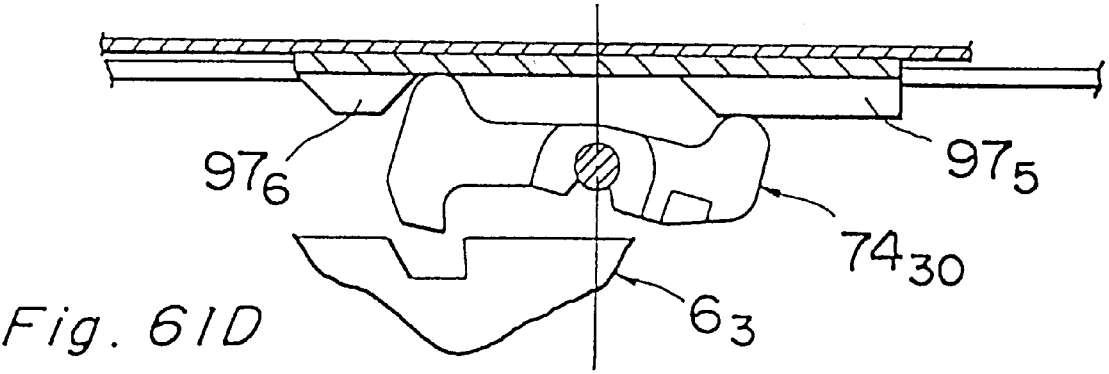
Figure 61D:
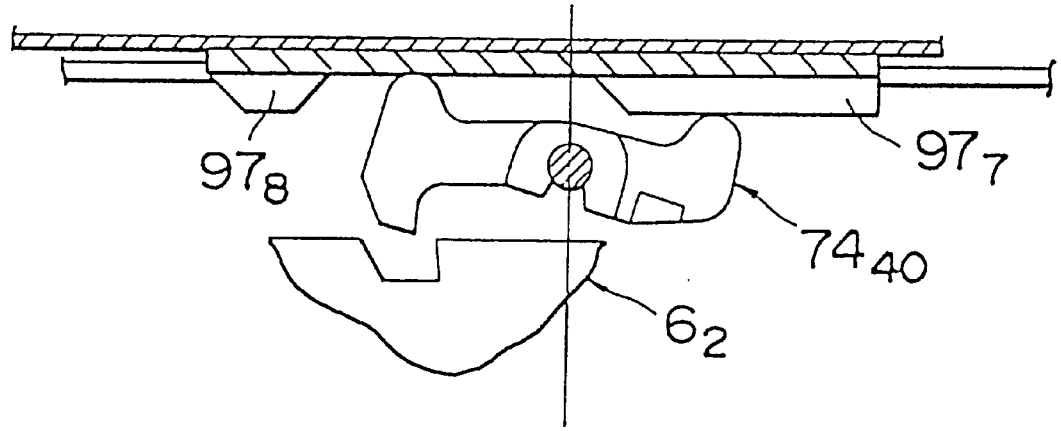

Even though the guide projection 91*a* is disengaged from the groove delimited by the support step 7 in the subtray $6_5$ as a result of the (n+1)th subtray $6_5$ having been pushed upwardly by the n-th subtray $6_4$, the control projection 91*b* is engaged in the hole 96 in the subtray $6_5$ as shown in FIG. 58B to prevent the subtray $6_5$ from being laterally displaced in position so that when the n-th subtray $6_4$ is returned to the stand-by position, the guide projection 91*a* can be assuredly engaged in the groove delimited by the support step 7 in the (n+1)th subtray $6_5$ to thereby restore to the initial condition. In other words, the (n+1) subtray $6_5$ can be pushed upwardly a considerable distance sufficient for the guide projection 91*a* to separate away from the groove delimited by the support step 7 in the (n+1)th subtray $6_5$ and, therefore, even though the space between the neighboring subtrays is further minimized, the stabilized operation can be obtained in a manner comparable to that accomplished in the prior art disc drive apparatus.

While the foregoing description has been made in connection with the n-th subtray represented by the fourth subtray $6_4$, a similar description equally applies to any one of the other subtrays $6_1$ to $6_3$.

As discussed above, since the first projection 94*a* is provided in each of the subtrays $6_1$ to $6_5$, there may be an undesirable possibility that when the n-th subtray is to be drawn towards the loaded position, the first projection 94*a* in the n-th subtray may contact the (n+1)th subtray to move the latter. In this respect, when the n-th subtray is to be loaded, the corresponding one of the first to fourth holder levers $74_1$ to $74_4$ is engaged with the (n+1)th subtray to hold the latter at the stand-by position.

In the holder 73 of the structure shown in FIG. 15, only the resilient force exerted by each leg 75*b* is utilized to urge the respective hook 75*c* to engage in the associated recess 6*a* in any one of the subtrays $6_1$ to $6_5$ and, therefore, there may be a possibility that the (n+1)th subtray may move against the resiliency of the associated leg 75*b*. An alternative embodiment of the holder 73 designed to eliminate this possibility will now be described with particular reference to FIGS. 53 and 59 to 61.

Alternative Embodiment of Holder 73

In the alternative embodiment shown in FIGS. 53 and 59 to 61, each of the holder levers and the corresponding cam projections $66_1$ to $66_4$ have respective shapes different from that employed in the embodiment shown in FIG. 15.

Specifically as shown in FIG. 53, a cam plate 97 is fixedly secured to the left guide plate 66L slidable relative to the left side wall 13L of the drive housing 2, and a holder support block 98 is secured to the left side wall 13L. The holder support block 98 has an upright pin 98*a* formed therein and on which first to fourth holder levers $74_{10}$ to $74_{40}$ are pivotally mounted for detecting respective shapes of cam elements formed in the cam plate 97.

The cam plate 97 is formed with first to eighth cam elements $97_1$ to $97_8$, the odd-numbered and even-numbered cam elements being spaced an equal distance in a direction perpendicular to the longitudinal sense of the left side wall 13L. The first holder lever $74_{10}$ has one end formed with a first feeler 74*a* for detecting the first cam element 97, and also has the other end formed with a hook 74*c* engageable in the recess 6*a* in the associated subtray $6_5$ and a second feeler 74*b* for detecting the second cam element $97_2$. This first holder lever $74_{10}$ has an engagement piece 74*d* formed on an upper surface region of the end thereof adjacent the first feeler 74*a* and an engagement recess 74*e* defined on an undersurface of that end thereof adjacent the first feeler 74*a* for receiving therein the engagement piece 74*d* integral with the second holder lever $74_{20}$.

Any one of the second to fourth holder levers $74_{20}$ to $74_{40}$ is of a structure identical with that of the first holder lever $74_{10}$ discussed above, and all of the holder levers $74_{10}$ to $74_{40}$ are stacked one above the other and are in turn mounted on the upright pin 98*a* for pivotal movement about such upright pin 98*a* with the engagement piece 74*d* in one holder lever loosely received in the engagement recess 74*e* in the holder lever immediately above such one holder lever.

FIGS. 59A to 59D illustrate respective conditions of the first to fourth holder levers $74_{10}$ to $74_{40}$ assumed at the time the elevating table 40 is held at the first stop position at which the uppermost subtray $6_5$ is to be drawn towards the loaded position. As shown therein, the first feelers 74*a* of the first to fourth holder levers $74_{10}$ to $74_{40}$ are in position to detect the respective first, third, fifth and seventh cam elements $97_1$, $97_3$, $97_5$ and $97_7$ with the corresponding hooks 74*c* disengaged from the recesses 6*a* in the subtrays $6_1$ to $6_5$.

On the other hand, FIGS. 60A to 60D illustrate respective conditions of the first to fourth holder levers $74_{10}$ to $74_{40}$ assumed at the time the elevating table 40 is held at the second stop position at which the subtray $6_4$ immediately below the uppermost subtray $6_5$ is to be drawn towards the loaded position. In this condition, the first holder lever $74_{10}$ is in position to detect the second cam element $97_2$ and the hook 74*c* of such first holder lever $74_{10}$ is consequently engaged in the recess 6*a* in the uppermost subtray $6_5$ while the second to fourth holder levers $74_{20}$ to $74_{40}$ remain in the same position as shown in FIGS. 59B to 59D. Thus, when the fourth subtray $6_4$ immediately below the uppermost subtray $6_5$ is to be drawn towards the loaded position, the second feeler 74b of the first holder lever $74_{10}$ is engaged with the second cam element $97_2$, thereby locking the first holder lever $74_{10}$ in position to not pivot in a direction required for the corresponding hook 74c to disengage from the recess 6a in the uppermost subtray $6_5$, and therefore, the uppermost subtray $6_5$ is held immovable even though the fourth subtray $6_4$ is drawn towards the loaded position.

FIGS. 61A to 61D illustrate respective conditions of the first to fourth holder levers $74_{10}$ to $74_{40}$ assumed at the time the elevating table 40 is held at the third stop position at which the subtray $6_3$ is to be drawn towards the loaded position. As shown therein, the second feeler 74b of the second holder lever $74_{20}$ is in position to detect the fourth cam element $97_4$ with the hook 74c of such second holder lever $74_{20}$ engaged in the recess 6a in the fourth subtray 64. In this condition, the first holder lever $74_{10}$ is held in position with its feelers 74a and 74b disengaged from the associated first and second cam elements $97_1$ and $97_2$, but the engagement piece 74d of the second holder lever $74_{20}$ is engaged in the engagement recess 74e in the first holder lever $74_{10}$ to thereby urge the first holder lever $74_{10}$ about the upright pin 98a in a direction required for the hook 74c of the first holder lever $74_{10}$ to engage in the recess 9a in the uppermost subtray $6_5$. Thus, when the third subtray $6_3$ is to be drawn towards the loaded position, the second holder lever $74_{20}$ has its second feeler 74b brought into abutment with the fourth cam element $97_4$ and the second holder lever $74_{20}$ is therefore locked in position not to pivot in a direction required for the corresponding hook 74c to disengage from the recess 6a in the fourth subtray $6_4$. At the same time, because of the engagement of the engagement piece 74d in the second holder lever $74_{20}$ into the engagement recess 74e in the first holder lever $74_{10}$ as discussed above, the first holder lever $74_{10}$ is also locked in position not to pivot in a direction required for the corresponding hook 74c to disengage from the recess 6a in the uppermost subtray $6_5$. Accordingly, the uppermost and next succeeding subtrays $6_5$ and $6_4$ are held immovable even though the third subtray $6_3$ is drawn towards the loaded position.

Similarly, when the second subtray $6_2$ is to be drawn towards the loaded position, the hook 74c of the third holder lever $74_{30}$ is engaged in the recess in the third subtray $6_3$ and the second holder lever $74_{20}$ is urged by the third holder lever $74_{30}$ in a direction required for the hook 74c of the second holder lever $74_{20}$ to engage in the recess of the fourth subtray $6_4$ and the first holder lever $74_{10}$ is urged by the second holder lever $74_{20}$ in a direction required for the hook 74c of the first holder lever $74_{10}$ to engage in the recess of the uppermost or fifth subtray $6_5$, resulting in that the third to fifth subtrays $6_3$ to $6_5$ are held immovable even though the second subtray $6_2$ is drawn towards the loaded position.

Again similarly, when the first subtray $6_1$ is to be drawn towards the loaded position, the hook 74c of the fourth holder lever $74_{40}$ is engaged in the recess in the second subtray $6_2$ and the third holder lever $74_{30}$ is urged by the fourth holder lever $74_{40}$ in a direction required for the hook 74c of the third holder lever $74_{30}$ to engage in the recess of the third subtray $6_3$, the second holder lever $74_{20}$ is urged by the third holder lever $74_{30}$ in a direction required for the hook 74c of the second holder leer $74_{20}$ to engage in the recess of the fourth subtray $6_4$, and the first holder lever $74_{10}$ is urged by the second holder lever $74_{20}$ in a direction required for the hook 74c of the first holder lever $74_{10}$ to engage in the recess in the uppermost or fifth subtray $6_5$, resulting in that the second to fifth subtrays $6_2$ to $6_5$ are held immovable even though the first subtray $6_1$ is drawn towards the loaded position.

As discussed above, the provision of the first to fourth holder levers $74_{10}$ to $74_{40}$ in combination with the first to eighth cam elements $97_1$ to $98_8$ is effective to avoid the possibility that when the n-th subtray is to be drawn towards the loaded potion, the subtray or subtrays positioned above the n-th subtray may be erroneously moved rearwardly because of the presence of the first projection 94a on the upper surface of each of the subtrays $6_1$ to $6_5$.

Also, the formation of the engagement piece 74d and the engagement recess 74e in each of the first to fourth holder levers $74_{10}$ to $74_{40}$ is effective to permit one holder lever to be pivoted in response to the pivotal movement of the holder lever immediately below such one holder lever about the common upright pins 98a, allowing the use of the first to eighth cam elements $97_1$ to $97_8$ of a simplified configuration. More specifically, each of the second, fourth and sixth cam elements $97_2$, $97_4$ and $97_6$ may have a reduced length and the width of the window 72 (See FIG. 14) as measured in a direction lengthwise of the left side wall 13L where it is defined can be reduced to compensate for any possible reduction in physical strength of the left side wall 13L which would otherwise result in because of the presence of the window 72.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method of exchanging an optical disc in an optical disk drive apparatus comprising a main tray having a plurality of subtrays thereon, the main tray being movable, along with selected subtrays, between withdrawn and inserted positions, the method comprising the steps of:

withdrawing the main tray to the withdrawn position together with all of the plurality of subtrays thereof below a chosen one of the subtrays while holding the chosen one of the subtrays at a stand-by position, wherein opposite side edges of each of the plurality of subtrays have support steps extending from a front end towards a rear end thereof such that each of the support steps of ones of the plurality of subtrays have another support step of others of the plurality of subtrays stacked above the ones of the plurality of subtrays to together define U-sectioned guide grooves, and wherein the chassis has opposite side walls with a support guide located on and positioned inwardly of each of the opposite side walls, the support guide comprising a plurality of parallel ribs for engagement with the U-sectioned guide grooves such that, when the main tray is withdrawn to the withdrawn position and the chosen one of the subtrays is held at the stand-by position, rear ends of the support steps of the chosen one of the subtrays are supported from below by respective ribs and at least a portion of a front end of the chosen one of the subtrays overlaps at least a portion of a rear end of an uppermost one of the plurality of subtrays remaining in the main tray so that the chosen one of the subtrays assumes a horizontal position, exchanging an optical disc on one of the subtrays below the chosen one of the subtrays, and subsequently moving the main tray from the withdrawn position towards the inserted position;

withdrawing the main tray to the withdrawn position together with all of the plurality of subtrays thereof such that, when the main tray is withdrawn to the withdrawn position together with all of the subtrays, the rear ends of the support steps separate from the respective parallel ribs, exchanging an optical disc on a top one of the subtrays, and subsequently moving the main tray from the withdrawn position towards the inserted position;

wherein when the main tray is at the inserted position, rear ends of the support steps are supported from below by respective parallel ribs of the support guides;

drawing a chosen one of the subtrays from a stand-by position towards a loaded position while the main tray is maintained at the inserted position; and clamping an optical disk resting on the chosen one of the subtrays.

2. The method of claim 1, and further comprising:

before either said withdrawing, drawing one subtray of the stack of subtrays to the loaded position; and after said drawing and before either said withdrawing, returning the subtray that had been drawn to the loaded position to the stand-by position.

3. A method of exchanging an nth optical disc from one of a stack of subtrays stacked directly on each other and located on a main tray, where n is the number of the subtray in the stack counting from the bottom of the stack, the main tray is movable between a withdrawn position and an inserted position, an arbitrarily chosen one of the subtrays is movable from a stand-by position towards a loaded position while the main tray is at the inserted position, and an optical disk on the one of the subtrays drawn to the loaded position can be clamped by a clamp device, said method comprising the steps of:

holding an n+1 subtray of the stack of subtrays and all other subtrays of the stack of subtrays that are positioned above the nth subtray at the stand-by position;

withdrawing the main tray towards the withdrawn position together with the nth subtray, from which the optical disk is desired to be exchanged, along with an n−1 subtray and any other subtrays that are positioned below the subtray from which the optical disk is desired to be exchanged, wherein opposite side edges of each of the subtrays have support steps extending from a front end towards a rear end thereof such that the support steps of one of the subtrays have other support steps of another of the subtrays stacked there above to together define U-sectioned guide grooves, and wherein the chassis has opposite side walls with a support guide located on and positioned inwardly of each of the opposite side walls, the support guide comprising a plurality of parallel ribs for engagement with the U-sectioned guide grooves such that, when the main tray is withdrawn to the withdrawn position and the n+1 subtray is held at the stand-by position, rear ends of the support steps of the n+1 subtray are supported from below by respective ribs and at least a portion of a front end of the n+1 subtray overlaps at least a portion of a rear end of the nth subtray so that the n+1 subtray assumes a horizontal position;

exchanging the nth optical disc; and moving the main tray to the inserted position together with the nth subtray along with the n−1 subtray and any other subtrays that are positioned below the nth subtray.

4. The method of claim 3, and further comprising:

before said withdrawing, drawing one subtray of said stack of subtrays to said loaded position; and after said drawing and before said withdrawing, returning the subtray that had been drawn to the loaded position to the stand-by position.

* * * * *